(12) United States Patent
Tanaka et al.

(10) Patent No.: US 11,947,093 B2
(45) Date of Patent: Apr. 2, 2024

(54) VARIABLE MAGNIFICATION OPTICAL SYSTEM AND IMAGING APPARATUS

(71) Applicant: FUJIFILM Corporation, Tokyo (JP)

(72) Inventors: Takuya Tanaka, Saitama (JP); Shinkichi Ikeda, Saitama (JP)

(73) Assignee: FUJIFILM Corporation, Tokyo (JP)

(*) Notice: Subject to any disclaimer, the term of this patent is extended or adjusted under 35 U.S.C. 154(b) by 174 days.

(21) Appl. No.: 17/351,830

(22) Filed: Jun. 18, 2021

(65) Prior Publication Data

US 2021/0396977 A1 Dec. 23, 2021

(30) Foreign Application Priority Data

Jun. 19, 2020 (JP) .................................. 2020-106418
May 31, 2021 (JP) .................................. 2021-091561

(51) Int. Cl.
   *G02B 15/20* (2006.01)
   *G02B 15/14* (2006.01)
(52) U.S. Cl.
   CPC .......... *G02B 15/20* (2013.01); *G02B 15/1461* (2019.08)
(58) Field of Classification Search
   CPC ...... G02B 15/20; G02B 15/1461; G02B 15/14
   USPC ............................................................ 359/683
   See application file for complete search history.

(56) References Cited

U.S. PATENT DOCUMENTS 3,912,373 A   10/1975   Macher
4,830,477 A    5/1989   Takahashi et al.
2004/0021953 A1  2/2004  Betensky et al.
2005/0190434 A1  9/2005  Betensky et al.
2017/0090164 A1  3/2017  Yamada

FOREIGN PATENT DOCUMENTS

| GB | 1 469 291 A | 4/1977 |
|----|----|----|
| JP | S49-066354 A | 6/1974 |
| JP | S49-122350 A | 11/1974 |
| JP | S60-222814 A | 11/1985 |
| JP | 2006-512595 A | 4/2006 |
| JP | 2017-068095 A | 4/2017 |

OTHER PUBLICATIONS

An Office Action; "Notice of Reasons for Refusal," mailed by the Japanese Patent Office dated Apr. 25, 2023, which corresponds to Japanese Patent Application No. 2021-091561 and is related to U.S. Appl. No. 17/351,830; with English language translation.

*Primary Examiner* — Joseph P Martinez
*Assistant Examiner* — Grant A Gagnon
(74) *Attorney, Agent, or Firm* — Studebaker & Brackett PC

(57) ABSTRACT

The variable magnification optical system consists of a positive first lens group, an intermediate group, and a subsequent group in order from an object side to an image side, and does not form an intermediate real image in the entire zooming range. During zooming in a first zooming mode, a distance between the first lens group and the intermediate group changes, all distances between adjacent lens groups in the intermediate group change, a distance between the intermediate group and the subsequent group changes, and all distances between adjacent lens groups in the subsequent group are stationary. During zooming in the second zooming mode, all lens groups in the first lens group and the intermediate group are stationary, and all the distances of the adjacent lens groups in the subsequent group change. The zooming in the first zooming mode and the zooming in the second zooming mode can be independent.

20 Claims, 26 Drawing Sheets

EXAMPLE 1

EXAMPLE 1

EXAMPLE 1

EXAMPLE 1

FIRST ZOOMING: Wide SECOND ZOOMING: Wide

FIRST ZOOMING: Tele SECOND ZOOMING: Wide

FIRST ZOOMING: Wide SECOND ZOOMING: Tele

FIRST ZOOMING: Tele SECOND ZOOMING: Tele

EXAMPLE 1

EXAMPLE 2

EXAMPLE 2

EXAMPLE 3

EXAMPLE 5

EXAMPLE 5

EXAMPLE 6

EXAMPLE 6

EXAMPLE 7

EXAMPLE 8

EXAMPLE 9

EXAMPLE 10

EXAMPLE 10

EXAMPLE 11

EXAMPLE 11

VARIABLE MAGNIFICATION OPTICAL SYSTEM AND IMAGING APPARATUS

CROSS-REFERENCE TO RELATED APPLICATIONS

The present application claims priority under 35 U.S.C. § 119 to Japanese Patent Application No. 2020-106418, filed on Jun. 19, 2020 and Japanese Patent Application No. 2021-091561, filed on May 31, 2021. The above application is hereby expressly incorporated by reference, in its entirety, into the present application.

BACKGROUND OF THE INVENTION

1. Field of the Invention

The technology of the present disclosure relates to a variable magnification optical system and an imaging apparatus.

2. Description of the Related Art

In the related art, for example, as the variable magnification optical system, variable magnification optical systems described in the following JP2017-068095A and JP2006-512595A are known. JP2017-068095A describes a zoom lens having an extender lens group that changes the focal length range of the zoom lens by being inserted into and removed from the optical path of the zoom lens. JP2006-512595A describes a zoom lens system for forming a final image of an object, and a zoom lens system for forming a first intermediate real image between the object and the final image.

SUMMARY OF THE INVENTION

In recent years, there has been a demand for a variable magnification optical system that can be configured in a small size.

The present disclosure has been made in view of the above circumstances, and an object of the present invention is to provide a miniaturized variable magnification optical system and an imaging apparatus comprising the variable magnification optical system.

The variable magnification optical system of the present disclosure consists of, in order from an object side to an image side: a first lens group that has a positive refractive power; an intermediate group that includes a plurality of lens groups; and a subsequent group that includes a plurality of lens groups, in which in a first zooming mode, during zooming, a distance between the first lens group and the intermediate group changes, all distances between adjacent lens groups in the intermediate group change, a distance between the intermediate group and the subsequent group changes, and all distances between adjacent lens groups in the subsequent group are stationary, in a second zooming mode, during zooming, the first lens group and all lens groups in the intermediate group remain stationary with respect to an image plane, and all the distances between the adjacent lens groups in the subsequent group change, zooming in the first zooming mode and zooming in the second zooming mode are possible independently of each other, and an intermediate real image is not formed in an entire zooming range.

It is preferable that the subsequent group has a positive refractive power as a whole.

It is preferable that the subsequent group includes at least one lens group having a negative refractive power and at least one lens group having a positive refractive power in order from the object side to the image side.

It is preferable that the subsequent group includes at least one lens group having a positive refractive power. In a case where a lens group having a strongest positive refractive power among lens groups that move during zooming in the second zooming mode is set as a SP lens group, assuming that βSP is a lateral magnification of the SP lens group in a state where the variable magnification optical system focuses on an object at infinity and has a shortest focal length, the variable magnification optical system preferably satisfies Conditional Expression (1), and more preferably satisfies Conditional Expression (1-1).

$$-1 < \beta SP < -0.1 \quad (1)$$

$$-0.9 < \beta SP < -0.1 \quad (1\text{-}1)$$

It is preferable that the subsequent group includes at least one lens group having a negative refractive power. Assuming that fS is a focal length of the subsequent group in a state where the variable magnification optical system focuses on an object at infinity and has a shortest focal length, and fSN is a focal length of a lens group having a strongest negative refractive power among lens groups that move during zooming in the second zooming mode, the variable magnification optical system preferably satisfies Conditional Expression (2), and more preferably satisfies Conditional Expression (2-1).

$$0 < fS/|fSN| < 4 \quad (2)$$

$$0 < fS/|fSN| < 3 \quad (2\text{-}1)$$

In a state where the variable magnification optical system focuses on an object at infinity and has a shortest focal length, assuming that fw is a focal length of the variable magnification optical system, ωw is a half angle of view of the variable magnification optical system, and Dexpw is a distance on an optical axis from a lens surface closest to the image side in the variable magnification optical system to an exit pupil position of the variable magnification optical system, the variable magnification optical system preferably satisfies Conditional Expression (3), and more preferably satisfies Conditional Expression (3-1).

$$0 < |\{fw \times \tan(\omega w)\}/\text{Dexpw}| < 0.2 \quad (3)$$

$$0 < |\{fw \times \tan(\omega w)\}/\text{Dexpw}| < 0.1 \quad (3\text{-}1)$$

In a state where the variable magnification optical system focuses on an object at infinity and has a shortest focal length, assuming that a focal length of the variable magnification optical system is fw and a sum of a distance on an optical axis from a lens surface closest to the object side in the variable magnification optical system to a lens surface closest to the image side in the variable magnification optical system and a back focal length of the variable magnification optical system at an air conversion distance is TL, the variable magnification optical system preferably satisfies Conditional Expression (4), and more preferably satisfies Conditional Expression (4-1).

$$1 < TL/fw < 100 \quad (4)$$

$$10 < TL/fw < 90 \quad (4\text{-}1)$$

Assuming that a highest zoom ratio of the variable magnification optical system in the second zooming mode is Zr2max, the variable magnification optical system preferably satisfies Conditional Expression (5), and more preferably satisfies Conditional Expression (5-1).

$$1.2 < Zr2max < 3 \quad (5)$$

$$1.3 < Zr2max < 2.2 \quad (5\text{-}1)$$

It is preferable that the first lens group remains stationary with respect to an image plane during zooming in all zooming modes.

Lens groups that move during zooming in the second zooming mode may be configured to be two lens groups consisting of a lens group having a negative refractive power and a lens group having a positive refractive power in order from the object side to the image side.

Lens groups that move during zooming in the second zooming mode may be configured to be three lens groups consisting of a lens group having a negative refractive power, a lens group having a negative refractive power, and a lens group having a positive refractive power in order from the object side to the image side.

Lens groups that move during zooming in the second zooming mode may be configured to be three lens groups consisting of a lens group having a negative refractive power, a lens group having a positive refractive power, and a lens group having a positive refractive power in order from the object side to the image side.

Lens groups that move during zooming in the second zooming mode may be configured to be three lens groups consisting of a lens group having a negative refractive power, a lens group having a positive refractive power, and a lens group having a negative refractive power in order from the object side to the image side.

An imaging apparatus according to the present disclosure comprises the variable magnification optical system according to the present disclosure.

In the present specification, it should be noted that the terms "consisting of ~" and "consists of ~" mean that the lens may include not only the above-mentioned constituent elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, the term "~ group having a positive refractive power" means that the group has a positive refractive power as a whole. Similarly, the term "~ group having a negative refractive power" means that the group has a negative refractive power as a whole. The "lens group" is not limited to a configuration in which the lens group consists of a plurality of lenses, but the lens group may consist of only one lens.

The term "lens group" in the present specification refers to a part including the at least one lens, which is a constituent part of the variable magnification optical system and is divided by an air distance that changes during zooming in at least one zooming mode. During zooming, the lens groups move or remain stationary, and the mutual distance between the lenses in one lens group does not change.

A compound aspheric lens (a lens in which a spherical lens and an aspheric film formed on the spherical lens are integrally formed and function as one aspheric lens as a whole) is not regarded as cemented lenses, but the compound aspheric lens is regarded as one lens. The sign of the refractive power and the surface shape of the lens including the aspheric surface will be considered in terms of the paraxial region unless otherwise specified.

The "focal length" used in a conditional expression is a paraxial focal length. The "back focal length of the variable magnification optical system at the air conversion distance" is the air conversion distance on the optical axis from the lens surface closest to the image side to the image side focal position in the variable magnification optical system. The values used in conditional expressions are values in the case of using the d line as a reference in a state where the object at infinity is in focus.

The partial dispersion ratio θgF between the g line and the F line of a certain lens is defined by θgF=(Ng−NF)/(NF−NC), where Ng, NF, and NC are the refractive indexes of the lens at the g line, the F line, and the C line. The "d line", "C line", "F line", and "g line" described in this specification are emission lines. In this specification, it is assumed that the d line wavelength is 587.56 nm (nanometers), the C line wavelength is 656.27 nm (nanometers), the F line wavelength is 486.13 nm (nanometers), and the g line wavelength is 435.84 nm (nanometers).

According to the present disclosure, it is possible to provide a miniaturized variable magnification optical system and an imaging apparatus comprising the variable magnification optical system.

DESCRIPTION OF THE PREFERRED EMBODIMENTS

Figure 1:
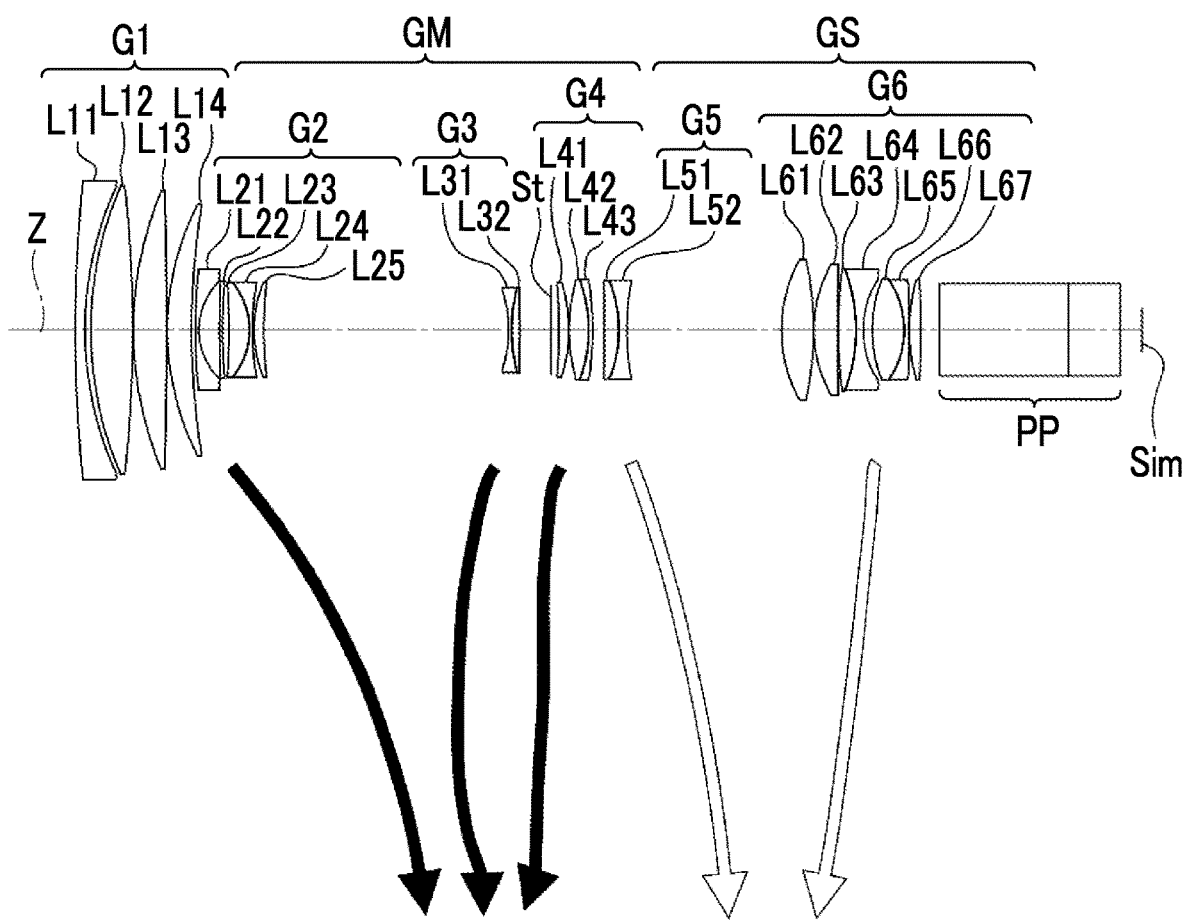
FIG. 1 is a diagram showing a cross-sectional configuration of a variable magnification optical system according to an embodiment and movement loci in a first zooming mode and a second zooming mode corresponding to the variable magnification optical system of Example 1.

Hereinafter, embodiments of the present disclosure will be described with reference to the accompanying drawings. The variable magnification optical system of the present disclosure consists of, in order from the object side to the image side, a first lens group G1 having a positive refractive power, an intermediate group GM including a plurality of lens groups, and a subsequent group GS including a plurality of lens groups. By forming the lens group closest to the object side as the first lens group G1 having a positive refractive power, it is easy to achieve reduction in total length of the lens system. Thus, there is an advantage in achieving reduction in size.

The variable magnification optical system of the present disclosure has a plurality of zooming modes. During zooming in a first zooming mode, a distance between the first lens group G1 and the intermediate group GM changes, all distances between adjacent lens groups in the intermediate group GM change, a distance between the intermediate group GM and the subsequent group GS changes, and all distances between adjacent lens groups in the subsequent group GS are stationary. In the first zooming mode, during zooming, at least one lens group in the intermediate group GM moves along the optical axis Z.

In a second zooming mode, during zooming, the first lens group G1 and all lens groups in the intermediate group GM remain stationary with respect to an image plane Sim, and all the distances between the adjacent lens groups in the subsequent group GS change. In the second zooming mode, during zooming, at least one lens group in the subsequent group GS moves along the optical axis Z.

The zooming in the first zooming mode and the zooming in the second zooming mode are possible independently of each other. Here, the phrase "the zooming in the first zooming mode and the zooming in the second zooming mode are possible independently of each other" means that the zooming in the first zooming mode and the zooming in the second zooming mode can be performed regardless of each other. For example, even in a case where zooming in one mode of the first zooming mode and the second zooming mode is performed, it is possible to not perform zooming in the other mode. Further, for example, it is possible to set the zoom ratio in the other mode regardless of the zoom ratio in one mode of the first zooming mode and the second zooming mode.

The zooming may be performed using only the first zooming mode, the zooming may be performed using only the second zooming mode, and the zooming may be performed using both modes of the first zooming mode and the second zooming mode. For example, the zooming may be performed using one mode of the first zooming mode and the second zooming mode and then the zooming may be performed using the other mode, thereby obtaining the desired zoom ratio. More specifically, for example, the second zooming mode may be used in a case where the zooming range in the first zooming mode is shifted to the long focal length side. The first and second zooming modes in the above specific example may be interchanged and used. In one entire zooming range in the first zooming mode and the second zooming mode, it is preferable that the other entire zooming range is available. By having the above-mentioned two zooming modes, the variable magnification optical system of the present disclosure is capable of stepwise zooming and continuous zooming, and makes it easy to obtain a high zoom ratio.

In the related art, a zoom lens comprising an extender lens group is known as a lens system for obtaining a high zoom ratio, but it is necessary for such a zoom lens to have a space for retracting the lens group inserted and removed from the optical path. Therefore, it was difficult to reduce the size in the radial direction. On the other hand, in the variable magnification optical system of the present disclosure having the above two zooming modes, the zooming can be performed without using the extender lens group. Therefore, the space for retracting the extender lens group is unnecessary, and the size thereof in the radial direction can be reduced.

As an example, FIG. 1 shows a cross-sectional view of the configuration of the variable magnification optical system according to an embodiment of the present disclosure. In FIG. 1, the left side is the object side and the right side is the image side. The example shown in FIG. 1 corresponds to the configuration example of Example 1 described later. The variable magnification optical system in FIG. 1 has the first zooming mode and the second zooming mode described above. In order to facilitate understanding, in the following description with reference to FIGS. 1 to 4, a case where the variable magnification optical system in FIG. 1 has only the above two zooming modes as the zooming modes will be described as an example.

The variable magnification optical system in FIG. 1 consists of, in order from the object side to the image side along the optical axis Z, a first lens group G1, a second lens group G2, a third lens group G3, a fourth lens group G4, a fifth lens group G5, and a sixth lens group G6.

Each lens group of the variable magnification optical system in FIG. 1 is configured as follows. The first lens group G1 consists of four lenses L11 to L14 in order from the object side to the image side. The second lens group G2 consists of five lenses L21 to L25 in order from the object side to the image side. The third lens group G3 consists of two lenses L31 and L32 in order from the object side to the image side. The fourth lens group G4 consists of, in order from the object side to the image side, an aperture stop St and three lenses L41 to L43. The fifth lens group G5 consists of two lenses L51 and L52 in order from the object side to the image side. The sixth lens group G6 consists of seven lenses L61 to L67 in order from the object side to the image side. Further, the aperture stop St shown in FIG. 1 does not indicate a shape thereof, but indicates a position thereof in the optical axis direction.

It should be noted that FIG. 1 shows an example in which an optical member PP of which the incident surface and the exit surface are parallel, is disposed between a variable magnification optical system and an image plane Sim under an assumption that the variable magnification optical system is applied to the imaging apparatus. The optical member PP is a member assumed to include at various filters, a prism, a cover glass, and/or the like. The various filters include, for example, a low pass filter, an infrared cut filter, and a filter that cuts a specific wavelength region. The optical member PP has no refractive power, and the optical member PP may be configured to be omitted.

FIG. 1 shows a state in which the variable magnification optical system focuses on an object at infinity and has the shortest focal length. Here, the "state in which the variable magnification optical system has the shortest focal length" means a zooming state, in which the focal length of the variable magnification optical system is the shortest, among all the zooming states that are possible in a case where zooming is performed using all the zooming modes of the variable magnification optical system. In a case where the variable magnification optical system in FIG. 1 has only two zooming modes as the zooming modes, the state having the shortest focal length is the wide angle end state in the first zooming mode and the wide angle end state in the second zooming mode.

In the example of FIG. 1, the intermediate group GM consists of the second lens group G2, the third lens group G3, and the fourth lens group G4, and the subsequent group GS consists of the fifth lens group G5 and the sixth lens group G6. In the example of FIG. 1, during zooming in the first zooming mode, the second lens group G2, the third lens group G3, and the fourth lens group G4 move along the optical axis Z by changing distances from adjacent lenses thereof in the optical axis direction, and the other lens groups remain stationary with respect to the image plane Sim. Further, during zooming in the second zooming mode, the fifth lens group G5 and the sixth lens group G6 move along the optical axis Z by changing distances from adjacent lenses thereof in the optical axis direction, and the other lens groups remain stationary with respect to the image plane Sim. In FIG. 1, the black arrow indicates a schematic movement locus of each lens group during zooming from the wide angle end to the telephoto end under each lens group that moves during zooming in the first zooming mode. Further, the outlined arrow indicates a schematic movement locus of each lens group during zooming from the wide angle end to the telephoto end under each lens group that moves during zooming in the second zooming mode.

Figure 2:
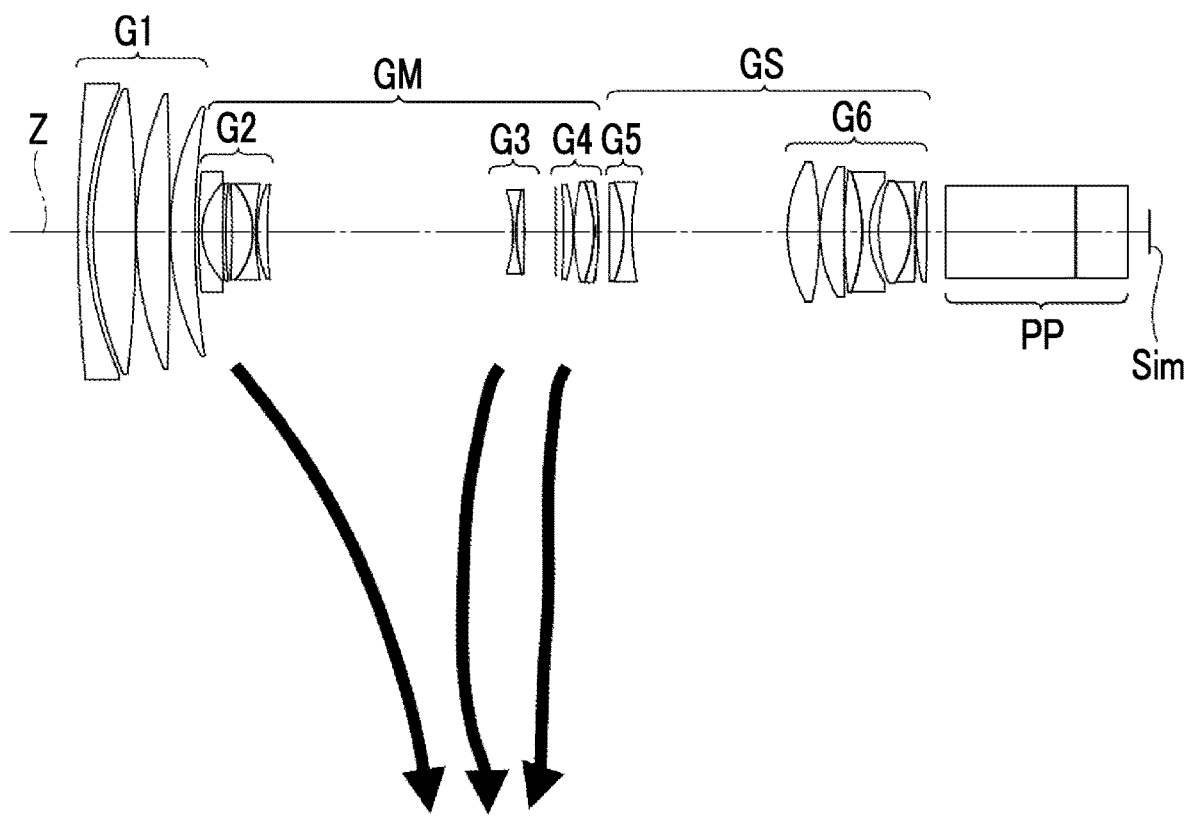
FIG. 2 is a diagram showing a cross-sectional configuration and movement loci of a wide angle end and a telephoto end in the first zooming mode of the variable magnification optical system of Example 1.
Figure 2:
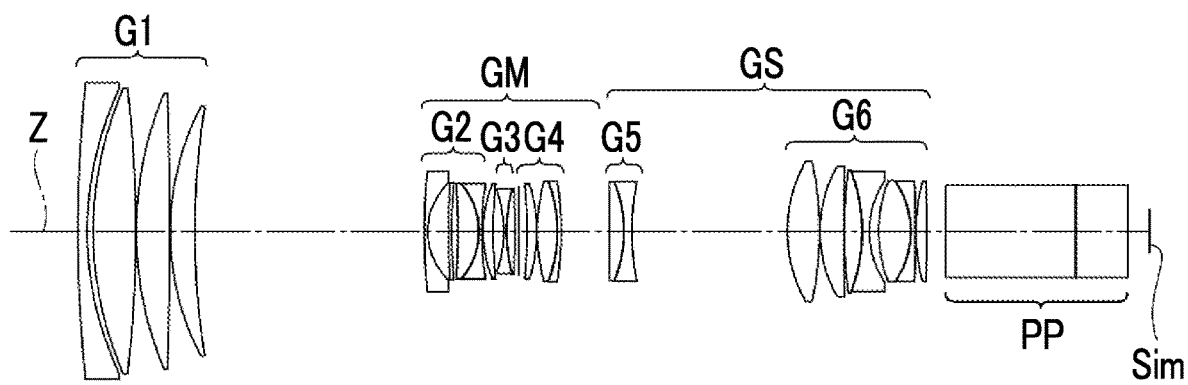

Configuration examples of the wide angle end state and the telephoto end state in the first zooming mode of the variable magnification optical system in FIG. 1 are shown in the upper and lower parts of FIG. 2, respectively. The black arrow in FIG. 2 indicates the same as the black arrow in FIG. 1. The upper part of FIG. 2 shows a configuration in the wide angle end state in the first zooming mode and the wide angle end state in the second zooming mode. The lower part of FIG. 2 shows a configuration in the telephoto end state in the first zooming mode and the wide angle end state in the second zooming mode.

Figure 3:
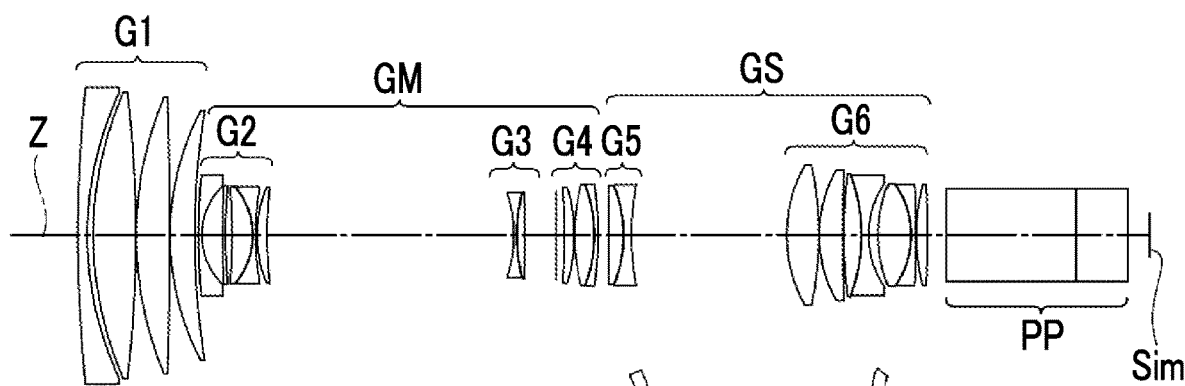
FIG. 3 is a diagram showing a cross-sectional configuration and movement loci of a wide angle end and a telephoto end of the variable magnification optical system of Example 1 in the second zooming mode.
Figure 3:
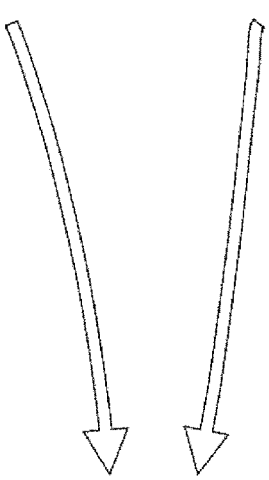
Figure 3:
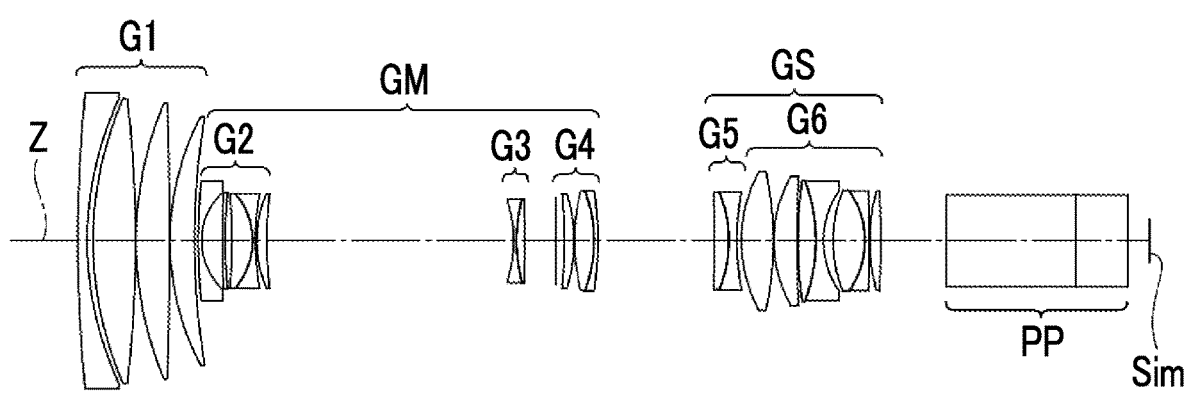

Configuration examples of the wide angle end state and the telephoto end state in the second zooming mode of the variable magnification optical system in FIG. 1 are shown in the upper and lower parts of FIG. 3, respectively. The outlined arrow in FIG. 3 indicates the same as the outlined arrow in FIG. 1. The upper part of FIG. 3 shows a configuration in the wide angle end state in the first zooming mode and the wide angle end state in the second zooming mode. The lower part of FIG. 3 shows a configuration in the wide angle end state in the first zooming mode and the telephoto end in the second zooming mode.

Figure 4:
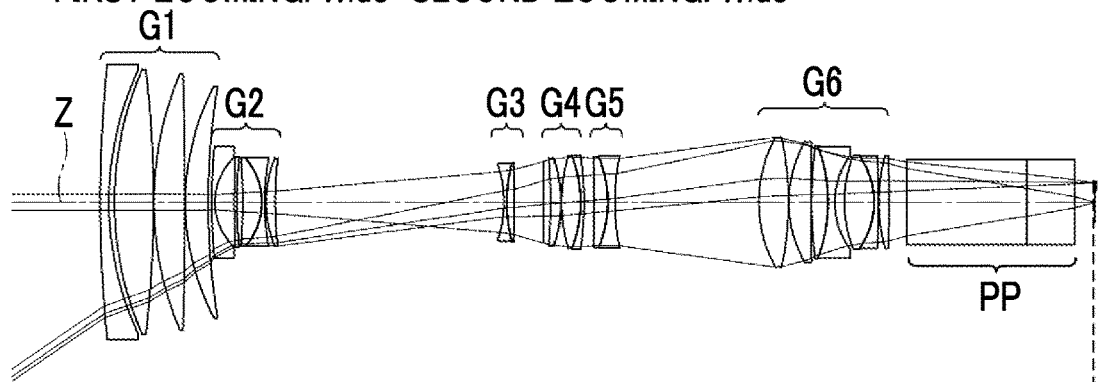
FIG. 4 is a diagram showing a cross-sectional configuration and rays of the variable magnification optical system of the first embodiment in each zooming state.
Figure 4:
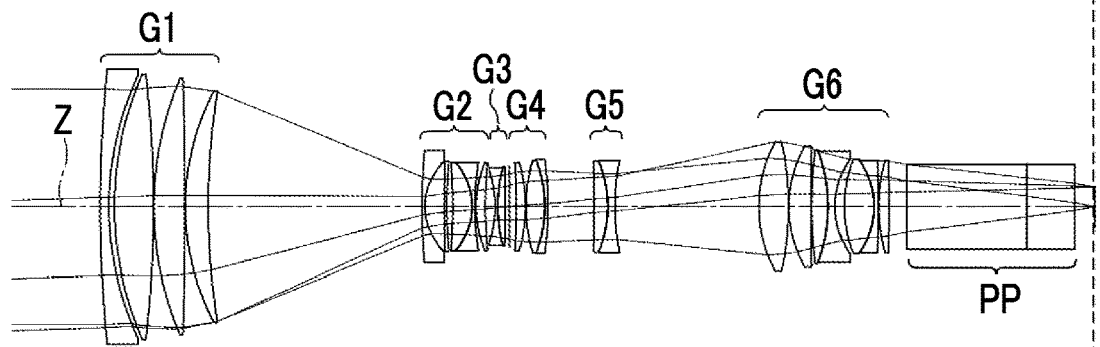
Figure 4:
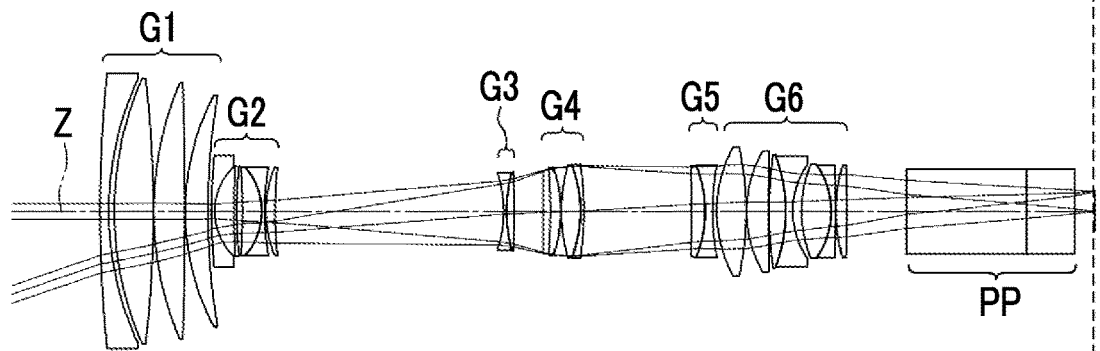
Figure 4:
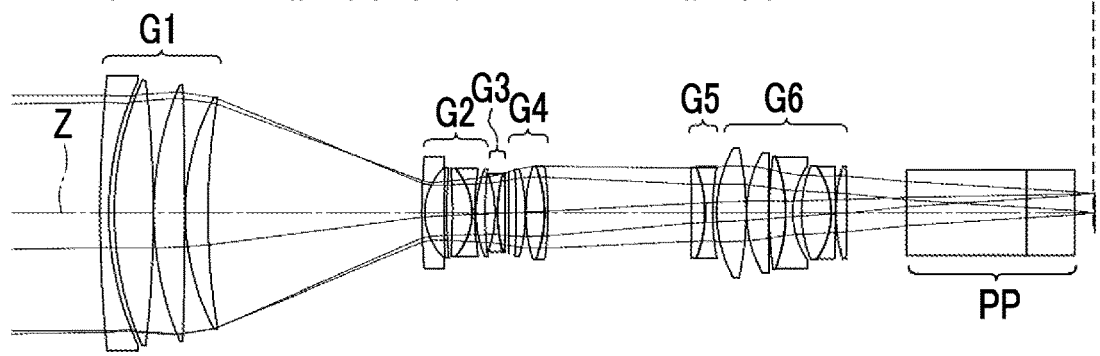

FIG. 4 shows a cross-sectional view of the configuration and rays of the variable magnification optical system in each zooming state in FIG. 1. FIG. 4 shows, as the rays, on-axis rays and rays at the maximum image height. In FIG. 4, the first zooming mode and the second zooming mode are simply referred to as "first zooming" and "second zooming", respectively. The uppermost row labeled "First Zooming: Wide, Second Zooming: Wide" in FIG. 4 shows a configuration of the wide angle end state in the first zooming mode and the wide angle end state in the second zooming mode. The second row from the top labeled "First Zooming: Tele, Second Zooming: Wide" in FIG. 4 shows a configuration in the telephoto end state in the first zooming mode and the wide angle end state in the second zooming mode. The third row from the top labeled "First Zooming: Wide, Second Zooming: Tele" in FIG. 4 shows a configuration in the wide angle end state in the first zooming mode and the telephoto end state in the second zooming mode. The bottom row labeled "First Zooming: Tele, Second Zooming: Tele" in FIG. 4 shows a configuration in the telephoto end state in the first zooming mode and the telephoto end state in the second zooming mode.

The variable magnification optical system of the present disclosure is configured not to form an intermediate real image in the entire zooming range. That is, an intermediate image of a real image is not formed inside the variable magnification optical system in any state of all the zooming states possible in a case where zooming is performed using all the zooming modes of the variable magnification optical system. In the conventional lens system in which an intermediate real image is formed inside the variable magnification optical system, it is necessary to form an image by converging once in the intermediate image and thereafter converging divergent rays again. Therefore, the total length of the lens system increases, and spherical aberration and chromatic aberration tends to increase. Compared with this conventional lens system, in the variable magnification optical system of the present disclosure that does not form an intermediate real image, the total length of the lens system can be easily shortened, and spherical aberration and chromatic aberration can be easily suppressed. As a result, it is possible to decrease the number of lenses for reducing aberrations. Thus, there is an advantage in achieving reduction in size in the optical axis direction.

Next, preferable configurations and possible configurations of the variable magnification optical system of the present disclosure will be described in detail.

It is preferable that the first lens group G1 remains stationary with respect to the image plane Sim during zooming in all the zooming modes. In such a case, it is possible to contribute to the simplification of the driving mechanism. In addition, in a case where the variable magnification optical system is configured as a zoom lens, the total length of the lens system can be kept constant during zooming.

The intermediate group GM can be configured to consist of, for example, two or more and four or less lens groups. In such a case, there is an advantage in achieving both favorable optical performance and reduction in size. All lens groups in the intermediate group GM may move during zooming in the first zooming mode. Alternatively, the intermediate group GM may have at least one lens group remaining stationary with respect to the image plane Sim during zooming in the first zooming mode.

It is preferable that the subsequent group GS has a positive refractive power as a whole. In such a case, it is possible to suppress an increase in incident angle at which the principal ray of the off-axis ray is incident on the image plane Sim. Thus, there is an advantage in suppressing shading.

It is preferable that the subsequent group GS includes at least one lens group having a negative refractive power and at least one lens group having a positive refractive power in order from the object side to the image side. In such a case, there is an advantage in achieving a high zoom ratio while suppressing an increase in size of the subsequent group GS in the optical axis direction.

In the configuration in which the subsequent group GS includes at least one lens group having a positive refractive power, a lens group having a strongest positive refractive power among lens groups that move during zooming in the second zooming mode is set as a SP lens group. Assuming that βSP is a lateral magnification of the SP lens group in a state where the variable magnification optical system focuses on the object at infinity and has a shortest focal length, it is preferable that the variable magnification optical system satisfies Conditional Expression (1). By not allowing the corresponding value of Conditional Expression (1) to be equal to or less than the lower limit, it is easy to suppress fluctuation in spherical aberration during zooming. By not allowing the corresponding value of Conditional Expression (1) to be equal to or greater than the upper limit, there is an advantage in shortening the length of the subsequent group GS in the optical axis direction while achieving a high zoom ratio. In order to obtain more favorable characteristics, it is more preferable that the variable magnification optical system satisfies Conditional Expression (1-1), and it is yet more preferable that the variable magnification optical system satisfies Conditional Expression (1-2).

$$-1<\beta SP<-0.1 \quad (1)$$

$$-0.9<\beta SP<-0.1 \quad (1\text{-}1)$$

$$-0.8<\beta SP<-0.2 \quad (1\text{-}2)$$

In a configuration in which the subsequent group GS includes at least one lens group having a negative refractive power, assuming that fS is a focal length of the subsequent group GS in a state where the variable magnification optical system focuses on the object at infinity and has a shortest focal length, and fSN is a focal length of a lens group having a strongest negative refractive power among lens groups that move during zooming in the second zooming mode, it is preferable that the variable magnification optical system satisfies Conditional Expression (2). Regarding the lower limit of Conditional Expression (2), since |fSN| is an absolute value, 0<|fSN|. By making a configuration so that 0<fS/|fSN|, the subsequent group GS has a positive refractive power as a whole. Thereby, it is possible to suppress an increase in incident angle at which the principal ray of the off-axis ray is incident on the image plane Sim. By not allowing the corresponding value of Conditional Expression (2) to be equal to or greater than the upper limit, the refractive power of the lens group having the strongest negative refractive power among the lens groups moving in the second zooming mode in the subsequent group GS is prevented from being excessively strong. As a result, there is an advantage in suppressing fluctuation in aberrations during zooming. In order to obtain more favorable characteristics, it is more preferable that the variable magnification optical system satisfies Conditional Expression (2-1), and it is yet more preferable that the variable magnification optical system satisfies Conditional Expression (2-2). By not allowing the corresponding value of Conditional Expression (2-2) to be equal to or less than the lower limit, the refractive power of the lens group having a negative refractive power that moves during zooming is prevented from being excessively weak. In a case where the zoom ratio increases, there is an advantage in suppressing the total length of the subsequent group GS.

$$0<fS/|fSN|<4 \quad (2)$$

$$0<fS/|fSN|<3 \quad (2\text{-}1)$$

$$0.3<fS/|fSN|<2.5 \quad (2\text{-}2)$$

In a state where the variable magnification optical system focuses on the object at infinity and has a shortest focal length, assuming that fw is a focal length of the variable magnification optical system, ωw is a half angle of view of the variable magnification optical system, and Dexpw is a distance on an optical axis from a lens surface closest to the image side in the variable magnification optical system to an exit pupil position of the variable magnification optical system, it is preferable that the variable magnification optical system satisfies Conditional Expression (3). Regarding the lower limit of Conditional Expression (3), since |{fw×tan(ωw)}/Dexpw| is an absolute value, 0<|{fw×tan(ωw)}/Dexpw|. By not allowing the corresponding value of Conditional Expression (3) to be equal to or greater than the upper limit, in a state where the variable magnification optical system has the shortest focal length, the incident angle at which the principal ray of the off-axis ray is incident on the image plane Sim is prevented from increasing. Thus, there is an advantage in achieving reduction in diameter of the lens of the subsequent group GS. For example, in the configuration example of FIG. 1, the state shown at the top in FIG. 4 has the shortest focal length. In this state, the principal ray incident on the image plane Sim from the lens surface closest to the image side at the maximum image height tends to have a lower ray height at a position closer to the image side. Therefore, in the variable magnification optical system having such a tendency, the smaller the angle of incidence on the image plane Sim, the more advantageous it is to reduce the diameter of the lens of the subsequent group GS. In order to obtain more favorable characteristics, it is more preferable that the variable magnification optical system satisfies Conditional Expression (3-1), and it is yet more preferable that the variable magnification optical system satisfies Conditional Expression (3-2).

$$0<|\{fw\times\tan(\omega w)\}/Dexpw|<0.2 \quad (3)$$

$$0<|\{fw\times\tan(\omega w)\}/Dexpw|<0.1 \quad (3\text{-}1)$$

$$0<|\{fw\times\tan(\omega w)\}/Dexpw|<0.06 \quad (3\text{-}2)$$

In a state where the variable magnification optical system focuses on the object at infinity and has a shortest focal length, assuming that a focal length of the variable magnification optical system is fw and a sum of a distance on an optical axis from a lens surface closest to the object side in the variable magnification optical system to a lens surface closest to the image side in the variable magnification optical system and a back focal length of the variable magnification optical system at an air conversion distance is TL, the variable magnification optical system preferably satisfies Conditional Expression (4). By not allowing the corresponding value of Conditional Expression (4) to be equal to or less than the lower limit, there is an advantage in suppressing various aberrations while achieving a high zoom ratio. By not allowing the corresponding value of Conditional Expression (4) to be equal to or greater than the upper limit, there is an advantage in suppressing an increase in total length of the lens system. Thus, there is also an advantage in achieving reduction in weight of the variable magnification optical system. In order to obtain more favorable characteristics, it is more preferable that the variable magnification optical system satisfies Conditional Expression (4-1), and it is yet more preferable that the variable magnification optical system satisfies Conditional Expression (4-2).

$$1<TL/fw<100 \quad (4)$$

$$10<TL/fw<90 \quad (4\text{-}1)$$

$$20<TL/fw<80 \quad (4\text{-}2)$$

Assuming that a highest zoom ratio of the variable magnification optical system in the second zooming mode is Zr2max, the variable magnification optical system preferably satisfies Conditional Expression (5). Zr2max can be calculated, for example, by the following expression. Zr2max=(focal length of the variable magnification optical system in the wide angle end state in the first zooming mode and the telephoto end state in the second zooming mode)÷(the focal length of the variable magnification optical system in the wide angle end state in the first zooming mode and the wide angle end state in the second zooming mode). By not allowing the corresponding value of Conditional Expression (5) to be equal to or less than the lower limit, it is easy to ensure an amount of change in focal length which is suitable during zooming. By not allowing the corresponding value of Conditional Expression (5) to be equal to or greater than the upper limit, it is possible to suppress the amount of movement of the lens group that moves during zooming in the second zooming mode. Thus, there is an advantage in shortening the length of the subsequent group GS in the optical axis direction. Further, as a result, it is possible to suppress an increase in ray height in the subsequent group GS. Thus, there is an advantage in suppressing an increase in diameter of the lens in the subsequent group GS. As a result, there is an advantage in realizing the variable magnification optical system having a suitable size. In order to obtain more favorable characteristics, it is more preferable that the variable magnification optical system satisfies Conditional Expression (5-1).

$$1.2<Zr2\max<3 \quad (5)$$

$$1.3<Zr2\max<2.2 \quad (5\text{-}1)$$

The subsequent group GS can be configured to consist of, for example, two or three lens groups. In such a case, there is an advantage in achieving both favorable optical performance and reduction in size.

All lens groups in the subsequent group GS may remain stationary with respect to the image plane Sim during zooming in the first zooming mode. In such a case, there is an advantage in simplifying the driving mechanism. Alternatively, during zooming in the first zooming mode, all the lens groups in the subsequent group GS may be configured to move integrally in a state where all the distances of the adjacent lens groups in the subsequent group GS are stationary. In such a case, there is an advantage in suppressing fluctuation in aberrations during zooming. Here, the phrase "moving integrally" means moving by the same amount in the same direction at the same time.

All lens groups in the subsequent group GS may move during zooming in the second zooming mode. Alternatively, the subsequent group GS may have at least one lens group remaining stationary with respect to the image plane Sim during zooming in the second zooming mode. For example, the lens group closest to the object side in the subsequent group GS may remain stationary with respect to the image plane Sim during zooming in the second zooming mode.

An example of a lens group that moves during zooming in the second zooming mode in the subsequent group GS will be described below. The plurality of lens groups constituting the lens group that moves during zooming in the second zooming mode in the subsequent group GS, which will be described below, may be arranged continuously or discontinuously.

Lens groups that move during zooming in the second zooming mode in the subsequent group GS may be configured to consist of a lens group having a negative refractive power and a lens group having a positive refractive power in order from the object side to the image side. In such a case, by having both a lens group having a negative refractive power and a lens group having a positive refractive power, it is easy to reduce the amount of movement of each lens group during zooming. Thus, there is an advantage in shortening the total length of the lens system.

Lens groups that move during zooming in the second zooming mode in the subsequent group GS may be configured to consist of a lens group having a negative refractive power, a lens group having a negative refractive power, and a lens group having a positive refractive power in order from the object side to the image side. In such a case, by having both a lens group having a negative refractive power and a lens group having a positive refractive power, there is an advantage in shortening the total length of the lens system. Further, by sharing the negative refractive power between the two lens groups, there is an advantage in suppressing fluctuation in spherical aberration during zooming.

Lens groups that move during zooming in the second zooming mode in the subsequent group GS may be configured to consist of a lens group having a positive refractive power, a lens group having a negative refractive power, and a lens group having a positive refractive power in order from the object side to the image side. In such a case, by having both a lens group having a negative refractive power and a lens group having a positive refractive power, there is an advantage in shortening the total length of the lens system. Further, by disposing a lens group having a positive refractive power on the object side in the subsequent group GS, it is easy to shorten the back focal length. Thus, there is further an advantage in shortening the total length of the lens system.

Lens groups that move during zooming in the second zooming mode in the subsequent group GS may be configured to consist of a lens group having a negative refractive power, a lens group having a positive refractive power, and a lens group having a negative refractive power in order from the object side to the image side. In such a case, by having both a lens group having a negative refractive power and a lens group having a positive refractive power, there is an advantage in shortening the total length of the lens system. Further, by disposing a lens group having a negative refractive power on the image side in the subsequent group GS, there is an advantage in suppressing fluctuations in lateral chromatic aberration during zooming.

The example shown in FIG. 1 is an example, and various modifications can be made within the scope of the technology of the present disclosure. For example, the number of lens groups constituting the intermediate group GM and the subsequent group GS, the number of lenses constituting each lens group, and the position of the aperture stop St can be different from the example shown in FIG. 1. Further, the variable magnification optical system may have a zooming mode other than the above-mentioned first zooming mode and the second zooming mode. The variable magnification optical system may be configured as a zoom lens or a varifocal lens.

The above-mentioned preferred configurations and available configurations including the configurations relating to Conditional Expressions may be any combination, and it is preferable to appropriately selectively adopt the configurations in accordance with required specification. It should be noted that the ranges of the possible conditional expressions are not limited to the ranges of the conditional expressions described in the form of the expression, and the lower limit and the upper limit are selected from each of the preferable, more preferable, and yet more preferable conditional expressions. The ranges of the conditional expressions include ranges obtained through optional combinations.

Next, examples of the variable magnification optical system of the present disclosure will be described. Each of the variable magnification optical systems of Examples 1 to 11 shown below has the first zooming mode and the second zooming mode described above.

EXAMPLE 1

FIGS. 1 to 4 show cross-sectional views of the configuration of the variable magnification optical system of Example 1, and the method and configuration thereof are described above. Therefore, a part of repeated description will be omitted here. The variable magnification optical system of Example 1 consists of, in order from the object side to the image side along the optical axis Z, a first lens group G1 having a positive refractive power, a second lens group G2 having a negative refractive power, a third lens group G3 having a negative refractive power, a fourth lens group G4 having a positive refractive power, a fifth lens group G5 having a negative refractive power, and a sixth lens group G6 having a positive refractive power. The aperture stop St is disposed at a position closest to the object side in the fourth lens group G4.

The intermediate group GM consists of a second lens group G2, a third lens group G3, and a fourth lens group G4. The subsequent group GS consists of a fifth lens group G5 and a sixth lens group G6. During zooming in the first zooming mode, the second lens group G2, the third lens group G3, and the fourth lens group G4 move along the optical axis Z by changing distances from adjacent lenses thereof in the optical axis direction, and the other lens groups remain stationary with respect to the image plane Sim. During zooming in the second zooming mode, the fifth lens group G5 and the sixth lens group G6 move along the optical axis Z by changing distances from adjacent lenses thereof in the optical axis direction, and the other lens groups remain stationary with respect to the image plane Sim.

Regarding the variable magnification optical system of Example 1, Tables 1A and 1B show basic lens data, and Table 2 shows specification and variable surface distances. The basic lens data is divided into two tables in order to prevent one table from lengthening. Table 1A shows the first lens group G1 and the intermediate group GM, and Table 1B shows the subsequent group GS.

In Tables 1A and 1B, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. The column of Nd shows a refractive index of each constituent element at the d line, the column of vd shows an Abbe number of each constituent element at the d line, and the column of θgF shows a partial dispersion ratio of each constituent element between the g line and the F line.

In Table 1, the sign of the radius of curvature of the surface convex toward the object side is positive and the sign of the radius of curvature of the surface convex toward the image side is negative. Table 1 also shows the aperture stop St and the optical member PP. In a place of a surface number of a surface corresponding to the aperture stop St, the surface number and a term of (St) are noted. A value at the bottom place of D in Table 1 indicates a distance between the image plane Sim and the surface closest to the image side in the table. In Table 1, the symbol DDH is used for each variable surface distance during zooming, and the object side surface number of the distance is given in [ ] and is noted in the column D Table 2 shows values of the zoom ratio in each mode, the focal length f, the open F number FNo., the maximum total angle of view 2ω, and the variable surface distance during zooming. (°) in the place of 2ω indicates that the section thereof is a degree. Table 2 shows values for each of the four states obtained by the combination of the wide angle end and the telephoto end in the first zooming mode and the wide angle end and the telephoto end in the second zooming mode. In Table 2, "Wide" means the wide angle end, and "Tele" means the telephoto end. The values shown in Table 2 are values in the case of using the d line as a reference in a state where the variable magnification optical system focuses on the object at infinity.

In data of each table, a degree is used as a section of an angle, and mm (millimeter) is used as a section of a length, but appropriate different sections may be used since the optical system can be used even in a case where the system is enlarged or reduced in proportion. Each of the following tables shows numerical values rounded off to predetermined decimal places.

TABLE 1A

Example 1

| Sn | R | D | Nd | vd | θgF |
|---|---|---|---|---|---|
| 1 | 390.43944 | 2.400 | 1.89589 | 28.87 | 0.60280 |
| 2 | 90.61814 | 1.500 | | | |
| 3 | 95.43056 | 10.750 | 1.43700 | 95.10 | 0.53364 |
| 4 | −337.16934 | 0.120 | | | |
| 5 | 95.04606 | 8.500 | 1.55032 | 75.50 | 0.54170 |
| 6 | −1215.16137 | 0.120 | | | |
| 7 | 71.82253 | 6.250 | 1.76385 | 48.49 | 0.55898 |
| 8 | 208.69163 | DD[8] | | | |
| 9 | 176.01237 | 0.820 | 2.00088 | 27.62 | 0.60426 |
| 10 | 17.97546 | 5.350 | | | |
| 11 | 381.86954 | 0.700 | 1.90001 | 38.00 | 0.57547 |
| 12 | 130.86188 | 1.625 | | | |
| 13 | −174.71252 | 5.285 | 1.90001 | 20.00 | 0.64194 |
| 14 | −19.50931 | 0.740 | 1.90001 | 38.00 | 0.57547 |
| 15 | 74.76410 | 0.375 | | | |
| 16 | 33.36948 | 2.518 | 1.80145 | 24.93 | 0.61760 |
| 17 | 113.45970 | DD[17] | | | |
| 18 | −33.70432 | 0.750 | 1.89999 | 32.78 | 0.59036 |
| 19 | 43.75204 | 2.050 | 1.98569 | 16.50 | 0.66749 |
| 20 | −488.75331 | DD[20] | | | |
| 21(St) | | 2.000 | | | |
| 22 | −174.97621 | 2.500 | 1.82036 | 33.90 | 0.58934 |
| 23 | −43.86945 | 0.120 | | | |
| 24 | 48.60691 | 5.188 | 1.60265 | 61.05 | 0.54276 |
| 25 | −37.62027 | 0.920 | 1.92931 | 18.53 | 0.65209 |
| 26 | −94.99906 | DD[26] | | | |

TABLE 1B

Example 1

| Sn | R | D | Nd | vd | θgF |
|---|---|---|---|---|---|
| 27 | −969.71326 | 3.760 | 1.72686 | 28.66 | 0.60742 |
| 28 | −34.89583 | 2.000 | 1.83604 | 44.40 | 0.56146 |
| 29 | 69.12471 | DD[29] | | | |
| 30 | 39.07251 | 8.121 | 1.51600 | 54.54 | 0.55272 |
| 31 | −88.67057 | 0.120 | | | |
| 32 | 35.49867 | 6.052 | 1.57251 | 62.21 | 0.54136 |
| 33 | 856.54362 | 0.134 | | | |
| 34 | 124.99705 | 4.526 | 1.64112 | 59.44 | 0.54297 |
| 35 | −46.24282 | 1.935 | 1.78076 | 49.14 | 0.55284 |
| 36 | 24.29054 | 2.427 | | | |
| 37 | 36.83545 | 8.110 | 1.55741 | 73.40 | 0.54140 |
| 38 | −23.58500 | 1.200 | 1.87348 | 34.26 | 0.58683 |
| 39 | −369.55692 | 0.120 | | | |
| 40 | 49.88715 | 2.816 | 1.51600 | 64.38 | 0.53517 |
| 41 | −377.56889 | DD[41] | | | |
| 42 | ∞ | 33.000 | 1.60859 | 46.44 | 0.56664 |
| 43 | ∞ | 13.200 | 1.51633 | 64.05 | 0.53463 |
| 44 | ∞ | 5.513 | | | |

TABLE 2

Example 1

| | | | | |
|---|---|---|---|---|
| First Zooming Mode State | Wide | Tele | Wide | Tele |
| Second Zooming Mode State | Wide | Wide | Tele | Tele |
| Zoom Ratio of First Zooming Mode | 1.0 | 19.2 | 1.0 | 19.2 |
| Zoom Ratio of Second Zooming Mode | 1.0 | 1.0 | 1.94 | 1.94 |
| f | 8.279 | 159.374 | 16.052 | 309.006 |
| FNo. | 1.86 | 2.41 | 3.60 | 4.68 |
| 2ω(°) | 71.0 | 4.0 | 39.2 | 2.0 |
| DD[8] | 0.984 | 58.456 | 0.984 | 58.456 |
| DD[17] | 62.590 | 2.661 | 62.590 | 2.661 |
| DD[20] | 7.996 | 1.072 | 7.996 | 1.072 |
| DD[26] | 2.739 | 12.120 | 29.536 | 38.918 |
| DD[29] | 39.487 | 39.487 | 1.154 | 1.154 |
| DD[41] | 4.756 | 4.756 | 16.295 | 16.295 |

Figure 5:
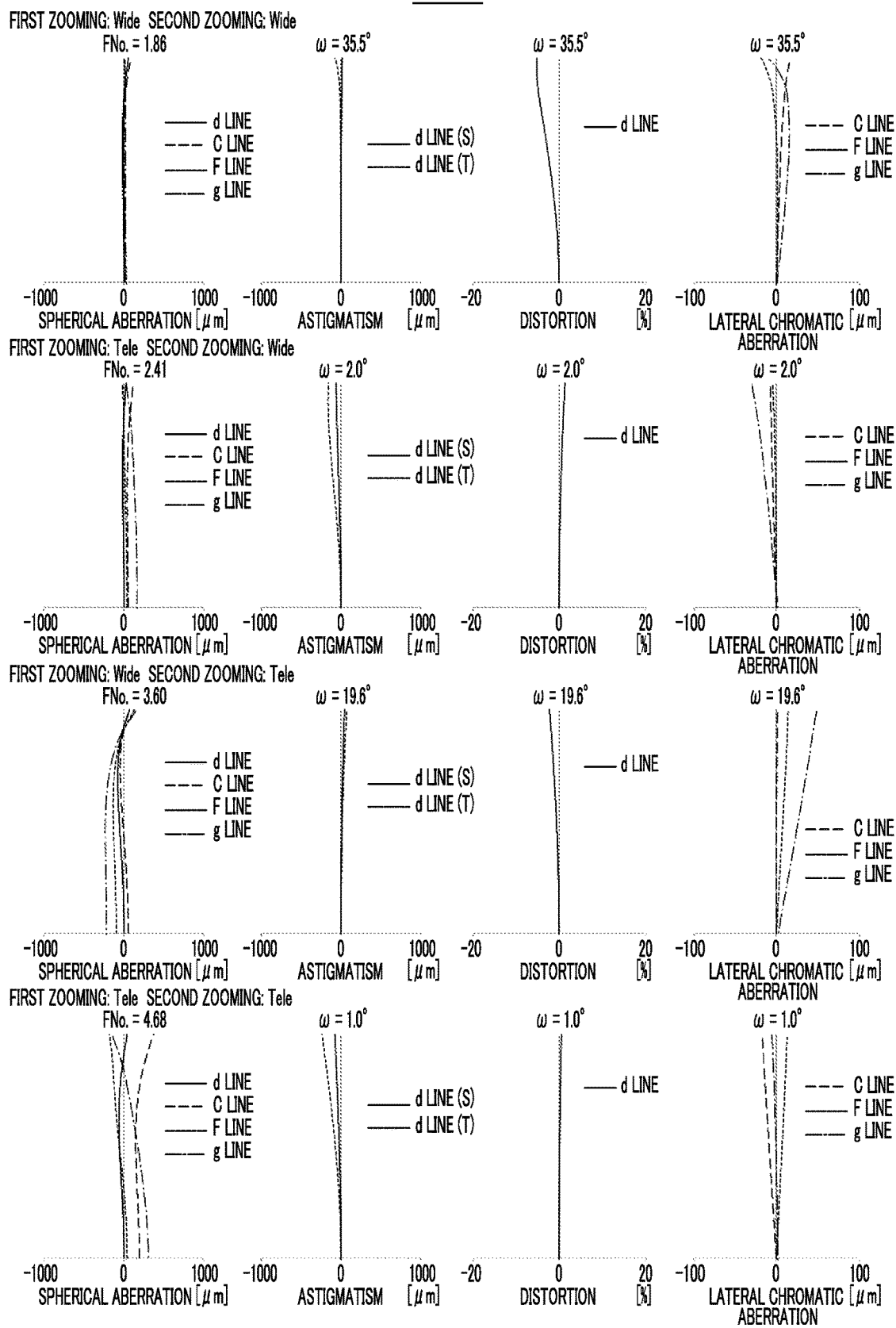
FIG. 5 is a diagram of aberrations of the variable magnification optical system of Example 1 in each zooming state.

FIG. 5 shows a diagram of aberrations of the variable magnification optical system of Example 1 in a case where the object at infinity is in focus. FIG. 5 shows a diagram of aberrations of the four states shown in Table 2. In FIG. 5, the first zooming mode and the second zooming mode are simply referred to as "first zooming" and "second zooming", respectively. The uppermost row labeled "First Zooming: Wide, Second Zooming: Wide" in FIG. 5 shows a diagram of aberrations in the wide angle end state in the first zooming mode and the wide angle end state in the second zooming mode. The second row from the top labeled "First Zooming: Tele, Second Zooming: Wide" in FIG. 5 shows a diagram of aberrations in the telephoto end state in the first zooming mode and the wide angle end state in the second zooming mode. The third row from the top labeled "First Zooming: Wide, Second Zooming: Tele" in FIG. 5 shows a diagram of aberrations in the wide angle end state in the first zooming mode and the telephoto end state in the second zooming mode. The bottom row labeled "First Zooming: Tele, Second Zooming: Tele" in FIG. 5 shows a diagram of aberrations in the telephoto end state in the first zooming mode and the telephoto end state in the second zooming mode.

FIG. 5 shows, in order from the left, spherical aberration, astigmatism, distortion, and lateral chromatic aberration. In spherical aberration diagram, aberrations at the d line, the C line, the F line, and the g line are indicated by the solid line, the long dashed line, the short dashed line, and the chain line, respectively. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In lateral chromatic aberration, aberrations at the C line, the F line, and the g line are respectively indicated by the long dashed line, the short dashed line, and the chain line. In spherical aberration diagram, FNo. indicates an F number. In the other aberration diagrams, ω indicates a half angle of view. FIG. 5 shows values of FNo. and ω corresponding to the upper part in the vertical axis of each diagram.

Symbols, meanings, description methods, and illustration methods of the respective data pieces according to Example 1 are the same as those in the following examples unless otherwise specified. Therefore, in the following description, repeated description will be omitted.

EXAMPLE 2

Figure 6:
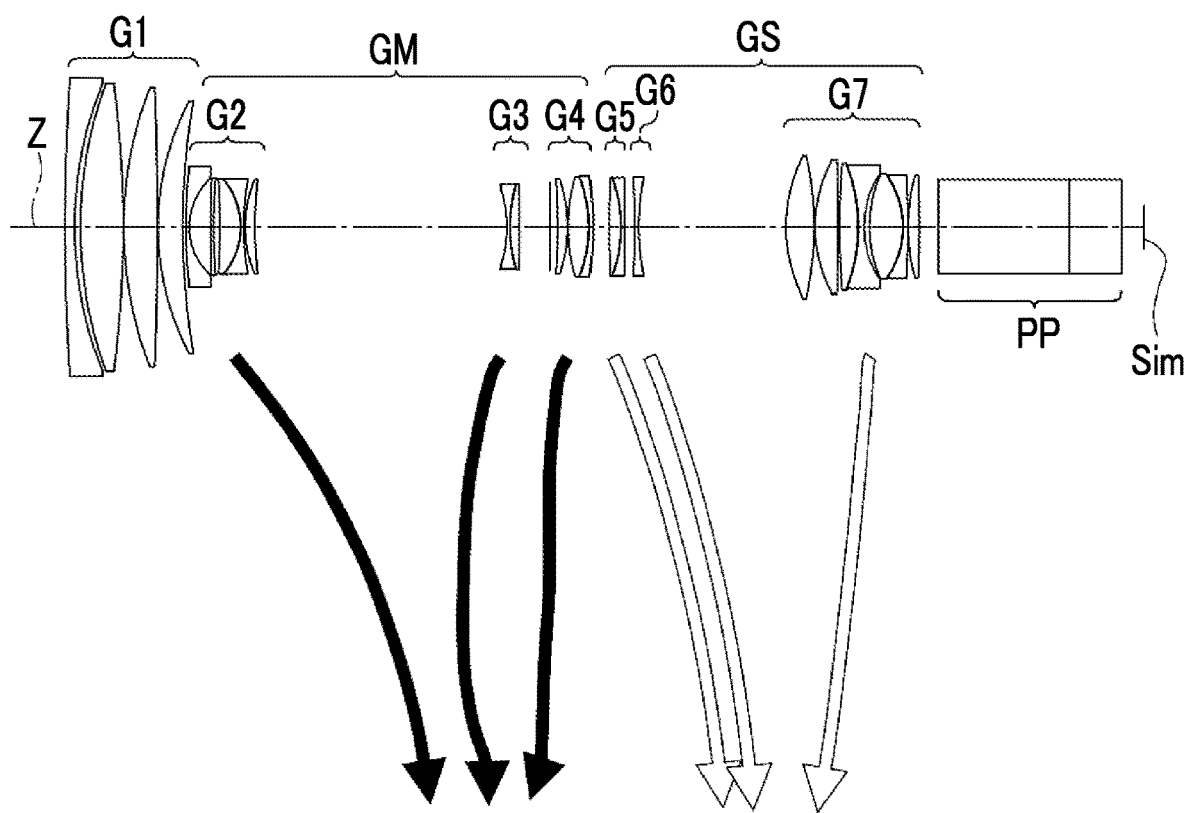
FIG. 6 is a diagram showing a cross-sectional configuration of the variable magnification optical system of Example 2 and movement loci in the first zooming mode and the second zooming mode.

FIG. 6 shows a cross-sectional view of a configuration in which the variable magnification optical system of Example 2 focuses on the object at infinity in the wide angle end state in the first zooming mode and the wide angle end state in the second zooming mode. The variable magnification optical system of Example 2 consists of, in order from the object side to the image side along the optical axis Z, a first lens group G1 having a positive refractive power, a second lens group G2 having a negative refractive power, a third lens group G3 having a negative refractive power, a fourth lens group G4 having a positive refractive power, a fifth lens group G5 having a negative refractive power, a sixth lens group G6 having a negative refractive power, and a seventh lens group G7 having a positive refractive power. The aperture stop St is disposed at a position closest to the object side in the fourth lens group G4.

The first lens group G1 consists of four lenses. The second lens group G2 consists of five lenses. The third lens group G3 consists of two lenses. The fourth lens group G4 consists of an aperture stop St and three lenses. The fifth lens group G5 consists of two lenses. The sixth lens group G6 consists of one lens. The seventh lens group G7 consists of seven lenses.

The intermediate group GM consists of a second lens group G2, a third lens group G3, and a fourth lens group G4. The subsequent group GS consists of a fifth lens group G5, a sixth lens group G6, and a seventh lens group G7. During zooming in the first zooming mode, the second lens group G2, the third lens group G3, and the fourth lens group G4 move along the optical axis Z by changing distances from adjacent lenses thereof in the optical axis direction, and the other lens groups remain stationary with respect to the image plane Sim. During zooming in the second zooming mode, the fifth lens group G5, the sixth lens group G6, and the seventh lens group G7 move along the optical axis Z by changing distances from adjacent lenses thereof in the optical axis direction, and the other lens groups remain stationary with respect to the image plane Sim. In FIG. 6, the black arrow indicates a schematic movement locus during zooming from the wide angle end to the telephoto end under each lens group that moves during zooming in the first zooming mode, and the outlined arrow indicates a schematic movement locus during zooming from the wide angle end to the telephoto end under each lens group that moves during zooming in the second zooming mode.

Figure 7:
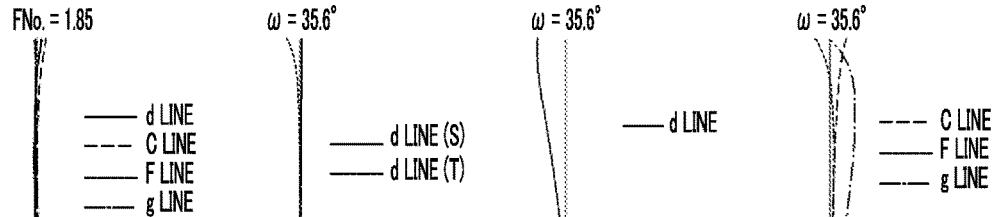
FIG. 7 is a diagram of aberrations of the variable magnification optical system of Example 2 in each zooming state.
Figure 7:
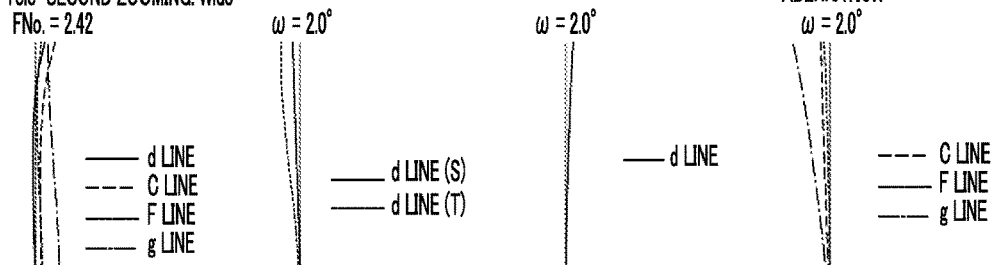
Figure 7:
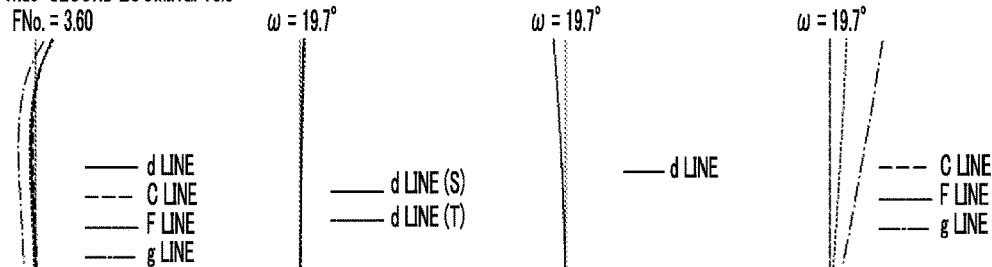
Figure 7:
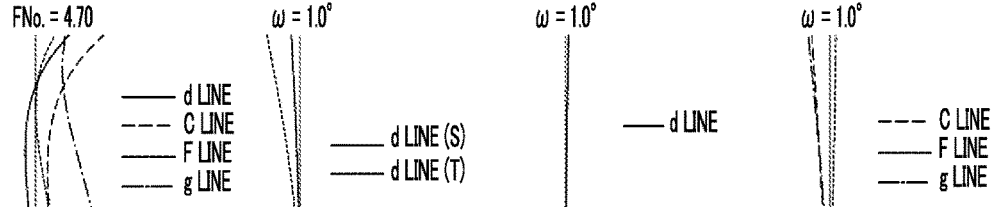

Regarding the variable magnification optical system of Example 2, Tables 3A and 3B show basic lens data, Table 4 shows specification and variable surface distances, and FIG. 7 shows a diagram of aberrations.

TABLE 3A

Example 2

| Sn | R | D | Nd | vd | θgF |
|---|---|---|---|---|---|
| 1 | 628.59217 | 2.400 | 1.89401 | 27.26 | 0.60798 |
| 2 | 101.98970 | 1.500 | | | |
| 3 | 112.51613 | 10.750 | 1.43700 | 95.10 | 0.53364 |
| 4 | −289.61119 | 0.120 | | | |
| 5 | 102.29619 | 8.500 | 1.58439 | 69.99 | 0.54314 |
| 6 | −937.62940 | 0.120 | | | |
| 7 | 71.79249 | 6.284 | 1.76385 | 48.49 | 0.55898 |
| 8 | 201.84861 | DD[8] | | | |
| 9 | 147.86700 | 0.820 | 2.00092 | 28.08 | 0.60282 |
| 10 | 17.96664 | 5.350 | | | |
| 11 | 368.73581 | 0.700 | 1.86684 | 41.32 | 0.56762 |
| 12 | 129.68485 | 1.625 | | | |
| 13 | −191.64301 | 5.285 | 1.88351 | 20.82 | 0.63718 |
| 14 | −20.04606 | 0.740 | 1.89877 | 38.12 | 0.57517 |
| 15 | 72.38176 | 0.375 | | | |
| 16 | 33.73438 | 2.445 | 1.84619 | 22.69 | 0.62833 |
| 17 | 113.41742 | DD[17] | | | |
| 18 | −33.11322 | 0.750 | 1.89134 | 33.52 | 0.58846 |
| 19 | 40.17990 | 2.387 | 1.98595 | 16.49 | 0.66756 |
| 20 | −1334.19518 | DD[20] | | | |
| 21(St) | ∞ | 2.000 | | | |

TABLE 3A-continued

Example 2

| Sn | R | D | Nd | vd | θgF |
|---|---|---|---|---|---|
| 22 | −180.69368 | 2.500 | 1.77776 | 50.22 | 0.55077 |
| 23 | −41.36621 | 0.120 | | | |
| 24 | 46.68943 | 5.420 | 1.61747 | 60.48 | 0.54303 |
| 25 | −37.73235 | 0.920 | 1.95059 | 21.23 | 0.63800 |
| 26 | −102.83640 | DD[26] | | | |

TABLE 3B

Example 2

| Sn | R | D | Nd | vd | θgF |
|---|---|---|---|---|---|
| 27 | 585.81889 | 2.981 | 1.79265 | 25.37 | 0.61654 |
| 28 | −37.57149 | 1.000 | 1.89983 | 38.02 | 0.57543 |
| 29 | −843.56485 | DD[29] | | | |
| 30 | −227.45443 | 1.000 | 1.82779 | 45.22 | 0.55995 |
| 31 | 64.96556 | DD[31] | | | |
| 32 | 42.24025 | 7.100 | 1.52478 | 50.35 | 0.56035 |
| 33 | −84.90100 | 0.221 | | | |
| 34 | 37.40599 | 5.727 | 1.56779 | 42.29 | 0.57510 |
| 35 | −1120.68262 | 0.477 | | | |
| 36 | 210.99737 | 4.643 | 1.61315 | 60.65 | 0.54298 |
| 37 | −46.85198 | 1.520 | 1.69984 | 37.14 | 0.58335 |
| 38 | 24.80836 | 1.534 | | | |
| 39 | 35.38176 | 8.410 | 1.53355 | 76.62 | 0.53992 |
| 40 | −24.58340 | 1.200 | 1.89620 | 37.08 | 0.57813 |
| 41 | −281.70662 | 0.120 | | | |
| 42 | 52.59357 | 2.806 | 1.51600 | 64.38 | 0.53517 |
| 43 | −377.05382 | DD[43] | | | |
| 44 | ∞ | 33.000 | 1.60859 | 46.44 | 0.56664 |
| 45 | ∞ | 13.200 | 1.51633 | 64.05 | 0.53463 |
| 46 | ∞ | 5.510 | | | |

TABLE 4

Example 2

| | Wide | Tele | Wide | Tele |
|---|---|---|---|---|
| First Zooming Mode State | Wide | Wide | Tele | Tele |
| Second Zooming Mode State | | | | |
| Zoom Ratio of First Zooming Mode | 1.0 | 19.2 | 1.0 | 19.2 |
| Zoom Ratio of Second Zooming Mode | 1.0 | 1.0 | 1.94 | 1.94 |
| f | 8.280 | 159.382 | 16.054 | 309.047 |
| FNo. | 1.85 | 2.42 | 3.60 | 4.70 |
| 2ω(°) | 71.2 | 4.0 | 39.4 | 2.0 |
| DD[8] | 0.833 | 59.848 | 0.833 | 59.848 |
| DD[17] | 63.681 | 2.900 | 63.681 | 2.900 |
| DD[20] | 7.626 | 0.866 | 7.626 | 0.866 |
| DD[26] | 4.003 | 12.529 | 28.828 | 37.354 |
| DD[29] | 2.488 | 2.488 | 1.238 | 1.238 |
| DD[31] | 37.095 | 37.095 | 1.075 | 1.075 |
| DD[43] | 4.810 | 4.810 | 17.252 | 17.252 |

EXAMPLE 3

Figure 8:
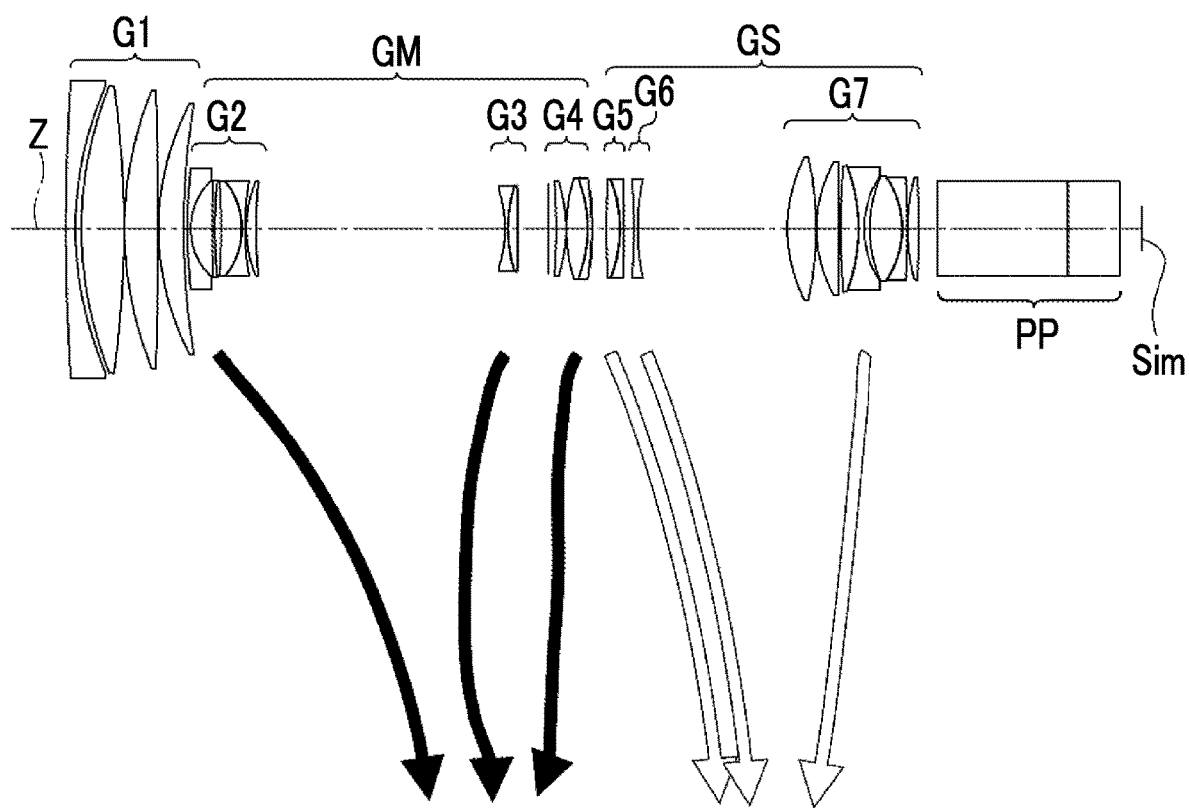
FIG. 8 is a diagram showing a cross-sectional configuration of the variable magnification optical system of Example 3 and movement loci in the first zooming mode and the second zooming mode.

FIG. 8 shows a cross-sectional view of a configuration in which the variable magnification optical system of Example 3 focuses on the object at infinity in the wide angle end state in the first zooming mode and the wide angle end state in the second zooming mode. The variable magnification optical system of Example 3 consists of, in order from the object side to the image side along the optical axis Z, a first lens group G1 having a positive refractive power, a second lens group G2 having a negative refractive power, a third lens group G3 having a negative refractive power, a fourth lens group G4 having a positive refractive power, a fifth lens group G5 having a positive refractive power, a sixth lens group G6 having a negative refractive power, and a seventh lens group G7 having a positive refractive power. The aperture stop St is disposed at a position closest to the object side in the fourth lens group G4.

The first lens group G1 consists of four lenses. The second lens group G2 consists of five lenses. The third lens group G3 consists of two lenses. The fourth lens group G4 consists of an aperture stop St and three lenses. The fifth lens group G5 consists of two lenses. The sixth lens group G6 consists of one lens. The seventh lens group G7 consists of seven lenses.

The intermediate group GM consists of a second lens group G2, a third lens group G3, and a fourth lens group G4. The subsequent group GS consists of a fifth lens group G5, a sixth lens group G6, and a seventh lens group G7. During zooming in the first zooming mode, the second lens group G2, the third lens group G3, and the fourth lens group G4 move along the optical axis Z by changing distances from adjacent lenses thereof in the optical axis direction, and the other lens groups remain stationary with respect to the image plane Sim. During zooming in the second zooming mode, the fifth lens group G5, the sixth lens group G6, and the seventh lens group G7 move along the optical axis Z by changing distances from adjacent lenses thereof in the optical axis direction, and the other lens groups remain stationary with respect to the image plane Sim. In FIG. 8, the black arrow indicates a schematic movement locus during zooming from the wide angle end to the telephoto end under each lens group that moves during zooming in the first zooming mode, and the outlined arrow indicates a schematic movement locus during zooming from the wide angle end to the telephoto end under each lens group that moves during zooming in the second zooming mode.

Figure 9:
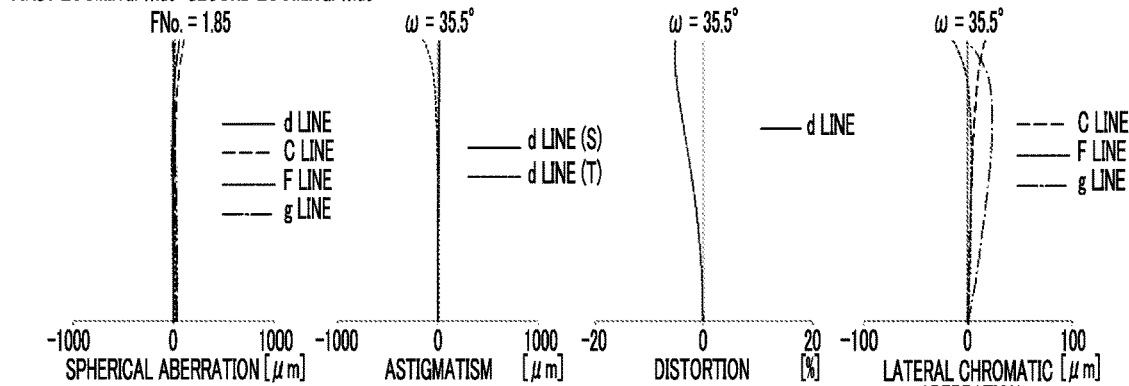
FIG. 9 is a diagram of aberrations of the variable magnification optical system of Example 3 in each zooming state.
Figure 9:
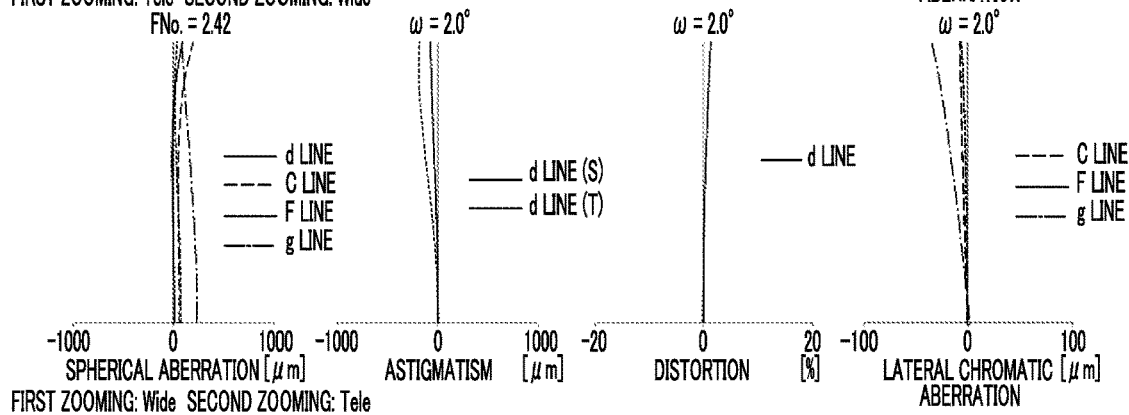
Figure 9:
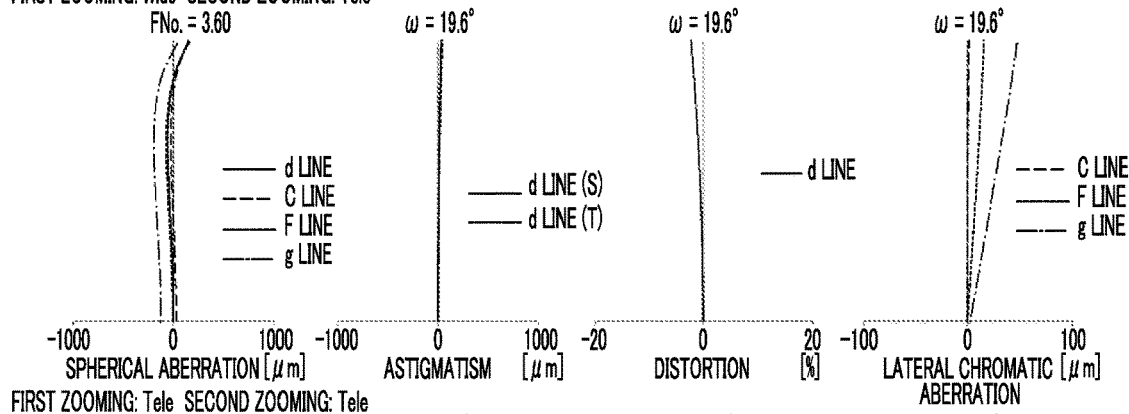
Figure 9:
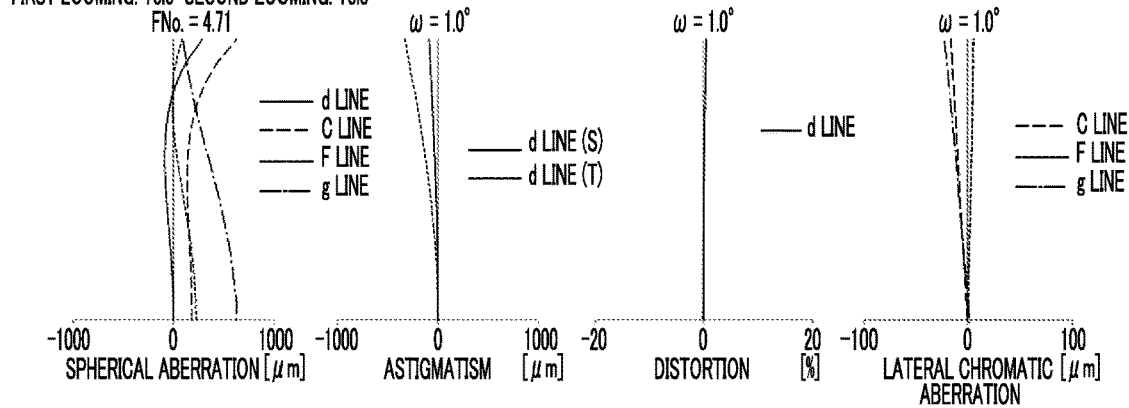

Regarding the variable magnification optical system of Example 3, Tables 5A and 5B show basic lens data, Table 6 shows specification and variable surface distances, and FIG. 9 shows a diagram of aberrations.

TABLE 5A

Example 3

| Sn | R | D | Nd | vd | θgF |
|---|---|---|---|---|---|
| 1 | 629.91407 | 2.400 | 1.87554 | 28.29 | 0.60512 |
| 2 | 95.76086 | 1.500 | | | |
| 3 | 102.90631 | 10.750 | 1.43700 | 95.10 | 0.53364 |
| 4 | −279.22483 | 0.120 | | | |
| 5 | 98.72129 | 8.500 | 1.57897 | 70.86 | 0.54292 |
| 6 | −1129.41148 | 0.120 | | | |
| 7 | 72.02762 | 6.324 | 1.76385 | 48.49 | 0.55898 |
| 8 | 207.06809 | DD[8] | | | |
| 9 | 149.19970 | 0.820 | 2.00093 | 28.23 | 0.60233 |
| 10 | 17.83852 | 5.350 | | | |
| 11 | 364.44845 | 0.700 | 1.89999 | 35.37 | 0.58290 |
| 12 | 128.84303 | 1.625 | | | |
| 13 | −196.89463 | 5.285 | 1.88593 | 20.70 | 0.63777 |
| 14 | −20.03927 | 0.740 | 1.90001 | 38.00 | 0.57547 |
| 15 | 71.66943 | 0.375 | | | |
| 16 | 33.52305 | 2.386 | 1.84528 | 22.74 | 0.62809 |
| 17 | 111.98802 | DD[17] | | | |
| 18 | −32.74201 | 0.750 | 1.88817 | 33.79 | 0.58777 |
| 19 | 38.79900 | 2.370 | 1.98595 | 16.49 | 0.66756 |
| 20 | −2247.22674 | DD[20] | | | |
| 21(St) | ∞ | 2.000 | | | |
| 22 | −181.54452 | 2.500 | 1.77638 | 46.58 | 0.55881 |
| 23 | −41.19073 | 0.120 | | | |
| 24 | 47.23074 | 5.472 | 1.61899 | 60.42 | 0.54305 |
| 25 | −37.43566 | 0.920 | 1.95153 | 20.52 | 0.64147 |
| 26 | −100.89222 | DD[26] | | | |

TABLE 5B

Example 3

| Sn | R | D | Nd | vd | θgF |
|---|---|---|---|---|---|
| 27 | 304.87441 | 3.326 | 1.79846 | 25.08 | 0.61725 |
| 28 | −37.65056 | 1.000 | 1.88667 | 39.33 | 0.57217 |
| 29 | −478.89168 | DD[29] | | | |
| 30 | −175.53388 | 1.000 | 1.89955 | 38.04 | 0.57536 |
| 31 | 65.35907 | DD[31] | | | |
| 32 | 42.11955 | 7.313 | 1.54876 | 54.47 | 0.55161 |
| 33 | −87.81197 | 0.130 | | | |
| 34 | 37.25029 | 5.640 | 1.55691 | 44.33 | 0.57128 |
| 35 | −1140.95701 | 0.395 | | | |
| 36 | 197.88690 | 4.561 | 1.62153 | 60.33 | 0.54307 |
| 37 | −46.76388 | 1.431 | 1.71169 | 38.73 | 0.57864 |
| 38 | 24.82547 | 1.534 | | | |
| 39 | 35.24935 | 8.246 | 1.53051 | 77.03 | 0.53973 |
| 40 | −24.45944 | 1.200 | 1.89715 | 38.29 | 0.57477 |
| 41 | −308.80916 | 0.120 | | | |
| 42 | 53.51590 | 2.760 | 1.53670 | 58.51 | 0.54509 |
| 43 | −407.92929 | DD[43] | | | |
| 44 | ∞ | 33.000 | 1.60859 | 46.44 | 0.56664 |
| 45 | ∞ | 13.200 | 1.51633 | 64.05 | 0.53463 |
| 46 | ∞ | 5.511 | | | |

TABLE 6

Example 3

| | | | | |
|---|---|---|---|---|
| First Zooming Mode State | Wide | Tele | Wide | Tele |
| Second Zooming Mode State | Wide | Wide | Tele | Tele |
| Zoom Ratio of First Zooming Mode | 1.0 | 19.2 | 1.0 | 19.2 |
| Zoom Ratio of Second Zooming Mode | 1.0 | 1.0 | 1.94 | 1.94 |
| f | 8.276 | 159.311 | 16.051 | 308.980 |
| FNo. | 1.85 | 2.42 | 3.60 | 4.71 |
| 2ω(°) | 71.0 | 4.0 | 39.2 | 2.0 |
| DD[8] | 0.989 | 59.176 | 0.989 | 59.176 |
| DD[17] | 63.137 | 3.001 | 63.137 | 3.001 |
| DD[20] | 7.800 | 1.130 | 7.800 | 1.130 |
| DD[26] | 3.651 | 12.270 | 29.098 | 37.717 |
| DD[29] | 2.541 | 2.541 | 1.291 | 1.291 |
| DD[31] | 37.792 | 37.792 | 1.235 | 1.235 |
| DD[43] | 4.749 | 4.749 | 17.112 | 17.112 |

EXAMPLE 4

Figure 10:
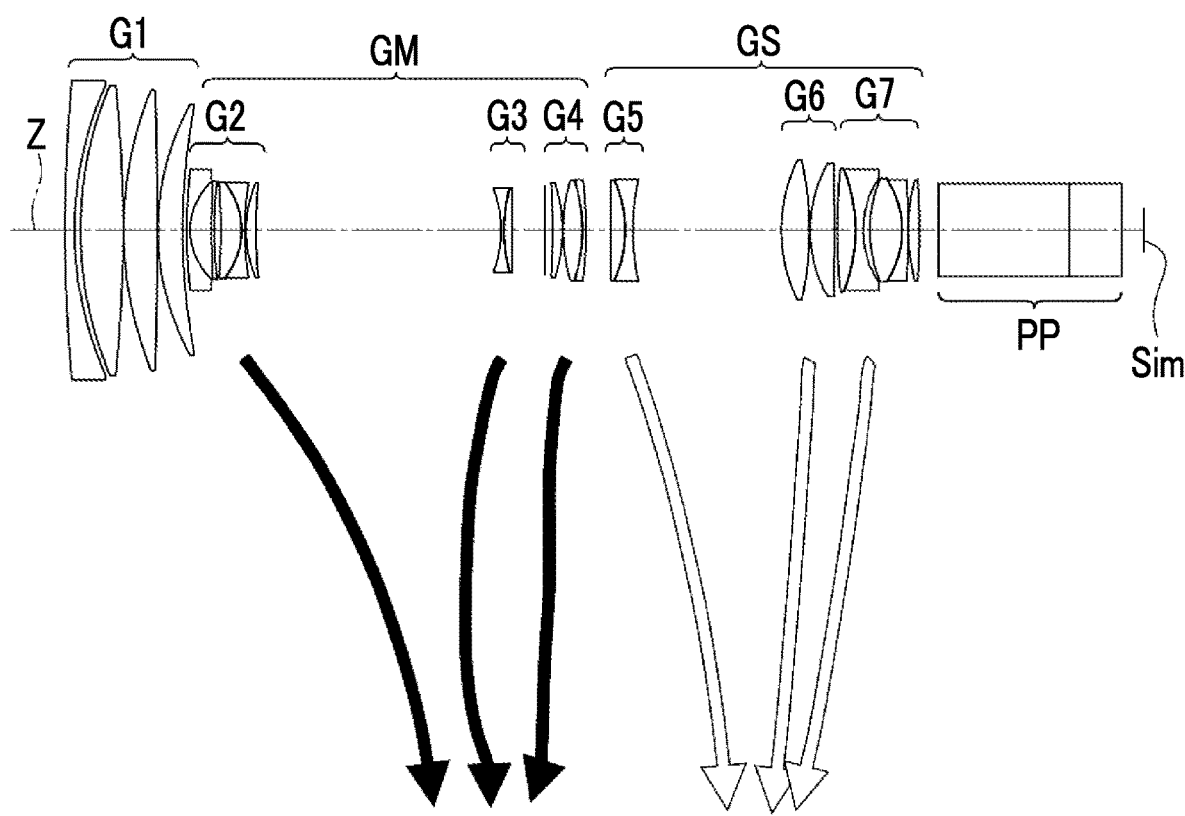
FIG. 10 is a diagram showing a cross-sectional configuration of the variable magnification optical system of Example 4 and movement loci in the first zooming mode and the second zooming mode.

FIG. 10 shows a cross-sectional view of a configuration in which the variable magnification optical system of Example 4 focuses on the object at infinity in the wide angle end state in the first zooming mode and the wide angle end state in the second zooming mode. The variable magnification optical system of Example 4 consists of, in order from the object side to the image side along the optical axis Z, a first lens group G1 having a positive refractive power, a second lens group G2 having a negative refractive power, a third lens group G3 having a negative refractive power, a fourth lens group G4 having a positive refractive power, a fifth lens group G5 having a negative refractive power, a sixth lens group G6 having a positive refractive power, and a seventh lens group G7 having a negative refractive power. The aperture stop St is disposed at a position closest to the object side in the fourth lens group G4.

The first lens group G1 consists of four lenses. The second lens group G2 consists of five lenses. The third lens group G3 consists of two lenses. The fourth lens group G4 consists of an aperture stop St and three lenses. The fifth lens group G5 consists of two lenses. The sixth lens group G6 consists of two lenses. The seventh lens group G7 consists of five lenses.

The intermediate group GM consists of a second lens group G2, a third lens group G3, and a fourth lens group G4. The subsequent group GS consists of a fifth lens group G5, a sixth lens group G6, and a seventh lens group G7. During zooming in the first zooming mode, the second lens group G2, the third lens group G3, and the fourth lens group G4 move along the optical axis Z by changing distances from adjacent lenses thereof in the optical axis direction, and the other lens groups remain stationary with respect to the image plane Sim. During zooming in the second zooming mode, the fifth lens group G5, the sixth lens group G6, and the seventh lens group G7 move along the optical axis Z by changing distances from adjacent lenses thereof in the optical axis direction, and the other lens groups remain stationary with respect to the image plane Sim. In FIG. 10, the black arrow indicates a schematic movement locus during zooming from the wide angle end to the telephoto end under each lens group that moves during zooming in the first zooming mode, and the outlined arrow indicates a schematic movement locus during zooming from the wide angle end to the telephoto end under each lens group that moves during zooming in the second zooming mode.

Figure 11:
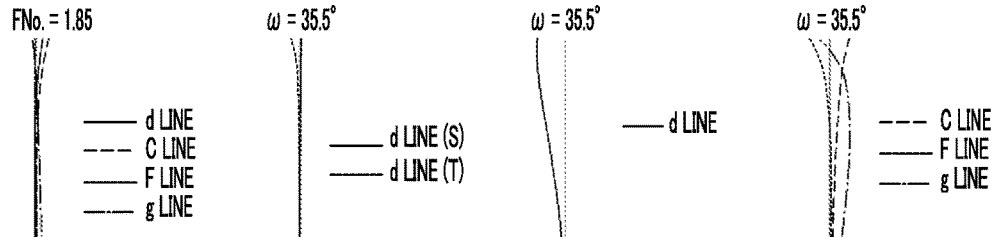
FIG. 11 is a diagram of aberrations of the variable magnification optical system of Example 4 in each zooming state.

Regarding the variable magnification optical system of Example 4, Tables 7A and 7B show basic lens data, Table 8 shows specification and variable surface distances, and FIG. 11 shows a diagram of aberrations.

TABLE 7A

Example 4

| Sn | R | D | Nd | vd | θgF |
|---|---|---|---|---|---|
| 1 | 445.83876 | 2.400 | 1.87273 | 27.42 | 0.60797 |
| 2 | 95.00059 | 1.500 | | | |
| 3 | 99.65234 | 10.750 | 1.43700 | 95.10 | 0.53364 |
| 4 | −365.94099 | 0.120 | | | |
| 5 | 99.17873 | 8.500 | 1.58496 | 69.89 | 0.54315 |
| 6 | −1122.97636 | 0.120 | | | |
| 7 | 69.41082 | 6.250 | 1.76385 | 48.49 | 0.55898 |
| 8 | 175.84744 | DD[8] | | | |
| 9 | 156.11514 | 0.820 | 2.00101 | 29.13 | 0.59952 |
| 10 | 17.80824 | 5.350 | | | |
| 11 | 331.75632 | 0.700 | 1.86234 | 41.77 | 0.56664 |
| 12 | 112.69595 | 1.625 | | | |
| 13 | −202.83158 | 5.285 | 1.89891 | 20.05 | 0.64156 |
| 14 | −20.29817 | 0.740 | 1.90000 | 38.00 | 0.57547 |
| 15 | 74.58883 | 0.375 | | | |
| 16 | 33.02673 | 2.429 | 1.79595 | 26.65 | 0.61247 |
| 17 | 115.19140 | DD[17] | | | |
| 18 | −31.66296 | 0.750 | 1.89345 | 33.34 | 0.58892 |
| 19 | 42.81941 | 2.050 | 1.98592 | 16.49 | 0.66756 |
| 20 | −620.05314 | DD[20] | | | |
| 21(St) | ∞ | 2.000 | | | |
| 22 | −180.63010 | 2.500 | 1.78150 | 44.59 | 0.56292 |
| 23 | −39.41709 | 0.120 | | | |
| 24 | 46.24126 | 5.088 | 1.56958 | 62.32 | 0.54115 |
| 25 | −39.33897 | 0.920 | 1.95209 | 19.18 | 0.64935 |
| 26 | −101.14186 | DD[26] | | | |

TABLE 7B

Example 4

| Sn | R | D | Nd | vd | θgF |
|---|---|---|---|---|---|
| 27 | −8083.72763 | 3.603 | 1.80063 | 24.97 | 0.61750 |
| 28 | −32.05378 | 2.000 | 1.89051 | 38.95 | 0.57312 |
| 29 | 66.06661 | DD[29] | | | |
| 30 | 43.39054 | 7.000 | 1.53821 | 47.84 | 0.56487 |
| 31 | −87.98525 | 0.194 | | | |
| 32 | 35.79688 | 6.135 | 1.53587 | 51.58 | 0.55749 |
| 33 | −1875.42274 | DD[33] | | | |

TABLE 7B-continued

Example 4

| Sn | R | D | Nd | vd | θgF |
|---|---|---|---|---|---|
| 34 | 164.35584 | 4.554 | 1.59319 | 61.42 | 0.54245 |
| 35 | −44.62962 | 1.974 | 1.69244 | 42.80 | 0.56982 |
| 36 | 24.10721 | 1.835 | | | |
| 37 | 35.73223 | 8.130 | 1.53141 | 76.91 | 0.53979 |
| 38 | −25.04360 | 1.434 | 1.89999 | 32.84 | 0.59018 |
| 39 | −327.19439 | 0.120 | | | |
| 40 | 52.14169 | 2.807 | 1.51600 | 64.38 | 0.53517 |
| 41 | −226.03301 | DD[41] | | | |
| 42 | ∞ | 33.000 | 1.60859 | 46.44 | 0.56664 |
| 43 | ∞ | 13.200 | 1.51633 | 64.05 | 0.53463 |
| 44 | ∞ | 5.504 | | | |

TABLE 8

Example 4

| | | | | |
|---|---|---|---|---|
| First Zooming Mode State | Wide | Tele | Wide | Tele |
| Second Zooming Mode State | Wide | Wide | Tele | Tele |
| Zoom Ratio of First Zooming Mode | 1.0 | 19.2 | 1.0 | 19.2 |
| Zoom Ratio of Second Zooming Mode | 1.0 | 1.0 | 1.94 | 1.94 |
| f | 8.281 | 159.402 | 16.057 | 309.094 |
| FNo. | 1.85 | 2.40 | 3.60 | 4.65 |
| 2ω(°) | 71.0 | 4.0 | 39.2 | 2.0 |
| DD[8] | 1.102 | 58.633 | 1.102 | 58.633 |
| DD[17] | 62.007 | 3.009 | 62.007 | 3.009 |
| DD[20] | 8.217 | 1.126 | 8.217 | 1.126 |
| DD[26] | 5.983 | 14.541 | 29.478 | 38.035 |
| DD[29] | 37.392 | 37.392 | 1.113 | 1.113 |
| DD[33] | 0.750 | 0.750 | 2.145 | 2.145 |
| DD[41] | 4.775 | 4.775 | 16.165 | 16.165 |

EXAMPLE 5

Figure 12:
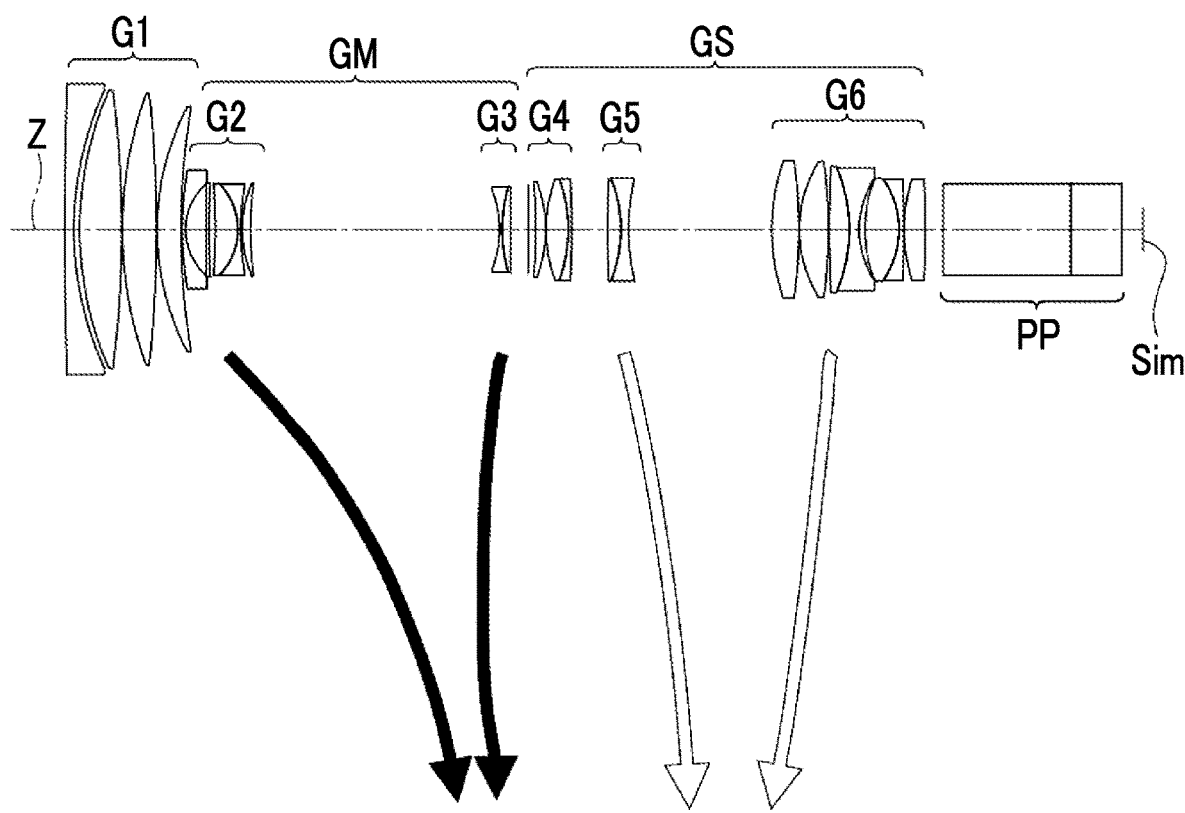
FIG. 12 is a diagram showing a cross-sectional configuration of the variable magnification optical system of Example 5 and movement loci in the first zooming mode and the second zooming mode.

FIG. 12 shows a cross-sectional view of a configuration in which the variable magnification optical system of Example 5 focuses on the object at infinity in the wide angle end state in the first zooming mode and the wide angle end state in the second zooming mode. The variable magnification optical system of Example 5 consists of, in order from the object side to the image side along the optical axis Z, a first lens group G1 having a positive refractive power, a second lens group G2 having a negative refractive power, a third lens group G3 having a negative refractive power, a fourth lens group G4 having a positive refractive power, a fifth lens group G5 having a negative refractive power, and a sixth lens group G6 having a positive refractive power. The aperture stop St is disposed at a position closest to the object side in the fourth lens group G4.

The first lens group G1 consists of four lenses. The second lens group G2 consists of five lenses. The third lens group G3 consists of two lenses. The fourth lens group G4 consists of an aperture stop St and three lenses. The fifth lens group G5 consists of two lenses. The sixth lens group G6 consists of seven lenses.

The intermediate group GM consists of a second lens group G2 and a third lens group G3. The subsequent group GS consists of a fourth lens group G4, a fifth lens group G5, and a sixth lens group G6. During zooming in the first zooming mode, the second lens group G2 and the third lens group G3 move along the optical axis Z by changing distances from adjacent lenses thereof in the optical axis direction, and the other lens groups remain stationary with respect to the image plane Sim. During zooming in the second zooming mode, the fifth lens group G5 and the sixth lens group G6 move along the optical axis Z by changing distances from adjacent lenses thereof in the optical axis direction, and the other lens groups remain stationary with respect to the image plane Sim. In FIG. 12, the black arrow indicates a schematic movement locus during zooming from the wide angle end to the telephoto end under each lens group that moves during zooming in the first zooming mode, and the outlined arrow indicates a schematic movement locus during zooming from the wide angle end to the telephoto end under each lens group that moves during zooming in the second zooming mode.

Figure 13:
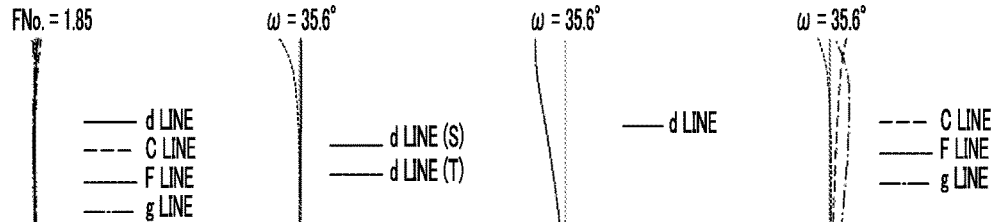
FIG. 13 is a diagram of aberrations of the variable magnification optical system of Example 5 in each zooming state.
Figure 13:
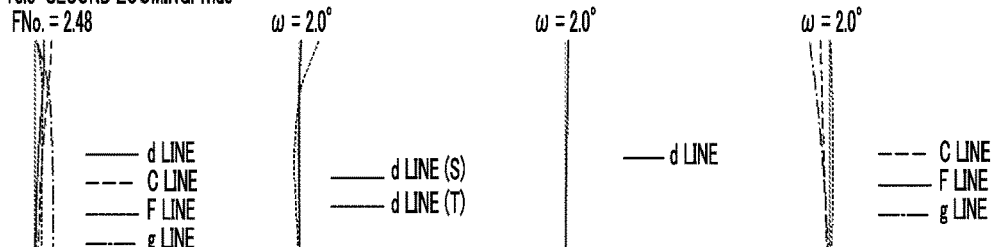
Figure 13:
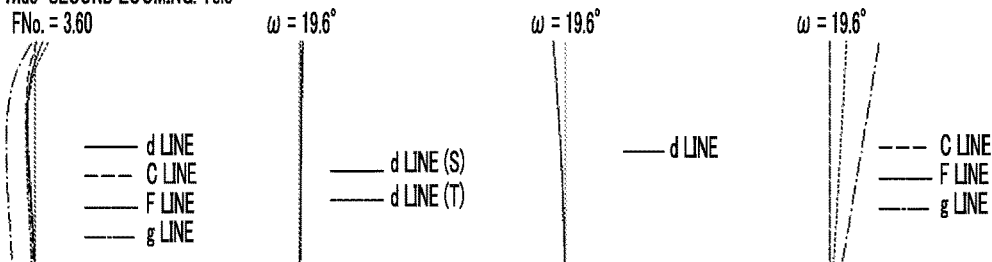
Figure 13:
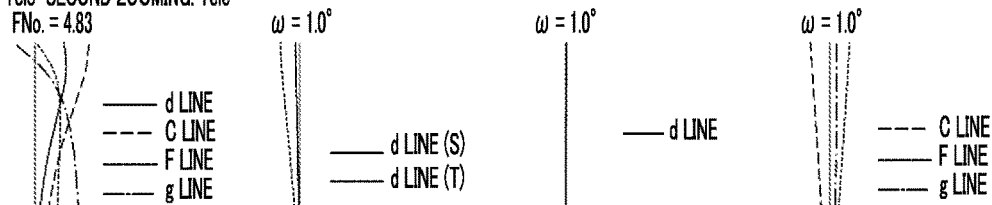

Regarding the variable magnification optical system of Example 5, Tables 9A and 9B show basic lens data, Table 10 shows specification and variable surface distances, and FIG. 13 shows a diagram of aberrations.

TABLE 9A

Example 5

| Sn | R | D | Nd | vd | θgF |
|---|---|---|---|---|---|
| 1 | 1252.34108 | 2.400 | 1.90001 | 32.38 | 0.59151 |
| 2 | 91.37726 | 1.500 | | | |
| 3 | 95.35696 | 10.851 | 1.43700 | 95.10 | 0.53364 |
| 4 | −292.99158 | 0.120 | | | |
| 5 | 108.15578 | 8.841 | 1.55032 | 75.50 | 0.54170 |
| 6 | −349.82448 | 0.120 | | | |
| 7 | 71.15239 | 6.250 | 1.76385 | 48.49 | 0.55898 |
| 8 | 203.21609 | DD[8] | | | |
| 9 | 93.88671 | 0.820 | 2.00085 | 27.34 | 0.60516 |
| 10 | 16.89384 | 5.350 | | | |
| 11 | −3231.04555 | 0.700 | 1.90001 | 38.00 | 0.57547 |
| 12 | 244.69949 | 1.625 | | | |
| 13 | −172.34249 | 5.896 | 1.85169 | 22.42 | 0.62961 |
| 14 | −17.85715 | 0.740 | 1.90001 | 38.00 | 0.57547 |
| 15 | 71.23367 | 0.375 | | | |
| 16 | 32.98529 | 2.089 | 1.90000 | 20.00 | 0.64193 |
| 17 | 91.25100 | DD[17] | | | |
| 18 | −31.52330 | 0.750 | 1.87388 | 35.44 | 0.58343 |
| 19 | 43.99350 | 2.050 | 1.97818 | 16.78 | 0.67199 |
| 20 | −8722.14300 | DD[20] | | | |

TABLE 9B

Example 5

| Sn | R | D | Nd | vd | θgF |
|---|---|---|---|---|---|
| 21(St) | ∞ | 2.000 | | | |
| 22 | −159.62068 | 2.531 | 1.82808 | 35.67 | 0.58397 |
| 23 | −37.47877 | 0.120 | | | |
| 24 | 40.81868 | 5.725 | 1.61606 | 60.54 | 0.54302 |
| 25 | −39.96623 | 0.920 | 1.88699 | 21.06 | 0.63636 |
| 26 | −230.87626 | DD[26] | | | |
| 27 | 298.74902 | 3.475 | 1.78112 | 25.94 | 0.61504 |
| 28 | −37.23092 | 2.000 | 1.90001 | 38.00 | 0.57547 |
| 29 | 60.57754 | DD[29] | | | |
| 30 | 56.43348 | 7.000 | 1.54577 | 46.90 | 0.56647 |
| 31 | −133.61464 | 0.120 | | | |
| 32 | 35.29106 | 7.500 | 1.61045 | 60.75 | 0.54293 |
| 33 | −145.35997 | 0.275 | | | |
| 34 | 345.29493 | 5.151 | 1.64584 | 59.21 | 0.54288 |
| 35 | −43.52582 | 2.500 | 1.73840 | 41.85 | 0.57046 |
| 36 | 24.29801 | 1.548 | | | |
| 37 | 35.31089 | 8.703 | 1.53302 | 76.69 | 0.53989 |
| 38 | −24.39445 | 1.202 | 1.87998 | 40.00 | 0.57051 |
| 39 | −507.74657 | 0.120 | | | |
| 40 | 46.33116 | 5.443 | 1.57692 | 62.04 | 0.54164 |
| 41 | −323.71935 | DD[41] | | | |
| 42 | ∞ | 33.000 | 1.60859 | 46.44 | 0.56664 |
| 43 | ∞ | 13.200 | 1.51633 | 64.05 | 0.53463 |
| 44 | ∞ | 5.510 | | | |

TABLE 10

| Example 5 | | | | |
|---|---|---|---|---|
| First Zooming Mode State | Wide | Tele | Wide | Tele |
| Second Zooming Mode State | Wide | Wide | Tele | Tele |
| Zoom Ratio of First Zooming Mode | 1.0 | 19.2 | 1.0 | 19.2 |
| Zoom Ratio of Second Zooming Mode | 1.0 | 1.0 | 1.94 | 1.94 |
| f | 8.297 | 159.719 | 16.094 | 309.814 |
| FNo. | 1.85 | 2.48 | 3.60 | 4.83 |
| 2ω(°) | 71.2 | 4.0 | 39.2 | 2.0 |
| DD[8] | 0.346 | 64.550 | 0.346 | 64.550 |
| DD[17] | 64.265 | 4.060 | 64.265 | 4.060 |
| DD[20] | 4.642 | 0.643 | 4.642 | 0.643 |
| DD[26] | 9.404 | 9.404 | 27.504 | 27.504 |
| DD[29] | 37.016 | 37.016 | 1.009 | 1.009 |
| DD[41] | 4.647 | 4.647 | 22.558 | 22.558 |

EXAMPLE 6

Figure 14:
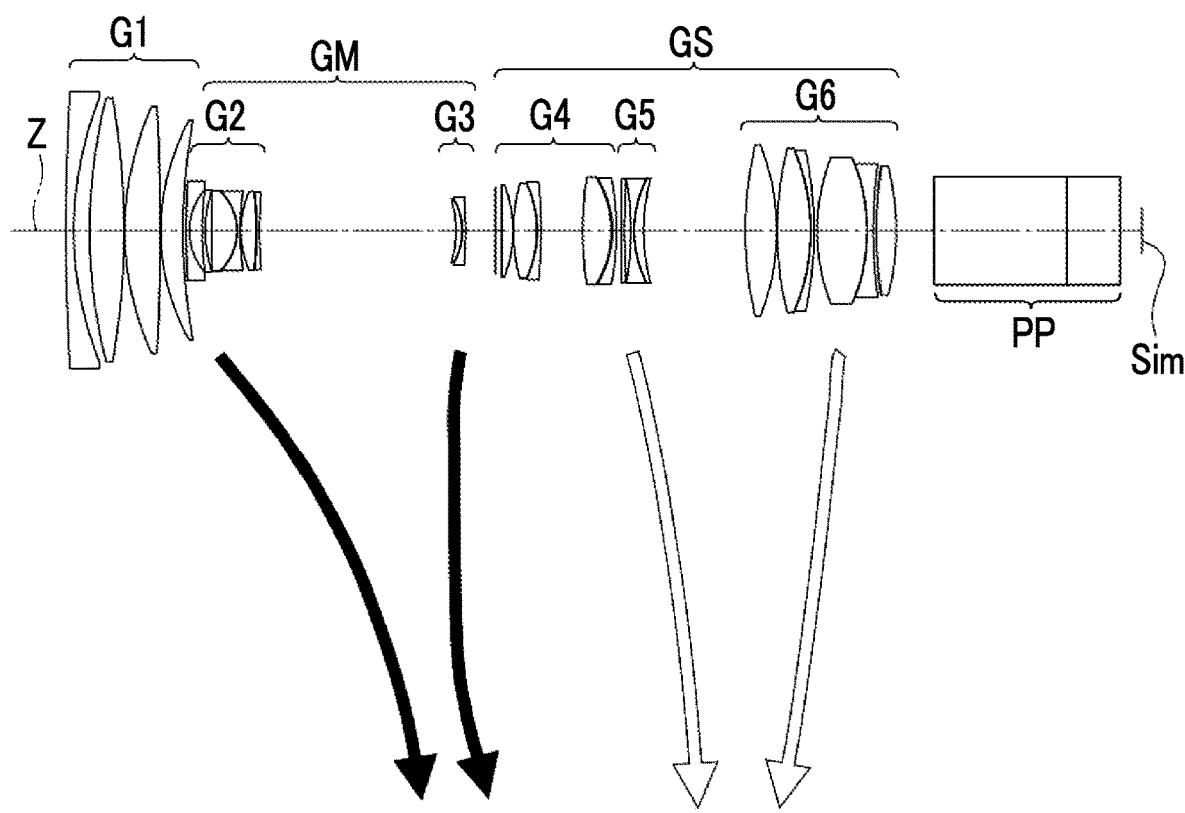
FIG. 14 is a diagram showing a cross-sectional configuration of the variable magnification optical system of Example 6 and movement loci in the first zooming mode and the second zooming mode.

FIG. 14 shows a cross-sectional view of a configuration in which the variable magnification optical system of Example 6 focuses on the object at infinity in the wide angle end state in the first zooming mode and the wide angle end state in the second zooming mode. The variable magnification optical system of Example 6 consists of, in order from the object side to the image side along the optical axis Z, a first lens group G1 having a positive refractive power, a second lens group G2 having a negative refractive power, a third lens group G3 having a negative refractive power, a fourth lens group G4 having a positive refractive power, a fifth lens group G5 having a negative refractive power, and a sixth lens group G6 having a positive refractive power. The aperture stop St is disposed at a position closest to the object side in the fourth lens group G4.

The first lens group G1 consists of four lenses. The second lens group G2 consists of six lenses. The third lens group G3 consists of two lenses. The fourth lens group G4 consists of an aperture stop St and five lenses. The fifth lens group G5 consists of three lenses. The sixth lens group G6 consists of six lenses.

The intermediate group GM consists of a second lens group G2 and a third lens group G3. The subsequent group GS consists of a fourth lens group G4, a fifth lens group G5, and a sixth lens group G6. During zooming in the first zooming mode, the second lens group G2 and the third lens group G3 move along the optical axis Z by changing distances from adjacent lenses thereof in the optical axis direction, and the other lens groups remain stationary with respect to the image plane Sim. During zooming in the second zooming mode, the fifth lens group G5 and the sixth lens group G6 move along the optical axis Z by changing distances from adjacent lenses thereof in the optical axis direction, and the other lens groups remain stationary with respect to the image plane Sim. In FIG. 14, the black arrow indicates a schematic movement locus during zooming from the wide angle end to the telephoto end under each lens group that moves during zooming in the first zooming mode, and the outlined arrow indicates a schematic movement locus during zooming from the wide angle end to the telephoto end under each lens group that moves during zooming in the second zooming mode.

Figure 15:
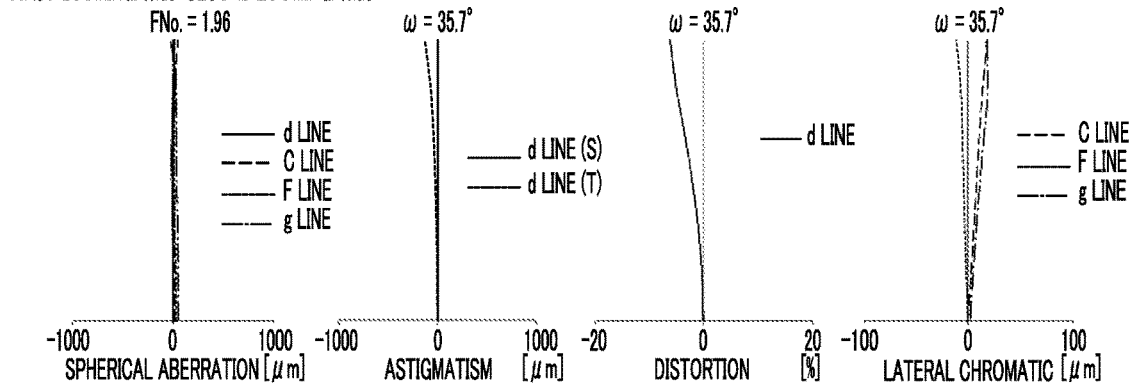
FIG. 15 is a diagram of aberrations of the variable magnification optical system of Example 6 in each zooming state.
Figure 15:
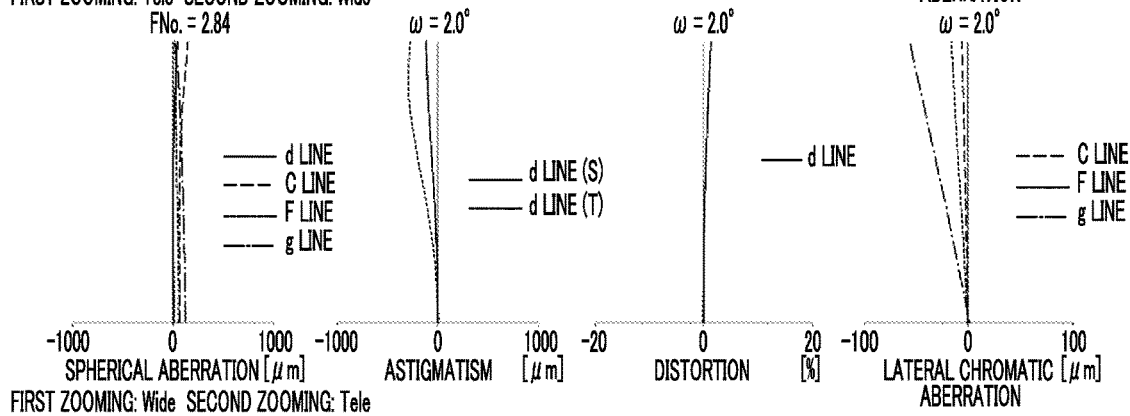
Figure 15:
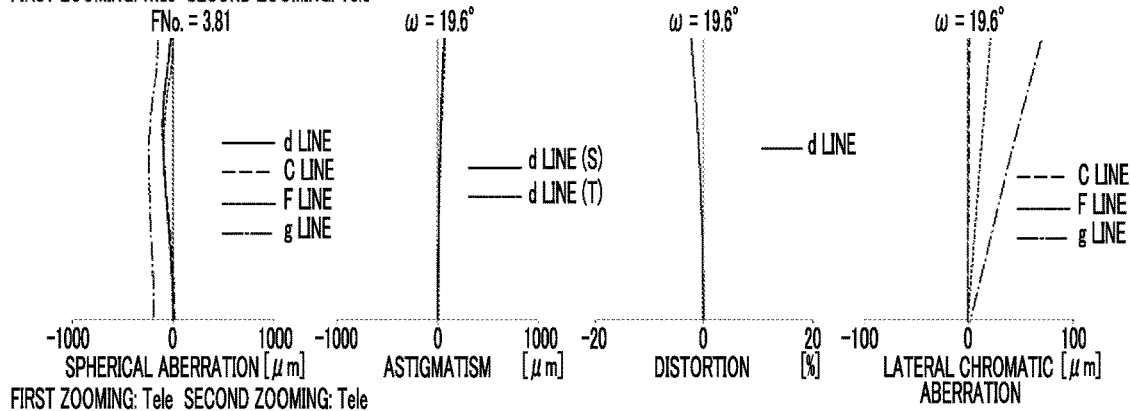
Figure 15:
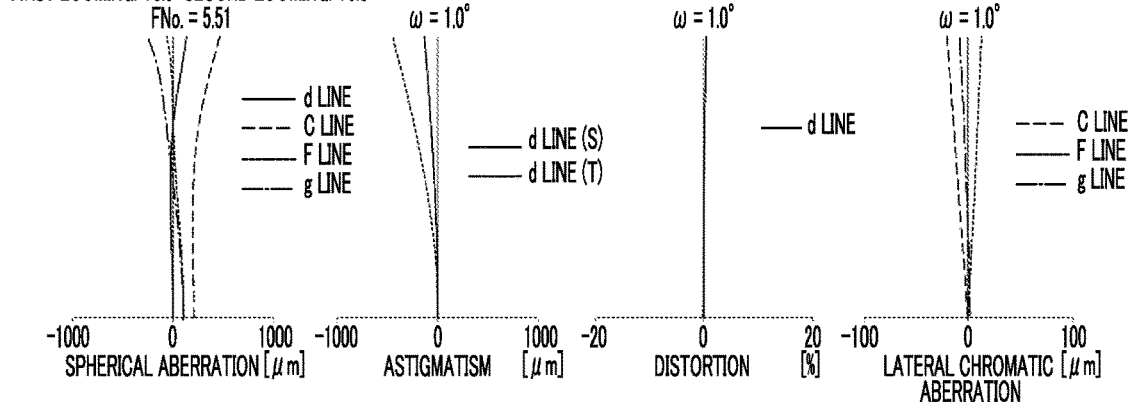

Regarding the variable magnification optical system of Example 6, Tables 11A and 11B show basic lens data, Table 12 shows specification and variable surface distances, and FIG. 15 shows a diagram of aberrations.

TABLE 11A

Example 6

| Sn | R | D | Nd | vd | θgF |
|---|---|---|---|---|---|
| 1 | 582.77490 | 2.000 | 1.80518 | 25.42 | 0.61616 |
| 2 | 93.75197 | 3.879 | | | |
| 3 | 140.50541 | 8.598 | 1.43875 | 94.94 | 0.53433 |
| 4 | −200.93781 | 0.120 | | | |
| 5 | 77.70193 | 8.885 | 1.49700 | 81.54 | 0.53748 |
| 6 | −643.56092 | 0.120 | | | |
| 7 | 60.02602 | 5.488 | 1.76385 | 48.49 | 0.55898 |
| 8 | 157.78650 | DD[8] | | | |
| 9 | 245.11395 | 0.800 | 2.00069 | 25.46 | 0.61364 |
| 10 | 16.46347 | 3.184 | | | |
| 11 | 77.98715 | 0.800 | 1.99869 | 20.36 | 0.64442 |
| 12 | 35.01673 | 1.608 | | | |
| 13 | 1171.33213 | 6.287 | 1.99833 | 15.08 | 0.67709 |
| 14 | −14.47180 | 0.810 | 1.96218 | 31.78 | 0.59171 |
| 15 | 79.86004 | 0.120 | | | |
| 16 | 25.30421 | 3.840 | 1.66271 | 33.06 | 0.59629 |
| 17 | −102.18023 | 0.800 | 1.99779 | 15.77 | 0.67272 |
| 18 | 134.86220 | DD[18] | | | |
| 19 | −28.23569 | 1.578 | 1.99999 | 15.20 | 0.67643 |
| 20 | −16.81910 | 0.810 | 1.98093 | 29.82 | 0.59773 |
| 21 | −131.64403 | DD[21] | | | |

TABLE 11B

Example 6

| Sn | R | D | Nd | vd | θgF |
|---|---|---|---|---|---|
| 22(St) | ∞ | 1.513 | | | |
| 23 | 3679.60710 | 2.876 | 1.76955 | 50.88 | 0.54990 |
| 24 | −34.40177 | 0.120 | | | |
| 25 | 49.25156 | 5.861 | 1.49650 | 67.28 | 0.53206 |
| 26 | −29.69617 | 1.000 | 1.99838 | 25.21 | 0.61663 |
| 27 | −141.06299 | 10.530 | | | |
| 28 | 95.72972 | 7.071 | 1.59712 | 45.82 | 0.56679 |
| 29 | −26.83570 | 0.295 | | | |
| 30 | −26.26195 | 1.000 | 1.52108 | 61.18 | 0.54077 |
| 31 | −74.37513 | DD[31] | | | |
| 32 | −4800.71696 | 0.800 | 1.82767 | 40.98 | 0.56968 |
| 33 | 262.10844 | 1.566 | | | |
| 34 | −79.73408 | 0.810 | 1.86657 | 41.22 | 0.56788 |
| 35 | 30.55310 | 2.360 | 1.87541 | 21.23 | 0.63522 |
| 36 | 53.98363 | DD[36] | | | |
| 37 | 96.70637 | 7.813 | 1.72547 | 33.64 | 0.59279 |
| 38 | −62.35817 | 0.120 | | | |
| 39 | 90.09957 | 8.346 | 1.48749 | 70.24 | 0.53007 |
| 40 | −54.97050 | 0.800 | 1.91574 | 30.47 | 0.59722 |
| 41 | −104.00446 | 0.770 | | | |
| 42 | 53.68669 | 12.402 | 1.49700 | 81.54 | 0.53748 |
| 43 | −50.10680 | 1.699 | 1.99996 | 25.86 | 0.61290 |
| 44 | 130.70787 | 0.851 | | | |
| 45 | 143.11107 | 4.601 | 1.43003 | 90.76 | 0.53021 |
| 46 | −71.86225 | DD[46] | | | |
| 47 | ∞ | 33.000 | 1.60859 | 46.44 | 0.56664 |
| 48 | ∞ | 13.200 | 1.51633 | 64.05 | 0.53463 |
| 49 | ∞ | 5.485 | | | |

TABLE 12

Example 6

| | | | | |
|---|---|---|---|---|
| First Zooming Mode State | Wide | Tele | Wide | Tele |
| Second Zooming Mode State | Wide | Wide | Tele | Tele |
| Zoom Ratio of First Zooming Mode | 1.0 | 19.2 | 1.0 | 19.2 |
| Zoom Ratio of Second Zooming Mode | 1.0 | 1.0 | 1.94 | 1.94 |
| f | 8.294 | 159.661 | 16.052 | 309.006 |
| FNo. | 1.96 | 2.84 | 3.81 | 5.51 |
| 2ω(°) | 71.4 | 4.0 | 39.2 | 2.0 |
| DD[8] | 0.800 | 50.894 | 0.800 | 50.894 |

TABLE 12-continued

Example 6

| | | | | |
|---|---|---|---|---|
| DD[18] | 48.735 | 5.319 | 48.735 | 5.319 |
| DD[21] | 7.381 | 0.703 | 7.381 | 0.703 |
| DD[31] | 1.242 | 1.242 | 14.677 | 14.677 |
| DD[36] | 25.245 | 25.245 | 2.081 | 2.081 |
| DD[46] | 9.432 | 9.432 | 19.162 | 19.162 |

EXAMPLE 7

Figure 16:
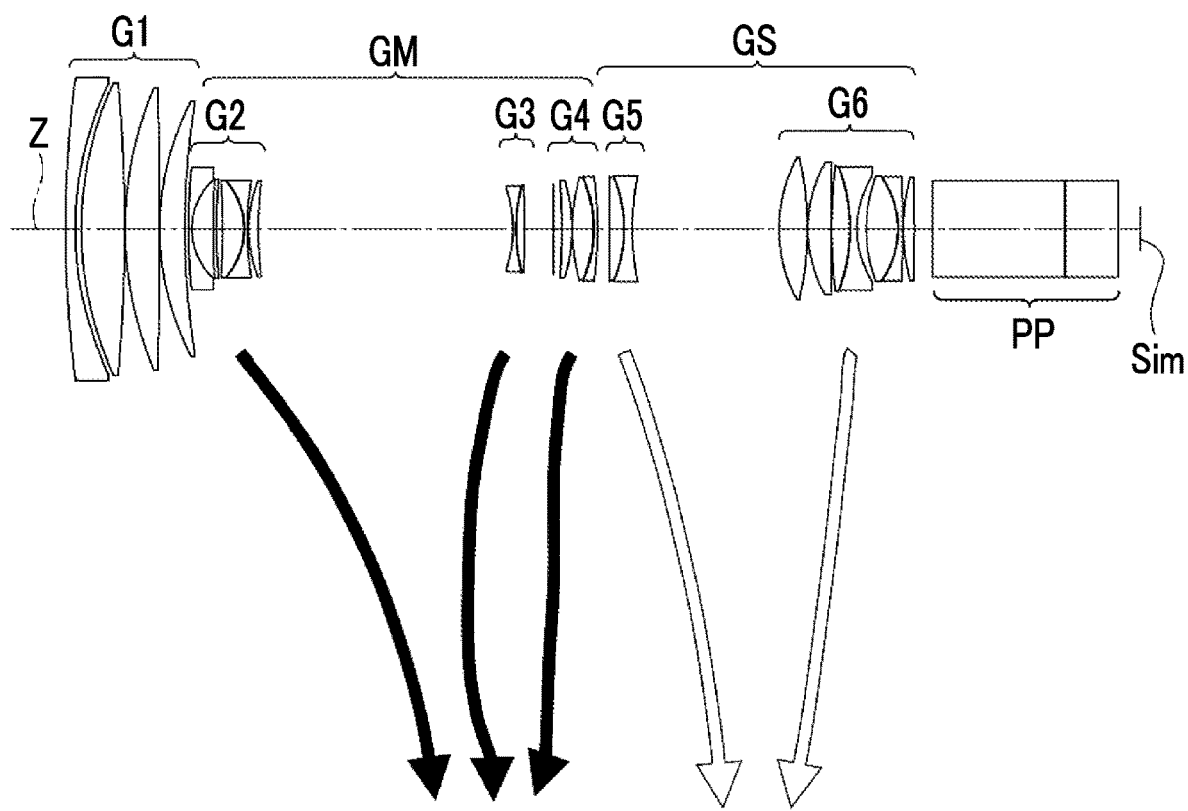
FIG. 16 is a diagram showing a cross-sectional configuration of the variable magnification optical system of Example 7 and movement loci in the first zooming mode and the second zooming mode.

FIG. 16 shows a cross-sectional view of a configuration in which the variable magnification optical system of Example 7 focuses on the object at infinity in the wide angle end state in the first zooming mode and the wide angle end state in the second zooming mode. The variable magnification optical system of Example 7 consists of, in order from the object side to the image side along the optical axis Z, a first lens group G1 having a positive refractive power, a second lens group G2 having a negative refractive power, a third lens group G3 having a negative refractive power, a fourth lens group G4 having a positive refractive power, a fifth lens group G5 having a negative refractive power, and a sixth lens group G6 having a positive refractive power. The aperture stop St is disposed at a position closest to the object side in the fourth lens group G4.

The first lens group G1 consists of four lenses. The second lens group G2 consists of five lenses. The third lens group G3 consists of two lenses. The fourth lens group G4 consists of an aperture stop St and three lenses. The fifth lens group G5 consists of two lenses. The sixth lens group G6 consists of seven lenses.

The intermediate group GM consists of a second lens group G2, a third lens group G3, and a fourth lens group G4. The subsequent group GS consists of a fifth lens group G5 and a sixth lens group G6. During zooming in the first zooming mode, the second lens group G2, the third lens group G3, and the fourth lens group G4 move along the optical axis Z by changing distances from adjacent lenses thereof in the optical axis direction, and the other lens groups remain stationary with respect to the image plane Sim. During zooming in the second zooming mode, the fifth lens group G5 and the sixth lens group G6 move along the optical axis Z by changing distances from adjacent lenses thereof in the optical axis direction, and the other lens groups remain stationary with respect to the image plane Sim. In FIG. 16, the black arrow indicates a schematic movement locus during zooming from the wide angle end to the telephoto end under each lens group that moves during zooming in the first zooming mode, and the outlined arrow indicates a schematic movement locus during zooming from the wide angle end to the telephoto end under each lens group that moves during zooming in the second zooming mode.

Figure 17:
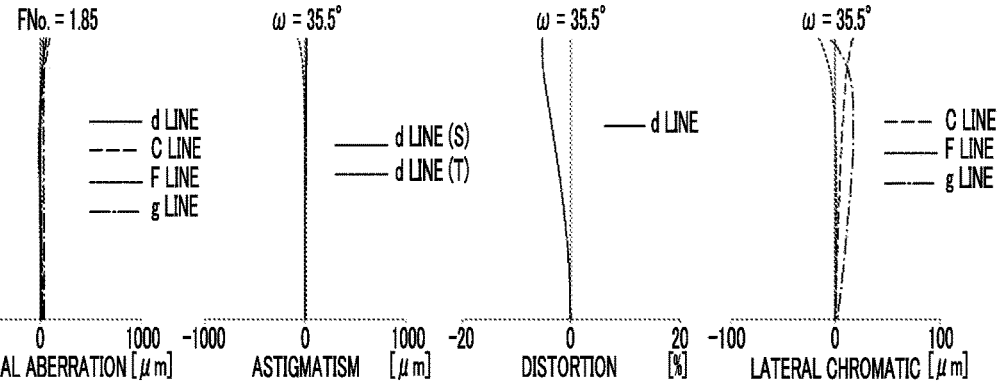
FIG. 17 is a diagram of aberrations of the variable magnification optical system of Example 7 in each zooming state.
Figure 17:
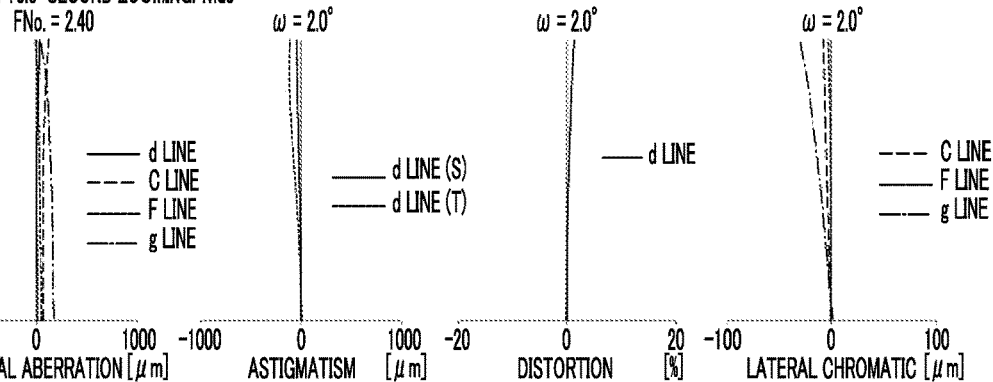
Figure 17:
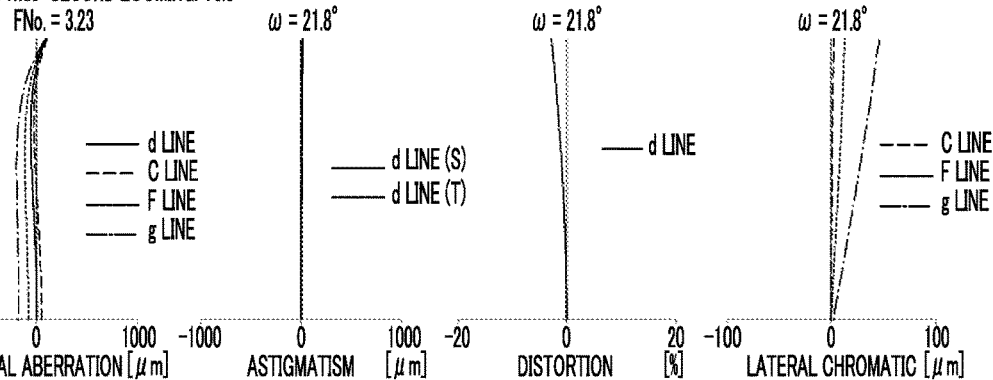
Figure 17:
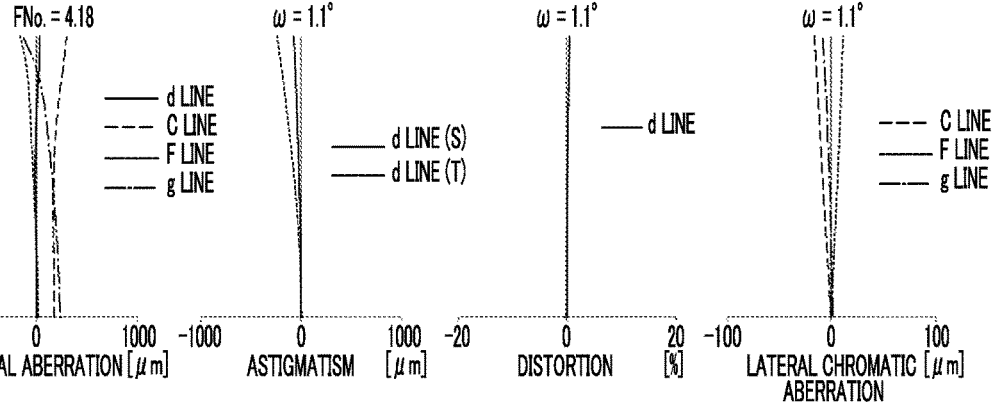

Regarding the variable magnification optical system of Example 7, Tables 13A and 13B show basic lens data, Table 14 shows specification and variable surface distances, and FIG. 17 shows a diagram of aberrations.

TABLE 13A

Example 7

| Sn | R | D | Nd | vd | θgF |
|---|---|---|---|---|---|
| 1 | 304.97015 | 2.400 | 1.89467 | 28.48 | 0.60406 |
| 2 | 87.71505 | 1.500 | | | |
| 3 | 91.22300 | 10.750 | 1.43700 | 95.10 | 0.53364 |
| 4 | −436.31304 | 0.120 | | | |

TABLE 13A-continued

Example 7

| Sn | R | D | Nd | vd | θgF |
|---|---|---|---|---|---|
| 5 | 94.37338 | 8.500 | 1.55035 | 75.49 | 0.54170 |
| 6 | −2055.47786 | 0.120 | | | |
| 7 | 72.82012 | 6.250 | 1.76385 | 48.49 | 0.55898 |
| 8 | 209.93607 | DD[8] | | | |
| 9 | 171.73298 | 0.820 | 2.00083 | 27.14 | 0.60578 |
| 10 | 17.80256 | 5.350 | | | |
| 11 | 386.70450 | 0.700 | 1.89131 | 38.87 | 0.57332 |
| 12 | 126.64977 | 1.625 | | | |
| 13 | −168.11072 | 5.285 | 1.89961 | 20.07 | 0.64151 |
| 14 | −19.32686 | 0.740 | 1.89998 | 38.00 | 0.57547 |
| 15 | 74.77239 | 0.375 | | | |
| 16 | 33.38726 | 2.413 | 1.82157 | 23.93 | 0.61972 |
| 17 | 109.20460 | DD[17] | | | |
| 18 | −33.42421 | 0.750 | 1.89466 | 33.24 | 0.58919 |
| 19 | 43.57909 | 2.050 | 1.98611 | 16.48 | 0.66761 |
| 20 | −550.11542 | DD[20] | | | |
| 21(St) | ∞ | 2.000 | | | |
| 22 | −170.72763 | 2.500 | 1.83745 | 36.36 | 0.58177 |
| 23 | −44.12348 | 0.120 | | | |
| 24 | 48.57032 | 5.278 | 1.59505 | 61.34 | 0.54252 |
| 25 | −37.12530 | 0.920 | 1.91601 | 19.35 | 0.64660 |
| 26 | −94.28149 | DD[26] | | | |

TABLE 13B

Example 7

| Sn | R | D | Nd | vd | θgF |
|---|---|---|---|---|---|
| 27 | −1106.70059 | 3.760 | 1.64066 | 34.24 | 0.59334 |
| 28 | −34.98283 | 2.000 | 1.76173 | 51.83 | 0.54847 |
| 29 | 70.44351 | DD[29] | | | |
| 30 | 39.85403 | 7.000 | 1.51601 | 52.00 | 0.55740 |
| 31 | −84.57343 | 0.120 | | | |
| 32 | 35.63828 | 5.824 | 1.57052 | 62.29 | 0.54122 |
| 33 | 1312.09071 | 0.130 | | | |
| 34 | 137.80344 | 4.547 | 1.67091 | 57.95 | 0.54277 |
| 35 | −45.76170 | 1.662 | 1.78821 | 48.45 | 0.55414 |
| 36 | 24.64894 | 2.478 | | | |
| 37 | 37.89526 | 7.941 | 1.55083 | 74.29 | 0.54100 |
| 38 | −23.55653 | 1.200 | 1.86910 | 33.82 | 0.58823 |
| 39 | −451.16994 | 0.120 | | | |
| 40 | 51.38111 | 2.762 | 1.60210 | 61.07 | 0.54274 |
| 41 | −420.50497 | DD[41] | | | |
| 42 | ∞ | 33.000 | 1.60859 | 46.44 | 0.56664 |
| 43 | ∞ | 13.200 | 1.51633 | 64.05 | 0.53463 |
| 44 | ∞ | 5.511 | | | |

TABLE 14

Example 7

| | | | | |
|---|---|---|---|---|
| First Zooming Mode State | Wide | Tele | Wide | Tele |
| Second Zooming Mode State | Wide | Wide | Tele | Tele |
| Zoom Ratio of First Zooming Mode | 1.0 | 19.2 | 1.0 | 19.2 |
| Zoom Ratio of Second Zooming Mode | 1.0 | 1.0 | 1.74 | 1.74 |
| f | 8.284 | 159.476 | 14.414 | 277.476 |
| FNo. | 1.85 | 2.40 | 3.23 | 4.18 |
| 2ω(°) | 71.0 | 4.0 | 43.6 | 2.2 |
| DD[8] | 0.920 | 58.814 | 0.920 | 58.814 |
| DD[17] | 63.426 | 2.788 | 63.426 | 2.788 |
| DD[20] | 7.336 | 1.145 | 7.336 | 1.145 |
| DD[26] | 2.847 | 11.782 | 27.976 | 36.911 |
| DD[29] | 36.469 | 36.469 | 2.372 | 2.372 |
| DD[41] | 4.456 | 4.456 | 13.421 | 13.421 |

EXAMPLE 8

Figure 18:
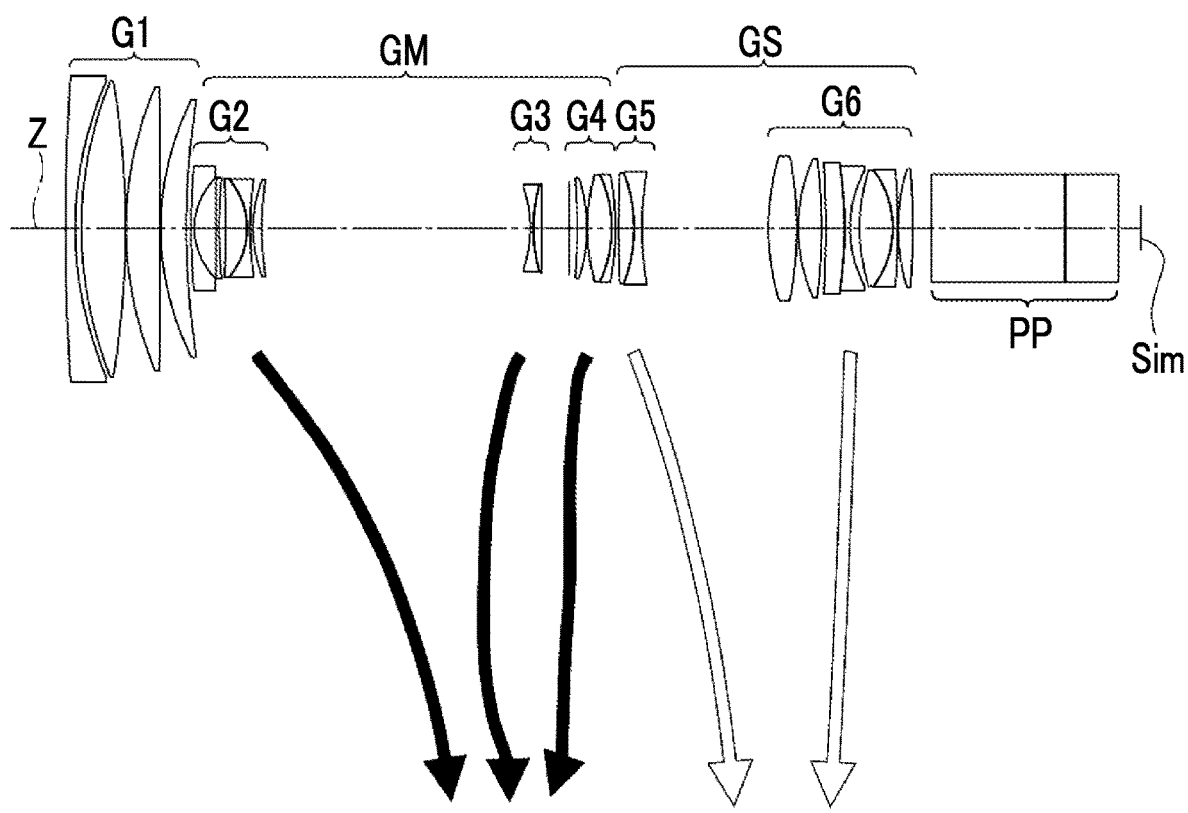
FIG. 18 is a diagram showing a cross-sectional configuration of the variable magnification optical system of Example 8 and movement loci in the first zooming mode and the second zooming mode.

FIG. 18 shows a cross-sectional view of a configuration in which the variable magnification optical system of Example 8 focuses on the object at infinity in the wide angle end state in the first zooming mode and the wide angle end state in the second zooming mode. The variable magnification optical system of Example 8 consists of, in order from the object side to the image side along the optical axis Z, a first lens group G1 having a positive refractive power, a second lens group G2 having a negative refractive power, a third lens group G3 having a negative refractive power, a fourth lens group G4 having a positive refractive power, a fifth lens group G5 having a negative refractive power, and a sixth lens group G6 having a positive refractive power. The aperture stop St is disposed at a position closest to the object side in the fourth lens group G4.

The first lens group G1 consists of four lenses. The second lens group G2 consists of five lenses. The third lens group G3 consists of two lenses. The fourth lens group G4 consists of an aperture stop St and three lenses. The fifth lens group G5 consists of two lenses. The sixth lens group G6 consists of seven lenses.

The intermediate group GM consists of a second lens group G2, a third lens group G3, and a fourth lens group G4. The subsequent group GS consists of a fifth lens group G5 and a sixth lens group G6. During zooming in the first zooming mode, the second lens group G2, the third lens group G3, and the fourth lens group G4 move along the optical axis Z by changing distances from adjacent lenses thereof in the optical axis direction, and the other lens groups remain stationary with respect to the image plane Sim. During zooming in the second zooming mode, the fifth lens group G5 and the sixth lens group G6 move along the optical axis Z by changing distances from adjacent lenses thereof in the optical axis direction, and the other lens groups remain stationary with respect to the image plane Sim. In FIG. 18, the black arrow indicates a schematic movement locus during zooming from the wide angle end to the telephoto end under each lens group that moves during zooming in the first zooming mode, and the outlined arrow indicates a schematic movement locus during zooming from the wide angle end to the telephoto end under each lens group that moves during zooming in the second zooming mode.

Figure 19:
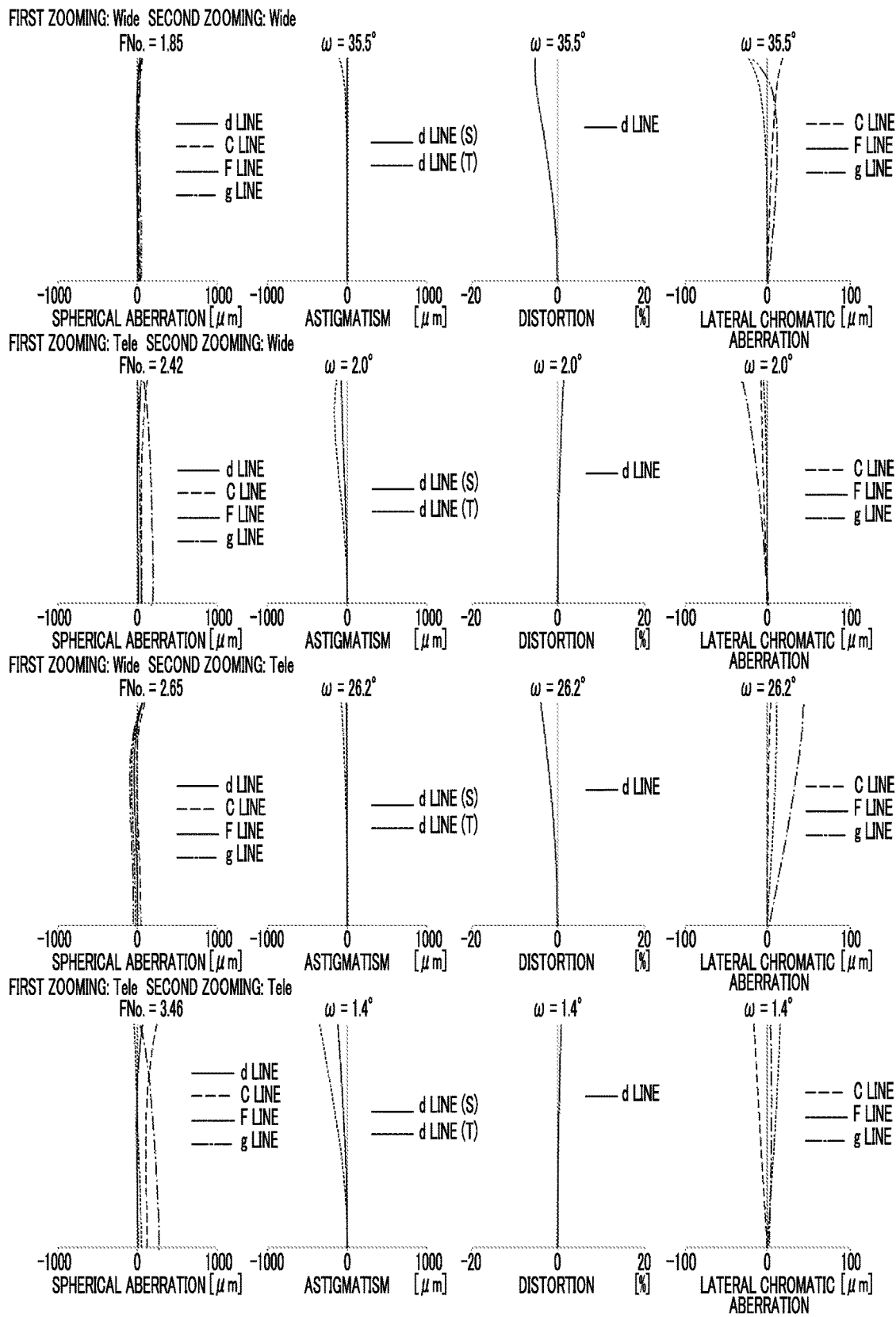
FIG. 19 is a diagram of aberrations of the variable magnification optical system of Example 8 in each zooming state.

Regarding the variable magnification optical system of Example 8, Tables 15A and 15B show basic lens data, Table 16 shows specification and variable surface distances, and FIG. 19 shows a diagram of aberrations.

TABLE 15A

Example 8

| Sn | R | D | Nd | vd | θgF |
|---|---|---|---|---|---|
| 1 | 598.32164 | 2.400 | 1.87890 | 29.74 | 0.60040 |
| 2 | 95.93678 | 1.500 | | | |
| 3 | 101.85047 | 10.853 | 1.43700 | 95.10 | 0.53364 |
| 4 | −241.28689 | 0.120 | | | |
| 5 | 93.09653 | 8.500 | 1.55032 | 75.50 | 0.54170 |
| 6 | −2777.57598 | 0.120 | | | |
| 7 | 75.31954 | 6.250 | 1.76385 | 48.49 | 0.55898 |
| 8 | 212.31272 | DD[8] | | | |
| 9 | 183.58980 | 0.820 | 2.00101 | 29.13 | 0.59952 |
| 10 | 18.44862 | 5.350 | | | |
| 11 | −2704.35537 | 0.700 | 1.87093 | 40.91 | 0.56851 |
| 12 | 126.87916 | 1.625 | | | |
| 13 | −302.97421 | 5.275 | 1.87698 | 21.15 | 0.63560 |

TABLE 15A-continued

Example 8

| Sn | R | D | Nd | vd | θgF |
|---|---|---|---|---|---|
| 14 | −19.94075 | 0.750 | 1.87289 | 40.71 | 0.56894 |
| 15 | 89.19716 | 0.671 | | | |
| 16 | 33.72450 | 2.213 | 1.80952 | 26.89 | 0.61127 |
| 17 | 82.32188 | DD[17] | | | |
| 18 | −32.35067 | 0.750 | 1.90000 | 32.78 | 0.59036 |
| 19 | 41.13780 | 2.073 | 1.98613 | 16.48 | 0.66762 |
| 20 | −686.17371 | DD[20] | | | |
| 21(St) | ∞ | 2.011 | | | |
| 22 | −186.83443 | 2.500 | 1.80287 | 41.36 | 0.56955 |
| 23 | −43.84361 | 0.120 | | | |
| 24 | 60.22553 | 5.800 | 1.64105 | 59.45 | 0.54297 |
| 25 | −33.46163 | 0.920 | 1.95400 | 20.92 | 0.63962 |
| 26 | −73.04711 | DD[26] | | | |

TABLE 15B

Example 8

| Sn | R | D | Nd | vd | θgF |
|---|---|---|---|---|---|
| 27 | 306.14881 | 3.760 | 1.57975 | 40.05 | 0.57927 |
| 28 | −40.36033 | 2.000 | 1.78566 | 49.43 | 0.55198 |
| 29 | 89.87341 | DD[29] | | | |
| 30 | 64.81080 | 7.000 | 1.64138 | 34.22 | 0.59338 |
| 31 | −93.29023 | 0.303 | | | |
| 32 | 43.55345 | 5.782 | 1.51599 | 53.21 | 0.55512 |
| 33 | −145.96456 | 1.000 | | | |
| 34 | −320.06555 | 4.634 | 1.77020 | 50.98 | 0.54968 |
| 35 | −112.96411 | 1.395 | 1.84176 | 43.03 | 0.56424 |
| 36 | 32.17006 | 2.327 | | | |
| 37 | 48.66311 | 8.361 | 1.52054 | 78.37 | 0.53909 |
| 38 | −25.18756 | 1.200 | 1.78438 | 26.18 | 0.61429 |
| 39 | −212.95032 | 0.120 | | | |
| 40 | 54.87705 | 3.617 | 1.70295 | 56.35 | 0.54348 |
| 41 | −167.86363 | DD[41] | | | |
| 42 | ∞ | 33.000 | 1.60859 | 46.44 | 0.56664 |
| 43 | ∞ | 13.200 | 1.51633 | 64.05 | 0.53463 |
| 44 | ∞ | 5.512 | | | |

TABLE 16

Example 8

| | | | | |
|---|---|---|---|---|
| First Zooming Mode State | Wide | Tele | Wide | Tele |
| Second Zooming Mode State | Wide | Wide | Tele | Tele |
| Zoom Ratio of First Zooming Mode | 1.0 | 19.2 | 1.0 | 19.2 |
| Zoom Ratio of Second Zooming Mode | 1.0 | 1.0 | 1.43 | 1.43 |
| f | 8.279 | 159.378 | 11.832 | 227.770 |
| FNo. | 1.85 | 2.42 | 2.65 | 3.46 |
| 2ω(°) | 71.0 | 4.0 | 52.4 | 2.8 |
| DD[8] | 1.188 | 61.077 | 1.188 | 61.077 |
| DD[17] | 66.270 | 3.204 | 66.270 | 3.204 |
| DD[20] | 6.719 | 1.306 | 6.719 | 1.306 |
| DD[26] | 0.793 | 9.383 | 27.730 | 36.320 |
| DD[29] | 31.112 | 31.112 | 1.908 | 1.908 |
| DD[41] | 4.447 | 4.447 | 6.717 | 6.717 |

EXAMPLE 9

Figure 20:
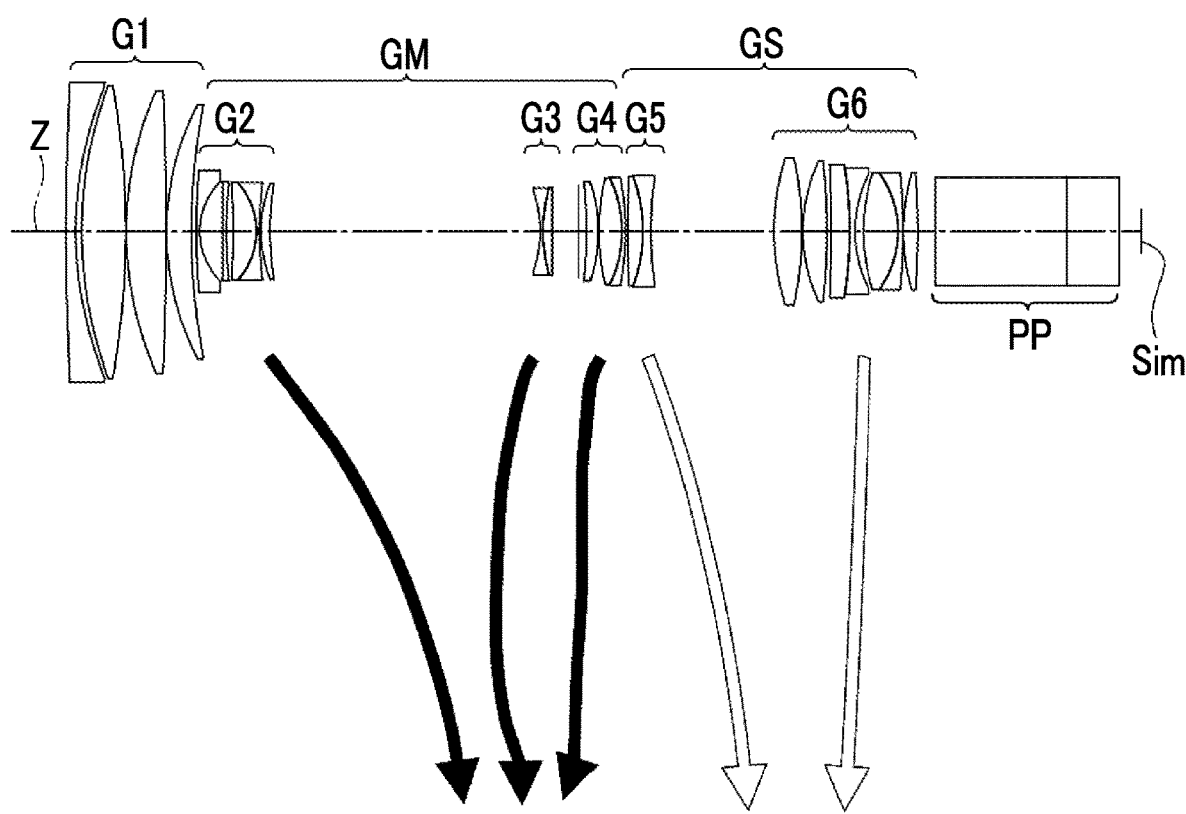
FIG. 20 is a diagram showing a cross-sectional configuration of the variable magnification optical system of Example 9 and movement loci in the first zooming mode and the second zooming mode.

FIG. 20 shows a cross-sectional view of a configuration in which the variable magnification optical system of Example 9 focuses on the object at infinity in the wide angle end state in the first zooming mode and the wide angle end state in the second zooming mode. The variable magnification optical system of Example 9 consists of, in order from the object side to the image side along the optical axis Z, a first lens group G1 having a positive refractive power, a second lens group G2 having a negative refractive power, a third lens group G3 having a negative refractive power, a fourth lens group G4 having a positive refractive power, a fifth lens group G5 having a negative refractive power, and a sixth lens group G6 having a positive refractive power. The aperture stop St is disposed at a position closest to the object side in the fourth lens group G4.

The first lens group G1 consists of four lenses. The second lens group G2 consists of five lenses. The third lens group G3 consists of two lenses. The fourth lens group G4 consists of an aperture stop St and three lenses. The fifth lens group G5 consists of two lenses. The sixth lens group G6 consists of seven lenses.

The intermediate group GM consists of a second lens group G2, a third lens group G3, and a fourth lens group G4. The subsequent group GS consists of a fifth lens group G5 and a sixth lens group G6. During zooming in the first zooming mode, the second lens group G2, the third lens group G3, and the fourth lens group G4 move along the optical axis Z by changing distances from adjacent lenses thereof in the optical axis direction, and the other lens groups remain stationary with respect to the image plane Sim. During zooming in the second zooming mode, the fifth lens group G5 and the sixth lens group G6 move along the optical axis Z by changing distances from adjacent lenses thereof in the optical axis direction, and the other lens groups remain stationary with respect to the image plane Sim. In FIG. 20, the black arrow indicates a schematic movement locus during zooming from the wide angle end to the telephoto end under each lens group that moves during zooming in the first zooming mode, and the outlined arrow indicates a schematic movement locus during zooming from the wide angle end to the telephoto end under each lens group that moves during zooming in the second zooming mode.

Figure 21:
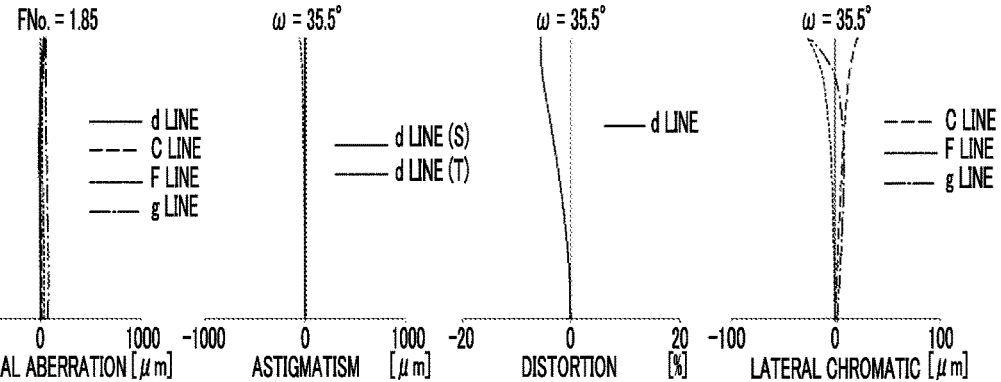
FIG. 21 is a diagram of aberrations of the variable magnification optical system of Example 9 in each zooming state.
Figure 21:
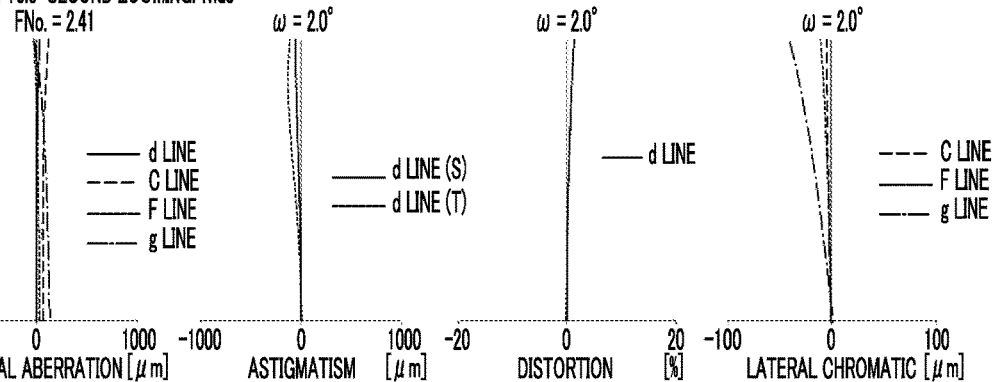
Figure 21:
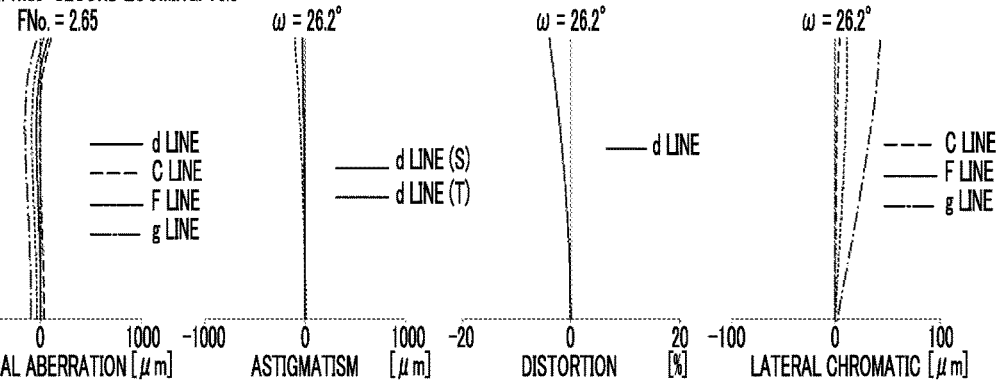
Figure 21:
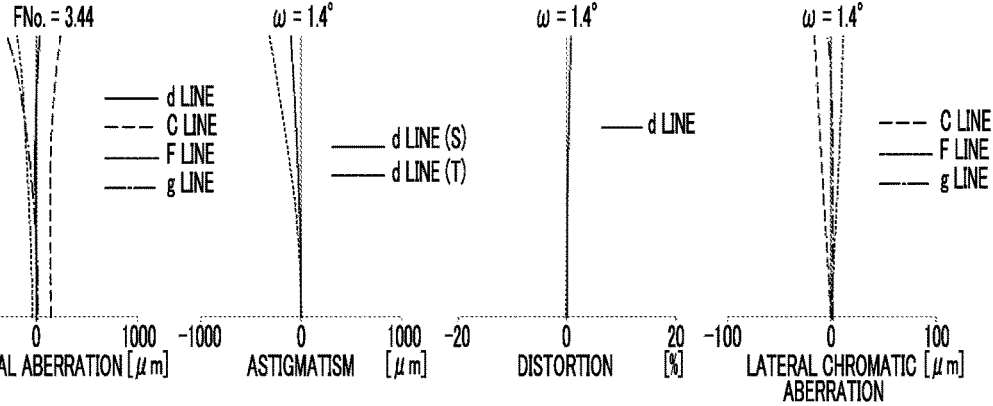

Regarding the variable magnification optical system of Example 9, Tables 17A and 17B show basic lens data, Table 18 shows specification and variable surface distances, and FIG. 21 shows a diagram of aberrations.

TABLE 17A

Example 9

| Sn | R | D | Nd | vd | θgF |
|---|---|---|---|---|---|
| 1 | 788.76255 | 2.400 | 1.89884 | 30.11 | 0.59878 |
| 2 | 101.48496 | 1.500 | | | |
| 3 | 110.85042 | 11.007 | 1.43700 | 95.10 | 0.53364 |
| 4 | −224.91810 | 0.120 | | | |
| 5 | 91.75756 | 10.000 | 1.55242 | 75.16 | 0.54179 |
| 6 | −869.95342 | 0.120 | | | |
| 7 | 73.14951 | 6.250 | 1.76385 | 48.49 | 0.55898 |
| 8 | 177.90288 | DD[8] | | | |
| 9 | 220.45019 | 0.820 | 2.00098 | 28.78 | 0.60064 |
| 10 | 18.69136 | 5.805 | | | |
| 11 | −1243.95463 | 0.913 | 1.88293 | 39.71 | 0.57124 |
| 12 | 129.57392 | 1.667 | | | |
| 13 | −234.85146 | 5.847 | 1.90001 | 21.28 | 0.63589 |
| 14 | −19.11236 | 0.750 | 1.86498 | 41.50 | 0.56722 |
| 15 | 94.99899 | 0.400 | | | |
| 16 | 34.23425 | 2.274 | 1.78652 | 29.90 | 0.60213 |
| 17 | 82.52116 | DD[17] | | | |
| 18 | −32.16538 | 0.753 | 1.87493 | 34.92 | 0.58487 |
| 19 | 41.85113 | 2.376 | 1.98613 | 16.48 | 0.66762 |
| 20 | −2116.04373 | DD[20] | | | |
| 21(St) | ∞ | 2.002 | | | |
| 22 | −161.73937 | 2.814 | 1.77922 | 49.32 | 0.55248 |
| 23 | −41.64025 | 0.120 | | | |
| 24 | 60.90923 | 5.755 | 1.63100 | 59.46 | 0.54304 |
| 25 | −32.68441 | 0.920 | 1.89537 | 22.58 | 0.62989 |
| 26 | −73.77845 | DD[26] | | | |

TABLE 17B

Example 9

| Sn | R | D | Nd | vd | θgF |
|---|---|---|---|---|---|
| 27 | 338.06312 | 3.760 | 1.57594 | 40.76 | 0.57794 |
| 28 | -42.48845 | 2.012 | 1.81600 | 46.40 | 0.55779 |
| 29 | 100.41950 | DD[29] | | | |
| 30 | 64.36240 | 7.000 | 1.60544 | 38.54 | 0.58208 |
| 31 | -90.23467 | 0.245 | | | |
| 32 | 43.58222 | 6.071 | 1.54841 | 56.04 | 0.54893 |
| 33 | -162.58266 | 1.062 | | | |
| 34 | -407.81867 | 4.580 | 1.75070 | 52.93 | 0.54688 |
| 35 | -109.12939 | 1.349 | 1.86247 | 41.75 | 0.56667 |
| 36 | 32.98428 | 2.195 | | | |
| 37 | 48.99841 | 8.792 | 1.53515 | 76.40 | 0.54003 |
| 38 | -26.13493 | 1.200 | 1.81450 | 30.61 | 0.59938 |
| 39 | -180.73618 | 0.120 | | | |
| 40 | 54.90069 | 3.614 | 1.66477 | 58.26 | 0.54264 |
| 41 | -198.92415 | DD[41] | | | |
| 42 | ∞ | 33.000 | 1.60859 | 46.44 | 0.56664 |
| 43 | ∞ | 13.200 | 1.51633 | 64.05 | 0.53463 |
| 44 | ∞ | 5.502 | | | |

TABLE 18

Example 9

| First Zooming Mode State | Wide | Tele | Wide | Tele |
|---|---|---|---|---|
| Second Zooming Mode State | Wide | Wide | Tele | Tele |
| Zoom Ratio of First Zooming Mode | 1.0 | 19.2 | 1.0 | 19.2 |
| Zoom Ratio of Second Zooming Mode | 1.0 | 1.0 | 1.43 | 1.43 |
| f | 8.297 | 159.712 | 11.853 | 228.165 |
| FNo. | 1.85 | 2.41 | 2.65 | 3.44 |
| 2ω(°) | 71.0 | 4.0 | 52.4 | 2.8 |
| DD[8] | 1.274 | 60.825 | 1.274 | 60.825 |
| DD[17] | 67.853 | 3.382 | 67.853 | 3.382 |
| DD[20] | 6.598 | 1.438 | 6.598 | 1.438 |
| DD[26] | 0.583 | 10.663 | 27.949 | 38.030 |
| DD[29] | 30.853 | 30.853 | 1.779 | 1.779 |
| DD[41] | 4.346 | 4.346 | 6.055 | 6.055 |

EXAMPLE 10

Figure 22:
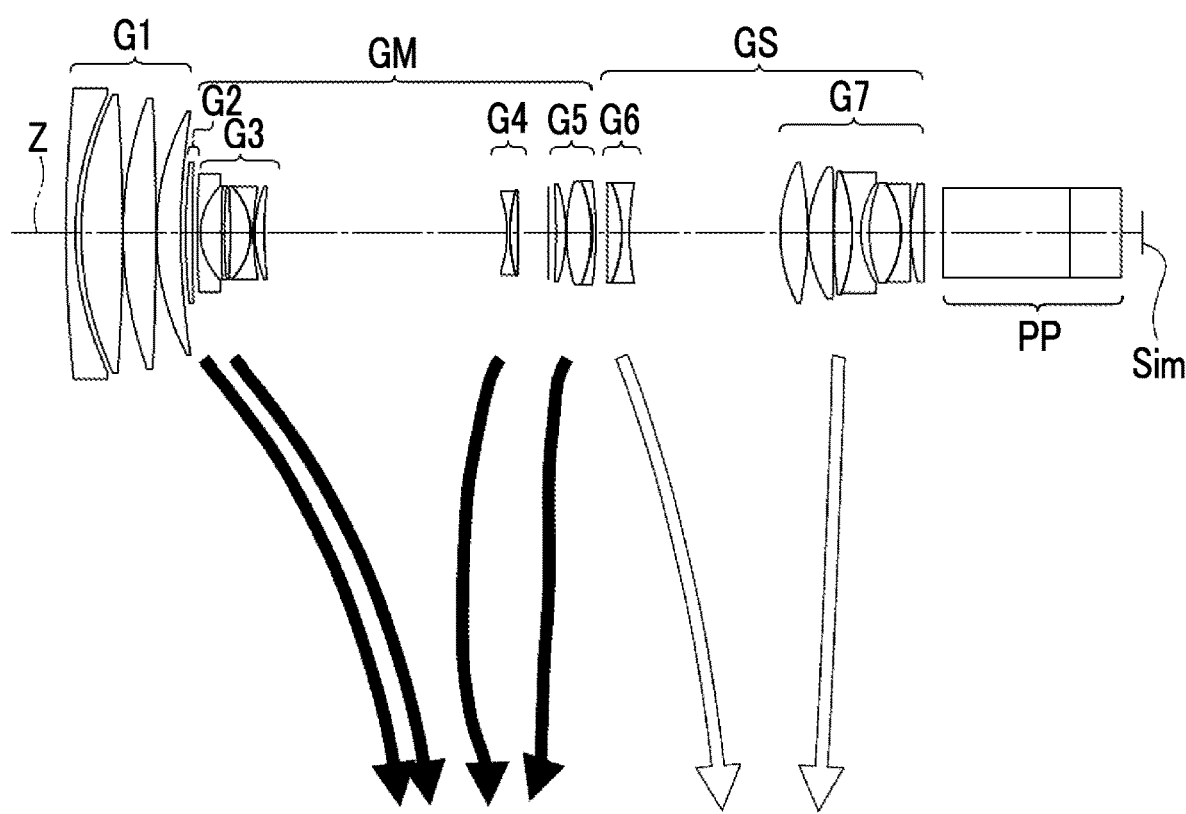
FIG. 22 is a diagram showing a cross-sectional configuration of the variable magnification optical system of Example 10 and movement loci in the first zooming mode and the second zooming mode.

FIG. 22 shows a cross-sectional view of a configuration in which the variable magnification optical system of Example 10 focuses on the object at infinity in the wide angle end state in the first zooming mode and the wide angle end state in the second zooming mode. The variable magnification optical system of Example 10 consists of, in order from the object side to the image side along the optical axis Z, a first lens group G1 having a positive refractive power, a second lens group G2 having a positive refractive power, a third lens group G3 having a negative refractive power, a fourth lens group G4 having a negative refractive power, a fifth lens group G5 having a positive refractive power, a sixth lens group G6 having a negative refractive power, and a seventh lens group G7 having a positive refractive power. The aperture stop St is disposed at a position closest to the object side in the fifth lens group G5.

The first lens group G1 consists of four lenses. The second lens group G2 consists of one lens. The third lens group G3 consists of five lenses. The fourth lens group G4 consists of two lenses. The fifth lens group G5 consists of an aperture stop St and three lenses. The sixth lens group G6 consists of two lenses. The seventh lens group G7 consists of seven lenses.

The intermediate group GM consists of a second lens group G2, a third lens group G3, a fourth lens group G4, and a fifth lens group G5. The subsequent group GS consists of a sixth lens group G6 and a seventh lens group G7. During zooming in the first zooming mode, the second lens group G2, the third lens group G3, the fourth lens group G4, and the fifth lens group G5 move along the optical axis Z by changing distances from adjacent lenses thereof in the optical axis direction, and the other lens groups remain stationary with respect to the image plane Sim. During zooming in the second zooming mode, the sixth lens group G6 and the seventh lens group G7 move along the optical axis Z by changing distances from adjacent lenses thereof in the optical axis direction, and the other lens groups remain stationary with respect to the image plane Sim. In FIG. 22, the black arrow indicates a schematic movement locus during zooming from the wide angle end to the telephoto end under each lens group that moves during zooming in the first zooming mode, and the outlined arrow indicates a schematic movement locus during zooming from the wide angle end to the telephoto end under each lens group that moves during zooming in the second zooming mode.

Figure 23:
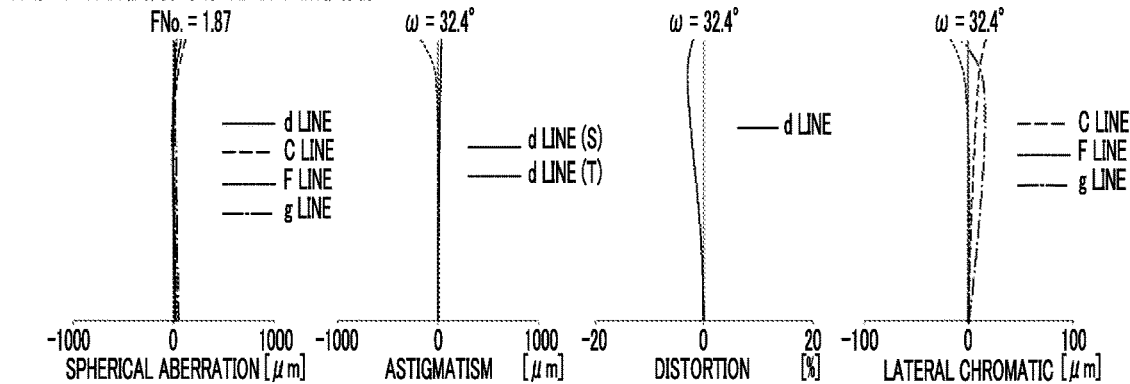
FIG. 23 is a diagram of aberrations of the variable magnification optical system of Example 10 in each zooming state.
Figure 23:
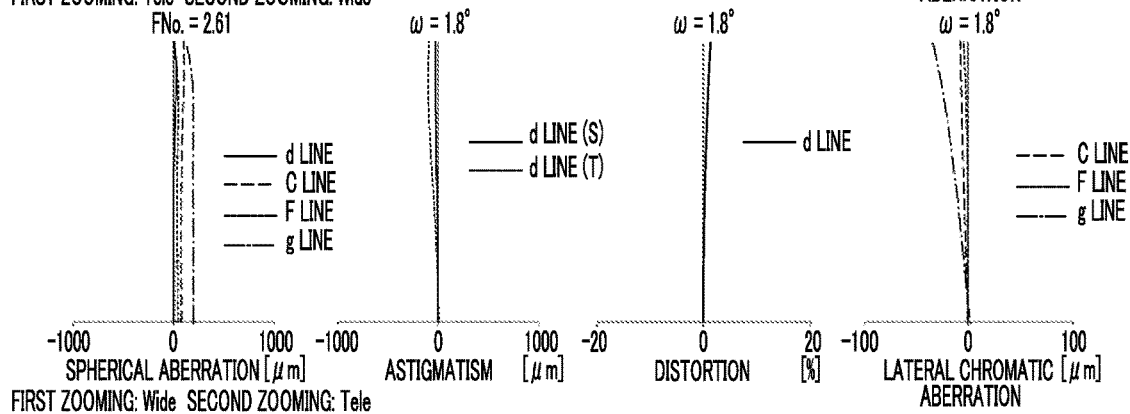
Figure 23:
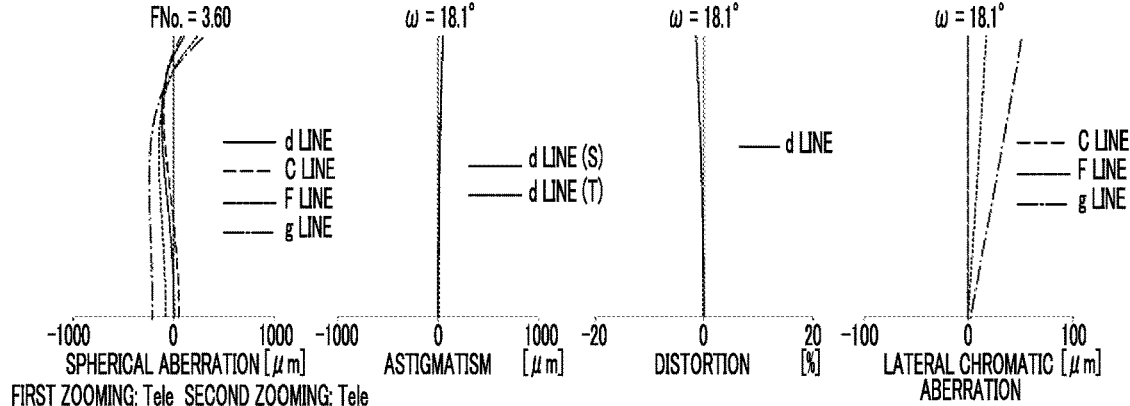
Figure 23:
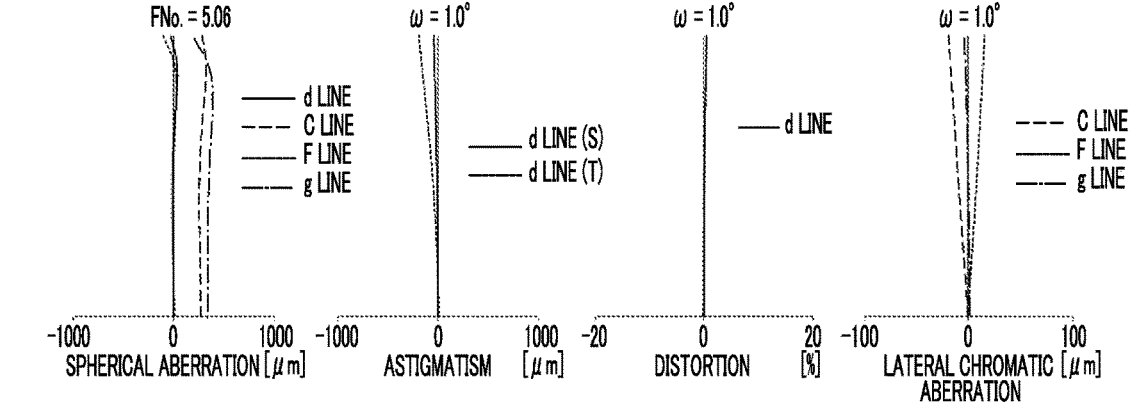

Regarding the variable magnification optical system of Example 10, Tables 19A and 19B show basic lens data, Table 20 shows specification and variable surface distances, and FIG. 23 shows a diagram of aberrations.

TABLE 19A

Example 10

| Sn | R | D | Nd | vd | θgF |
|---|---|---|---|---|---|
| 1 | 386.93778 | 2.400 | 1.81367 | 28.74 | 0.60512 |
| 2 | 86.18929 | 1.500 | | | |
| 3 | 87.84309 | 10.750 | 1.43700 | 95.10 | 0.53364 |
| 4 | -552.12081 | 0.120 | | | |
| 5 | 108.50289 | 8.500 | 1.55032 | 75.50 | 0.54170 |
| 6 | -768.54054 | 0.120 | | | |
| 7 | 71.12891 | 6.250 | 1.76385 | 48.49 | 0.55898 |
| 8 | 206.79115 | DD[8] | | | |
| 9 | 182.15870 | 1.750 | 1.52314 | 64.11 | 0.53596 |
| 10 | 694.40336 | DD[10] | | | |
| 11 | 397.77041 | 0.820 | 2.00090 | 27.88 | 0.60345 |
| 12 | 17.99649 | 5.350 | | | |
| 13 | 420.02406 | 0.700 | 1.90001 | 38.00 | 0.57547 |
| 14 | 130.58155 | 1.625 | | | |
| 15 | -193.76278 | 5.285 | 1.89581 | 20.21 | 0.64049 |
| 16 | -18.22288 | 0.740 | 1.89999 | 38.00 | 0.57547 |
| 17 | 73.31759 | 0.375 | | | |
| 18 | 33.70086 | 2.384 | 1.85113 | 26.37 | 0.61250 |
| 19 | 103.67522 | DD[19] | | | |
| 20 | -34.42374 | 0.750 | 1.89126 | 33.53 | 0.58844 |
| 21 | 45.51958 | 2.050 | 1.98576 | 16.50 | 0.66751 |
| 22 | -492.83009 | DD[22] | | | |
| 23(St) | ∞ | 2.000 | | | |
| 24 | -175.97441 | 2.500 | 1.75497 | 33.32 | 0.59290 |
| 25 | -41.60183 | 0.120 | | | |
| 26 | 47.69954 | 6.657 | 1.60439 | 60.99 | 0.54280 |
| 27 | -37.50463 | 0.920 | 1.93033 | 18.48 | 0.65244 |
| 28 | -98.57693 | DD[28] | | | |

TABLE 19B

Example 10

| Sn | R | D | Nd | vd | θgF |
|---|---|---|---|---|---|
| 29 | -1582.84760 | 3.760 | 1.76891 | 26.55 | 0.61335 |
| 30 | -34.90131 | 2.000 | 1.88294 | 39.60 | 0.57152 |
| 31 | 71.31929 | DD[31] | | | |
| 32 | 42.89450 | 7.141 | 1.51600 | 52.48 | 0.55646 |
| 33 | -91.15850 | 0.209 | | | |
| 34 | 34.42702 | 6.290 | 1.63757 | 58.82 | 0.54295 |
| 35 | -11148.37558 | 0.231 | | | |

TABLE 19B-continued

Example 10

| Sn | R | D | Nd | vd | θgF |
|---|---|---|---|---|---|
| 36 | 132.06410 | 4.777 | 1.69728 | 56.64 | 0.54335 |
| 37 | −47.19426 | 2.192 | 1.82862 | 43.85 | 0.56291 |
| 38 | 23.58034 | 2.424 | | | |
| 39 | 36.73898 | 8.152 | 1.54358 | 75.26 | 0.54056 |
| 40 | −24.68383 | 2.500 | 1.90001 | 38.00 | 0.57547 |
| 41 | −475.97083 | 0.120 | | | |
| 42 | 51.03700 | 3.452 | 1.58371 | 61.78 | 0.54202 |
| 43 | −492.88211 | DD[43] | | | |
| 44 | ∞ | 33.000 | 1.60859 | 46.44 | 0.56664 |
| 45 | ∞ | 13.200 | 1.51633 | 64.05 | 0.53463 |
| 46 | ∞ | 5.512 | | | |

TABLE 20

Example 10

| First Zooming Mode State | Wide | Tele | Wide | Tele |
|---|---|---|---|---|
| Second Zooming Mode State | Wide | Wide | Tele | Tele |
| Zoom Ratio of First Zooming Mode | 1.0 | 19.2 | 1.0 | 19.2 |
| Zoom Ratio of Second Zooming Mode | 1.0 | 1.0 | 1.94 | 1.94 |
| f | 8.982 | 172.903 | 17.407 | 335.078 |
| FNo. | 1.87 | 2.61 | 3.60 | 5.06 |
| 2ω(°) | 64.8 | 3.6 | 36.2 | 2.0 |
| DD[8] | 1.309 | 57.007 | 1.309 | 57.007 |
| DD[10] | 1.321 | 2.302 | 1.321 | 2.302 |
| DD[19] | 63.036 | 3.132 | 63.036 | 3.132 |
| DD[22] | 7.926 | 1.048 | 7.926 | 1.048 |
| DD[28] | 2.940 | 13.043 | 28.936 | 39.039 |
| DD[31] | 39.003 | 39.003 | 1.140 | 1.140 |
| DD[43] | 4.782 | 4.782 | 16.651 | 16.651 |

EXAMPLE 11

Figure 24:
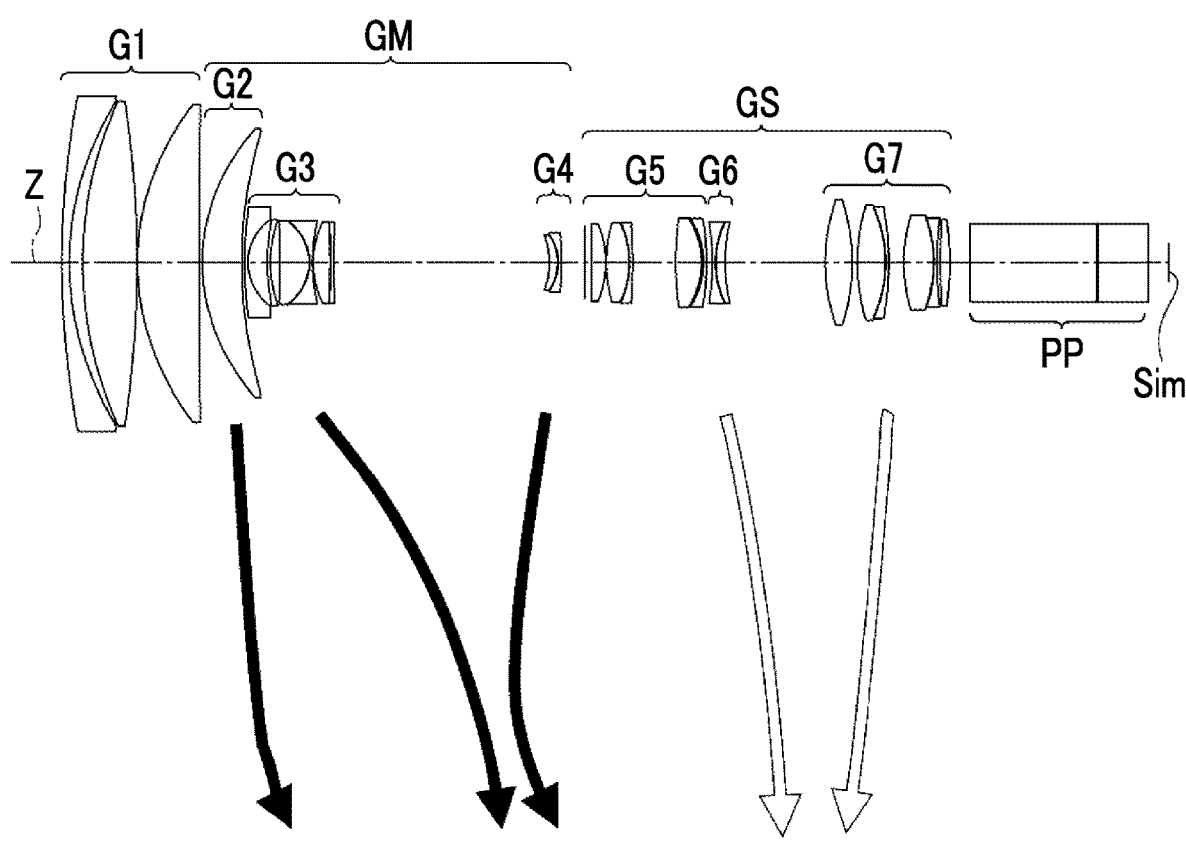
FIG. 24 is a diagram showing a cross-sectional configuration of the variable magnification optical system of Example 11 and movement loci in the first zooming mode and the second zooming mode.

FIG. 24 shows a cross-sectional view of a configuration in which the variable magnification optical system of Example 11 focuses on the object at infinity in the wide angle end state in the first zooming mode and the wide angle end state in the second zooming mode. The variable magnification optical system of Example 11 consists of, in order from the object side to the image side along the optical axis Z, a first lens group G1 having a positive refractive power, a second lens group G2 having a positive refractive power, a third lens group G3 having a negative refractive power, a fourth lens group G4 having a negative refractive power, a fifth lens group G5 having a positive refractive power, a sixth lens group G6 having a negative refractive power, and a seventh lens group G7 having a positive refractive power. The aperture stop St is disposed at a position closest to the object side in the fifth lens group G5.

The first lens group G1 consists of three lenses. The second lens group G2 consists of one lens. The third lens group G3 consists of six lenses. The fourth lens group G4 consists of two lenses. The fifth lens group G5 consists of an aperture stop St and five lenses. The sixth lens group G6 consists of two lenses. The seventh lens group G7 consists of six lenses.

The intermediate group GM consists of a second lens group G2, a third lens group G3, and a fourth lens group G4. The subsequent group GS consists of a fifth lens group G5, a sixth lens group G6, and a seventh lens group G7. During zooming in the first zooming mode, the second lens group G2, the third lens group G3, and the fourth lens group G4 move along the optical axis Z by changing distances from adjacent lenses thereof in the optical axis direction, and the other lens groups remain stationary with respect to the image plane Sim. During zooming in the second zooming mode, the sixth lens group G6 and the seventh lens group G7 move along the optical axis Z by changing distances from adjacent lenses thereof in the optical axis direction, and the other lens groups remain stationary with respect to the image plane Sim. In FIG. 24, the black arrow indicates a schematic movement locus during zooming from the wide angle end to the telephoto end under each lens group that moves during zooming in the first zooming mode, and the outlined arrow indicates a schematic movement locus during zooming from the wide angle end to the telephoto end under each lens group that moves during zooming in the second zooming mode.

Figure 25:
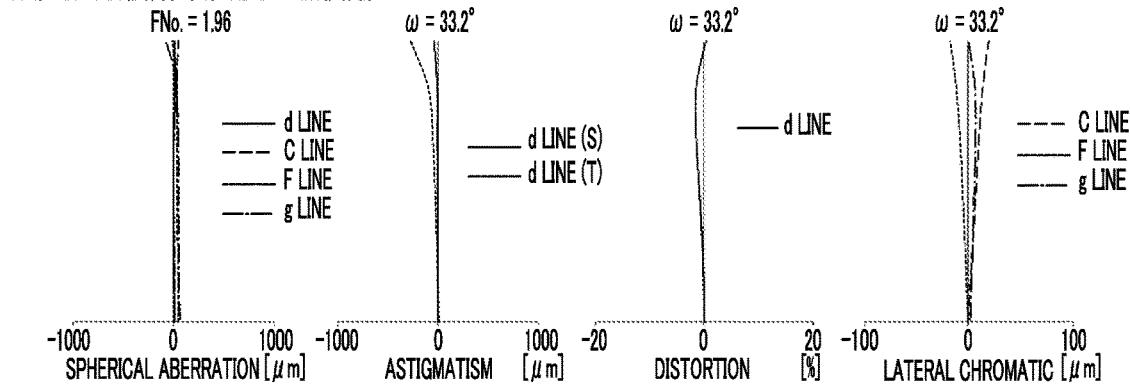
FIG. 25 is a diagram of aberrations of the variable magnification optical system of Example 11 in each zooming state.
Figure 25:
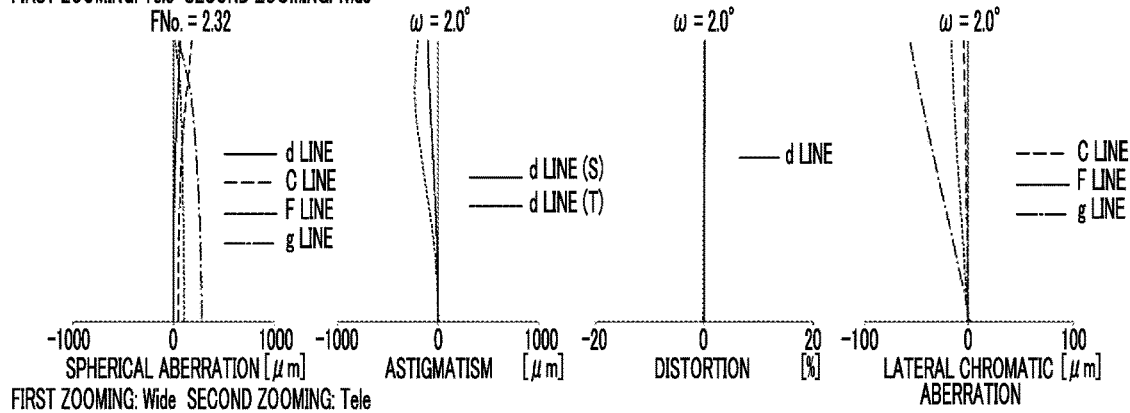
Figure 25:
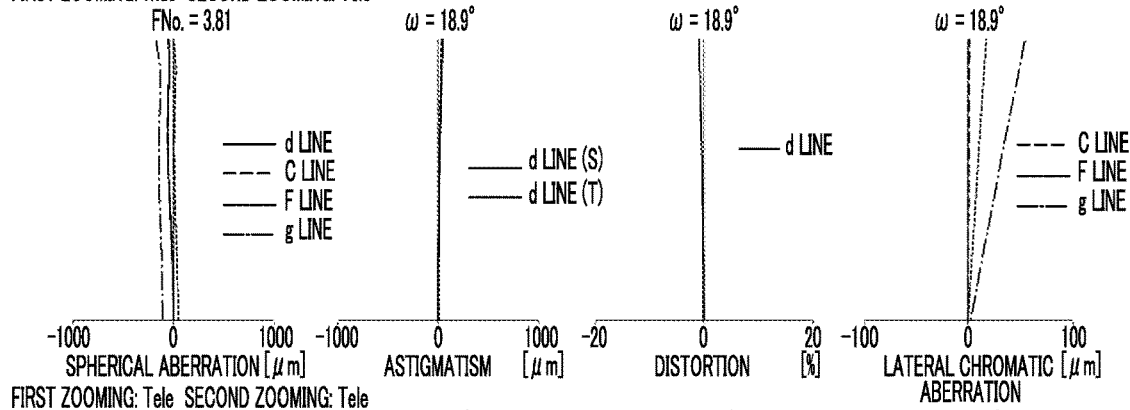
Figure 25:
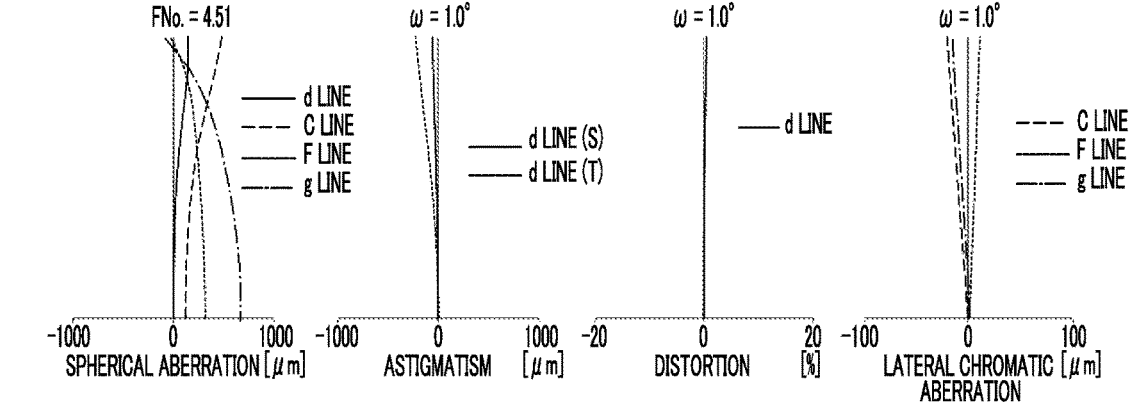

Regarding the variable magnification optical system of Example 11, Tables 21A and 21B show basic lens data, Table 22 shows specification and variable surface distances, and FIG. 25 shows a diagram of aberrations.

TABLE 21A

Example 11

| Sn | R | D | Nd | vd | θgF |
|---|---|---|---|---|---|
| 1 | 299.31032 | 2.000 | 1.80518 | 25.42 | 0.61616 |
| 2 | 102.21530 | 3.434 | | | |
| 3 | 132.09799 | 14.123 | 1.43875 | 94.94 | 0.53433 |
| 4 | −363.77668 | 0.120 | | | |
| 5 | 85.24670 | 16.047 | 1.49700 | 81.54 | 0.53748 |
| 6 | 5111.22964 | DD[6] | | | |
| 7 | 65.43358 | 10.189 | 1.76385 | 48.49 | 0.55898 |
| 8 | 155.93780 | DD[8] | | | |
| 9 | 139.80210 | 0.800 | 2.00069 | 25.46 | 0.61364 |
| 10 | 17.27209 | 5.043 | | | |
| 11 | 71.76846 | 0.800 | 1.91082 | 35.25 | 0.58224 |
| 12 | 42.13209 | 2.514 | | | |
| 13 | −402.40306 | 7.786 | 1.95906 | 17.47 | 0.65993 |
| 14 | −16.57833 | 0.810 | 1.94933 | 33.01 | 0.58830 |
| 15 | 62.12462 | 0.120 | | | |
| 16 | 29.89038 | 4.531 | 1.67504 | 34.21 | 0.59248 |
| 17 | −222.40209 | 0.800 | 1.97913 | 20.74 | 0.64156 |
| 18 | 225.35993 | DD[18] | | | |
| 19 | −26.34903 | 2.257 | 1.95906 | 17.47 | 0.65993 |
| 20 | −16.29564 | 0.810 | 1.90117 | 37.72 | 0.57620 |
| 21 | −154.89979 | DD[21] | | | |

TABLE 21B

Example 11

| Sn | R | D | Nd | vd | θgF |
|---|---|---|---|---|---|
| 22(St) | ∞ | 1.606 | | | |
| 23 | 889.76702 | 3.559 | 1.78070 | 49.93 | 0.55119 |
| 24 | −33.69194 | 0.120 | | | |
| 25 | 45.85832 | 6.038 | 1.48629 | 72.58 | 0.53091 |
| 26 | −30.44904 | 0.800 | 2.00000 | 24.52 | 0.62048 |
| 27 | −226.05612 | 11.226 | | | |
| 28 | 110.85609 | 6.667 | 1.59704 | 45.19 | 0.56811 |
| 29 | −28.09052 | 0.500 | | | |
| 30 | −27.26547 | 0.800 | 1.47332 | 66.17 | 0.53013 |
| 31 | −86.99591 | DD[31] | | | |
| 32 | −78.10331 | 0.810 | 1.95812 | 32.19 | 0.59046 |
| 33 | 31.26123 | 2.413 | 1.98519 | 15.77 | 0.67204 |
| 34 | 57.47125 | DD[34] | | | |
| 35 | 63.92529 | 6.978 | 1.78571 | 32.65 | 0.59401 |
| 36 | −69.88677 | 1.340 | | | |
| 37 | 64.14166 | 7.532 | 1.48749 | 70.24 | 0.53007 |
| 38 | −44.90547 | 0.800 | 1.99999 | 22.24 | 0.63415 |
| 39 | −107.50471 | 3.947 | | | |
| 40 | 55.41716 | 7.742 | 1.49700 | 81.54 | 0.53748 |
| 41 | −46.27283 | 0.859 | 1.98198 | 27.55 | 0.60493 |
| 42 | 123.52880 | 0.863 | | | |

TABLE 21B-continued

Example 11

| Sn | R | D | Nd | vd | θgF |
|----|---|---|----|----|----|
| 43 | 272.21960 | 2.470 | 1.43202 | 79.72 | 0.52545 |
| 44 | −100.80539 | DD[44] | | | |
| 45 | ∞ | 33.000 | 1.60859 | 46.44 | 0.56664 |
| 46 | ∞ | 13.200 | 1.51633 | 64.05 | 0.53463 |
| 47 | ∞ | 5.485 | | | |

TABLE 22

Example 11

| | | | | |
|---|---|---|---|---|
| First Zooming Mode State | Wide | Tele | Wide | Tele |
| Second Zooming Mode State | Wide | Wide | Tele | Tele |
| Zoom Ratio of First Zooming Mode | 1.0 | 19.2 | 1.0 | 19.2 |

TABLE 22-continued

Example 11

| | | | | |
|---|---|---|---|---|
| Zoom Ratio of Second Zooming Mode | 1.0 | 1.0 | 1.93 | 1.93 |
| f | 8.523 | 164.068 | 16.491 | 317.447 |
| FNo. | 1.96 | 2.32 | 3.81 | 4.51 |
| 2ω(°) | 66.4 | 4.0 | 37.8 | 2.0 |
| DD[6] | 0.805 | 10.833 | 0.805 | 10.833 |
| DD[8] | 0.777 | 49.506 | 0.777 | 49.506 |
| DD[18] | 56.004 | 2.509 | 56.004 | 2.509 |
| DD[21] | 6.314 | 1.053 | 6.314 | 1.053 |
| DD[31] | 1.554 | 1.554 | 15.819 | 15.819 |
| DD[34] | 26.005 | 26.005 | 2.332 | 2.332 |
| DD[44] | 5.336 | 5.336 | 14.748 | 14.748 |

Table 23 shows the corresponding values of Conditional Expressions (1) to (5) of the variable magnification optical system of Examples 1 to 11 and the values of Dexpw. The values shown in Table 23 are values in the case of using the d line as a reference.

TABLE 23

| | Conditional Expression (1) βSP | Conditional Expression (2) fS/\|fSN\| | Conditional Expression (3) \|fw × tan(ωw)\|/Dexpw\| | Conditional Expression (4) TL/fw | Conditional Expression (5) Zr2max | Dexpw |
|---|---|---|---|---|---|---|
| Example 1 | −0.486 | 0.720 | 0.028 | 30.8 | 1.94 | 214.37 |
| Example 2 | −0.506 | 0.731 | 0.034 | 30.8 | 1.94 | 175.37 |
| Example 3 | −0.499 | 0.849 | 0.034 | 30.8 | 1.94 | 174.65 |
| Example 4 | −0.331 | 0.728 | 0.034 | 30.8 | 1.94 | 174.95 |
| Example 5 | −0.537 | 1.071 | 0.042 | 31.6 | 1.94 | 142.39 |
| Example 6 | −0.749 | 2.212 | 0.045 | 30.2 | 1.94 | 133.32 |
| Example 7 | −0.463 | 0.678 | 0.023 | 30.2 | 1.74 | 262.1 |
| Example 8 | −0.341 | 0.563 | 0.017 | 30.0 | 1.43 | 352.8 |
| Example 9 | −0.339 | 0.586 | 0.012 | 30.5 | 1.43 | 487.57 |
| Example 10 | −0.503 | 0.768 | 0.021 | 29.2 | 1.94 | 275.25 |
| Example 11 | −0.723 | 1.827 | 0.039 | 31.8 | 1.93 | 143.01 |

The variable magnification optical systems of Examples 1 to 11 are configured to be miniaturized in the radial direction and the optical axis direction, and various aberrations are satisfactorily corrected to achieve high optical performance. Further, the variable magnification optical systems of Examples 1 to 11 each achieve a high zoom ratio, where the highest zoom ratio in the first zooming mode is 19 times or more, the highest zoom ratio in the second zooming mode is 1.4 times or more, and the highest zoom ratio obtained by using both the first zooming mode and the second zooming mode is 25 times or more. Among the variable magnification optical systems, the variable magnification optical systems of Examples 1 to 6, 10, and 11 each have a highest zoom ratio of 35 times or more obtained by using both the first zooming mode and the second zooming mode, and each achieve a particularly high zoom ratio.

Figure 26:
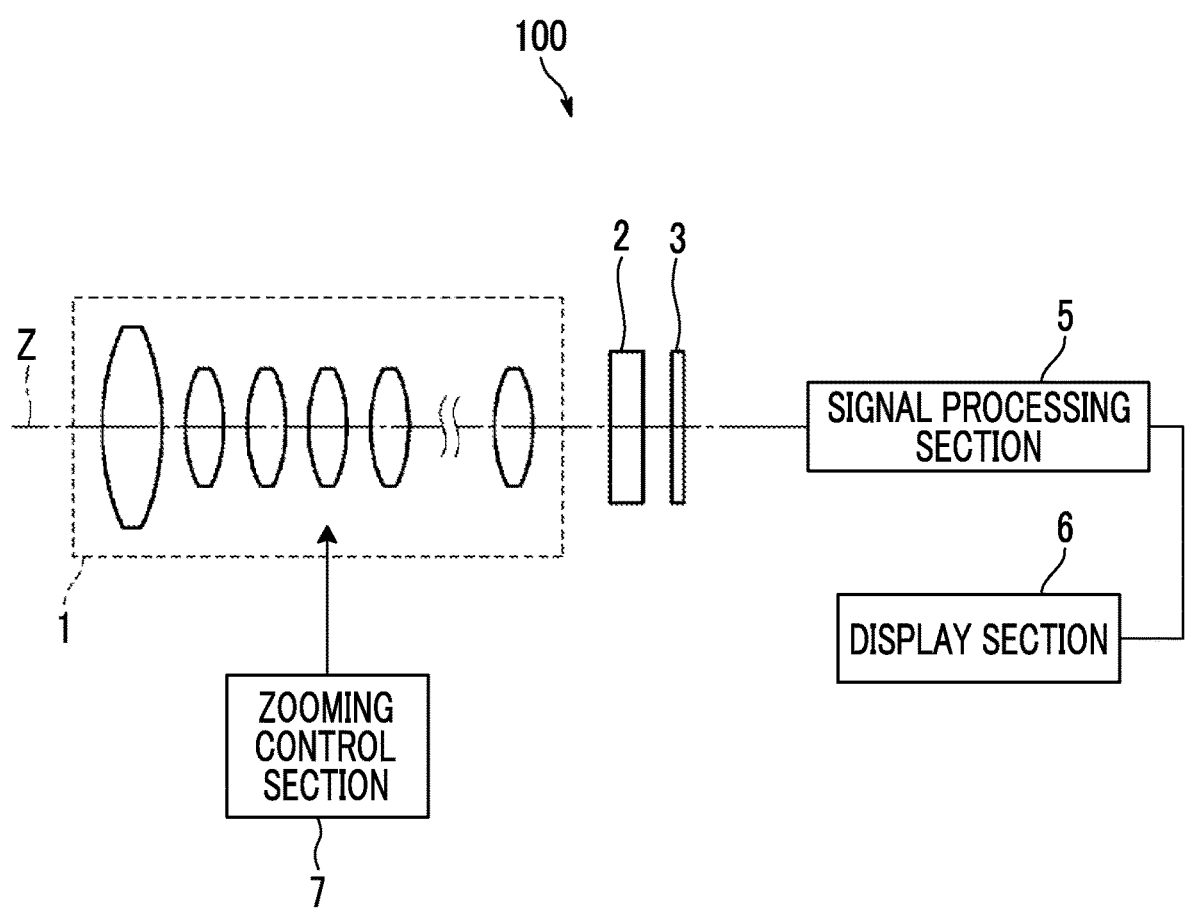
FIG. 26 is a schematic configuration diagram of an imaging apparatus according to an embodiment.

Next, an imaging apparatus according to an embodiment of the present invention will be described. FIG. 26 shows a schematic configuration diagram of an imaging apparatus 100 using the variable magnification optical system 1 according to the embodiment of the present invention as an example of the imaging apparatus according to the embodiment of the present invention. Examples of the imaging apparatus 100 include a broadcasting camera, a movie shooting camera, a video camera, a surveillance camera, and the like.

The imaging apparatus 100 includes a variable magnification optical system 1, a filter 2 arranged on the image side of the variable magnification optical system 1, and an imaging element 3 arranged on the image side of the filter 2.

The variable magnification optical system 1 includes a plurality of lens groups, and has the first zooming mode and the second zooming mode described above as the zooming modes. It should be noted that FIG. 26 schematically shows a plurality of lenses included in the variable magnification optical system 1.

The imaging element 3 converts an optical image formed by the variable magnification optical system 1 into an electric signal, and for example, a charge coupled device (CCD) or a complementary metal oxide semiconductor (CMOS) or the like can be used. The imaging element 3 is disposed so that the imaging surface thereof coincides with the image plane of the variable magnification optical system 1.

The imaging apparatus 100 also comprises a signal processing section 5 that calculates and processes an output signal from the imaging element 3, a display section 6 that displays an image formed by the signal processing section 5, and a zooming control section 7 that controls zooming of the variable magnification optical system 1. The zooming control section 7 moves each lens group according to the modes of the first zooming mode and the second zooming mode. Although FIG. 26 shows only one imaging element 3, a so-called three-plate imaging apparatus having three imaging elements may be used.

The technology of the present disclosure has been hitherto described through embodiments and examples, but the technology of the present disclosure is not limited to the above-mentioned embodiments and examples, and may be modified into various forms. For example, values such as the radius of curvature, the surface distance, the refractive index, and the Abbe number of each lens are not limited to the values shown in the examples, and different values may be used therefor.

What is claimed is:

1. A variable magnification optical system consisting of, in order from an object side to an image side: a first lens group that has a positive refractive power; an intermediate group that includes a plurality of lens groups; and a subsequent group that includes a plurality of lens groups,
   wherein in a first zooming mode, during zooming, a distance between the first lens group and the intermediate group changes, all distances between adjacent lens groups in the intermediate group change, a distance between the intermediate group and the subsequent group changes, and all distances between adjacent lens groups in the subsequent group are stationary,
   in a second zooming mode, during zooming, the first lens group and all lens groups in the intermediate group remain stationary with respect to an image plane, and all the distances between the adjacent lens groups in the subsequent group change,
   zooming in the first zooming mode and zooming in the second zooming mode are possible independently of each other, and
   an intermediate real image is not formed in an entire zooming range.

2. The variable magnification optical system according to claim 1, wherein the subsequent group has a positive refractive power as a whole.

3. The variable magnification optical system according to claim 2, wherein the subsequent group includes at least one lens group having a negative refractive power and at least one lens group having a positive refractive power in order from the object side to the image side.

4. The variable magnification optical system according to claim 1,
   wherein the subsequent group includes at least one lens group having a positive refractive power, and
   in a case where a lens group having a strongest positive refractive power among lens groups that move during zooming in the second zooming mode is a SP lens group,
   assuming that βSP is a lateral magnification of the SP lens group in a state where the variable magnification optical system focuses on an object at infinity and the variable magnification optical system is in a zooming state in which a focal length of the variable magnification optical system is shortest, Conditional Expression (1) is satisfied, which is represented by $$-1<\beta SP<-0.1 \tag{1}$$

5. The variable magnification optical system according to claim 1, wherein the subsequent group includes at least one lens group having a negative refractive power,
   assuming that
   fS is a focal length of the subsequent group in a state where the variable magnification optical system focuses on an object at infinity and the variable magnification optical system is in a zooming state in which a focal length of the variable magnification optical system is shortest, and
   fSN is a focal length of a lens group having a strongest negative refractive power among lens groups that move during zooming in the second zooming mode,
   Conditional Expression (2) is satisfied, which is represented by $$0<fS/|fSN|<4 \tag{2}$$

6. The variable magnification optical system according to claim 1, wherein in a state where the variable magnification optical system focuses on an object at infinity and the variable magnification optical system is in a zooming state in which a focal length of the variable magnification optical system is shortest,
   assuming that
   fw is a focal length of the variable magnification optical system,
   ωw is a half angle of view of the variable magnification optical system, and
   Dexpw is a distance on an optical axis from a lens surface closest to the image side in the variable magnification optical system to an exit pupil position of the variable magnification optical system,
   Conditional Expression (3) is satisfied, which is represented by $$0<|\{fw\times\tan(\omega w)\}/\text{Dexpw}|<0.2 \tag{3}$$

7. The variable magnification optical system according to claim 1, wherein in a state where the variable magnification optical system focuses on an object at infinity and where the variable magnification optical system is in a zooming state in which a focal length of the variable magnification optical system is shortest,
   assuming that
   a focal length of the variable magnification optical system is fw, and
   a sum of a distance on an optical axis from a lens surface closest to the object side in the variable magnification optical system to a lens surface closest to the image side in the variable magnification optical system and a back focal length of the variable magnification optical system at an air conversion distance is TL, Conditional Expression (4) is satisfied, which is represented by $$1 < TL/fw < 100 \qquad (4).$$

8. The variable magnification optical system according to claim 1, wherein assuming that a highest zoom ratio of the variable magnification optical system in the second zooming mode is Zr2max, Conditional Expression (5) is satisfied, which is represented by $$1.2 < Zr2\text{max} < 3 \qquad (5).$$

9. The variable magnification optical system according to claim 1, wherein the first lens group remains stationary with respect to an image plane during zooming in all zooming modes.

10. The variable magnification optical system according to claim 1, wherein lens groups that move during zooming in the second zooming mode are two lens groups consisting of a lens group having a negative refractive power and a lens group having a positive refractive power in order from the object side to the image side.

11. The variable magnification optical system according to claim 1, wherein lens groups that move during zooming in the second zooming mode are three lens groups consisting of a lens group having a negative refractive power, a lens group having a negative refractive power, and a lens group having a positive refractive power in order from the object side to the image side.

12. The variable magnification optical system according to claim 1, wherein lens groups that move during zooming in the second zooming mode are three lens groups consisting of a lens group having a positive refractive power, a lens group having a negative refractive power, and a lens group having a positive refractive power in order from the object side to the image side.

13. The variable magnification optical system according to claim 1, wherein lens groups that move during zooming in the second zooming mode are three lens groups consisting of a lens group having a negative refractive power, a lens group having a positive refractive power, and a lens group having a negative refractive power in order from the object side to the image side.

14. The variable magnification optical system according to claim 4, wherein Conditional Expression (1-1) is satisfied, which is represented by $$-0.9 < \beta SP < -0.1 \qquad (1\text{-}1).$$

15. The variable magnification optical system according to claim 5, wherein Conditional Expression (2-1) is satisfied, which is represented by $$0 < fS/|fSN| < 3 \qquad (2\text{-}1).$$

16. The variable magnification optical system according to claim 6, wherein Conditional Expression (3-1) is satisfied, which is represented by $$0 < |\{fw \times \tan(\omega w)\}/\text{Dexpw}| < 0.1 \qquad (3\text{-}1).$$

17. The variable magnification optical system according to claim 7, wherein Conditional Expression (4-1) is satisfied, which is represented by $$10 < TL/fw < 90 \qquad (4\text{-}1).$$

18. The variable magnification optical system according to claim 8, wherein Conditional Expression (5-1) is satisfied, which is represented by $$1.3 < Zr2\text{ max} < 2.2 \qquad (5\text{-}1).$$

19. An imaging apparatus comprising the variable magnification optical system according to claim 1.

20. The variable magnification optical system according to claim 1, wherein the intermediate image of the real image is not formed inside the variable magnification optical system in any state of all zooming states possible in a case where zooming is performed using all the zooming modes of the variable magnification optical system.

* * * * *